United States Patent [19]
Chow et al.

[11] Patent Number: 6,029,175
[45] Date of Patent: Feb. 22, 2000

[54] AUTOMATIC RETRIEVAL OF CHANGED FILES BY A NETWORK SOFTWARE AGENT

[75] Inventors: Yen-whei Chow, San Jose; Frederick A. Hayes-Roth, Atherton; Neil A. Jacobstein, Palo Alto; James E. Manley, San Jose; Christopher B. McMahan, Cupertino, all of Calif.

[73] Assignee: Teknowledge Corporation, Palo Alto, Calif.

[21] Appl. No.: 08/664,323

[22] Filed: Jun. 7, 1996

Related U.S. Application Data

[60] Provisional application No. 60/005,896, Oct. 26, 1995.

[51] Int. Cl.$^7$ .................................................. G06F 17/30
[52] U.S. Cl. ..................... 707/104; 707/200; 707/201; 707/203; 707/10; 709/202; 709/203
[58] Field of Search ................................ 707/104, 1, 10, 707/200, 201, 203; 395/200.33, 200.32, 200.34, 200.35; 709/202, 203, 219

[56] References Cited

U.S. PATENT DOCUMENTS

| | | | |
|---|---|---|---|
| 4,558,413 | 12/1985 | Schmidt et al. | 364/300 |
| 4,686,620 | 8/1987 | Ng | 364/200 |
| 5,005,122 | 4/1991 | Griffin et al. | 364/200 |
| 5,051,887 | 9/1991 | Berger et al. | 364/200 |
| 5,060,185 | 10/1991 | Naito et al. | 364/900 |
| 5,133,075 | 7/1992 | Risch | 395/800 |
| 5,155,845 | 10/1992 | Beal et al. | 395/575 |
| 5,157,663 | 10/1992 | Major et al. | 371/9.1 |
| 5,313,664 | 5/1994 | Sugiyama et al. | 364/405 |
| 5,315,703 | 5/1994 | Matheny et al. | 395/164 |
| 5,343,477 | 8/1994 | Yamada | 371/8.2 |
| 5,367,633 | 11/1994 | Matheny et al. | 395/164 |
| 5,434,994 | 7/1995 | Shaheen | 395/500 |

(List continued on next page.)

FOREIGN PATENT DOCUMENTS

| | | | |
|---|---|---|---|
| 0384339A2 | 8/1990 | European Pat. Off. | G06F 9/46 |
| 0479660A2 | 4/1992 | European Pat. Off. | G06F 9/46 |
| 0651330A2 | 5/1995 | European Pat. Off. | G06F 9/46 |
| WO82/02784 | 8/1982 | WIPO | G06F 11/00 |
| WO94/00816 | 1/1994 | WIPO | G06F 13/00 |

OTHER PUBLICATIONS

Thomas Ball et al., "An Internet Difference Engine and its Applications," COMPCON '96 Conference, Technologies for the Information Superhighway, 41st IEEE Computer Society Int'l Conference, IEEE, Feb. 1996, pp.p71–76, Feb. 1996.

Swarup Acharya and Stanley B. Zdonik, "An Efficient Scheme for Dynamic Data Replication," Sep. 1993 Technical paper CS–93–43, Department of Computer Science, Brown University, Providence, RI –2912 (25 pages).

(List continued on next page.)

*Primary Examiner*—Paul V. Kulik
*Attorney, Agent, or Firm*—Arnold White & Durkee

[57] ABSTRACT

An intelligent network agent intercepts transactions between clients and servers to perform Distributed Information Logistics Services (DILS) functions such as automatically retrieving updated files from remote servers and delivering them to local client programs. For example, HTTP clients and HTTPD servers are connectionless and stateless, thus there is no way for a server to update a browser automatically when an HTML document is changed. The invention provides a method to update any number of clients from any number of servers without making any changes to currently existing HTTP clients or HTTPD servers. Furthermore, the invention can provide various other DILS services for clients to reduce latency and communication costs for members of a group with interests in similar objects. For example, the intelligent network agent maintains a cache of objects of interest to the group of clients, a log of changes to the objects, a list of the clients interested in the objects, a list of significant change detection methods for the objects, a list of search specifications for the objects, lists of client notification methods, and lists of general interest specifications for the clients.

96 Claims, 43 Drawing Sheets

U.S. PATENT DOCUMENTS

| | | | |
|---|---|---|---|
| 5,444,347 | 8/1995 | Yanai et al. | 395/489 |
| 5,459,857 | 10/1995 | Ludlam et al. | 395/182.04 |
| 5,471,629 | 11/1995 | Risch | 707/1 |
| 5,491,784 | 2/1996 | Douglas et al. | 395/159 |
| 5,592,664 | 1/1997 | Starkey | 707/1 |
| 5,594,910 | 1/1997 | Filepp et al. | 395/800 |
| 5,727,129 | 3/1998 | Barrett et al. | 395/12 |
| 5,740,549 | 4/1998 | Reilly et al. | 705/14 |
| 5,754,850 | 5/1998 | Janssen | 385/615 |
| 5,799,318 | 8/1998 | Cardinal et al. | 707/104 |

OTHER PUBLICATIONS

Chris Dodge, Beate Marx, Hans Pfeiffenberger, "Web Cataloguing Through Cache Exploitation and Steps Toward Consistency Maintenance," The Third International World–Wide Web Conference, Apr. 10–14 1995, Darmstadt, Germany (12 pages).

Paul Klark and Udi Manber, "Developing a Personal Internet Assistant," Proceedings of ED–MEDIA–1995—World Conference on Educational Multimedia and Hypermedia, Granz, Austria, Jun. 16–23 (HTML version, 10 pages).

Anawat Chankhunthod, Peter B. Danzig, Chuck Neerdaels, Michael F. Schwartz, and Kurt J. Worrell, "A Hierarchial Internet Object Cache," USENIX 1996 Annual Technical Conference, (11 pages).

Jim Gettys, Tim Berners–Lee and Henrik Frystyk Nielsen, "Replication and Caching Position Statement," 1997/08/09, http://www.w3.org/Progpagation/Activity.html (6 pages).

Ingrid Melve, "11 Web caching architecture, references," Mar. 6, 1997 (last modified), http://www.uninett.no/prosjekt/desire/arneberg/ref.html (2 pages).

Peter Danzig, "NetCache Architecture and Deployment," Network Appliance, Inc., Santa Clara, California, 1998, http://www.netapp.com/technology/level3/3029.html (14 pages).

Brooks Cutter, "v3new v0.4: Creates a What's New list of http: URL's," containing a date Jul. 25, 1994, residing at http:/www.ics.uci.edu/pub/websoft/libwww–perl/archive/1994/0014.html on Oct. 10, 1998 (4 pages).

First Floor Software Press Release regarding announced shipping of Netscape SmartMarks, containing a date Oct. 30, 1995, and residing at one time at http://www.firstfloor.com/press/1995/smtmarks.html (1 page).

First Floor Software Press Release, "First Floor Announces Smart Bookmarks 1.0 Availability," containing a date Jan. 8, 1996, and residing at one time at http://www.firstfloor.com/press/1996_press.html (1 page).

Richard Karpinski, "Smart Bookmarks," Interactive Age, vol. 2, No. 22, Aug. 28, 1995 (2 pages).

"Netscape Announces Add–on Product Suite for Popular Netscape Navigator Software," containing the date Oct. 25, 1995, Netscape Communications Corp., Mountain View, California, http:/www,netscape.com/newsref/pr/newsrelease57.html (4 pp.).

Specter, Inc. announcement, "ebWatch 1.0 released," containing a date May 12, 1995, residing at one time at http:/scout18.cs.wisc.edu/NH/95–05–16/0015.html (one page).

Excerpt from a Surflogic corporate information page on the WWW (one page).

Surflogic corporate information page as of Oct. 10, 1998 at http://www.surflogic.com, "WebWatch 1.1" at hhttp://surflogic.com/ww.1x/products.html, "WebWatch 1.1 dta sheet" at http:// surflogic.com/ww.1.x/products.html, "WebWatch 1.1 online documentation" at http://surflogic.com/ww.1.x/online_doc_ww1.html, "WebWatch 1.1 Frequently Asked Questions" at http://surflogic.com/ww.1.x/faq_wwl.html, "WebWatch 1.1 releast notes, known bugs and bug–like features" at http:// surflogic.com/ww.1.x/release_notes_wwl.html (12 pages).

Azer Bestavros et al., "Application–Level Document Caching in the Internet," Boston University Computer Science Dept. Technical Report 95–002, containing a date Feb. 15, 1995 and residing at http://www.cs.bu.edu/techreports (20 pages).

Azer Bestavros, "Demand–based Document Dissemination for the World–Wide Web," Boston University Computer Science Dept. technical report 95–003, containing a date Feb. 15, 1995 and residing at http://www.cs.bu.edu/techreports (22 pages).

Azer Bestavros, "Using Speculation to Reduce Server Load and Service Time on the WWW," Boston University Computer Science Sept. Technical Report 95–006, containing a date Feb. 15, 1995, and residing at http://www.cs.bu.edu/techreports (17 pages).

Azer Bestavros and Carlos Cunha, "A Prefetching Protocol Using Client Speculation for the WWW," Boston University Computer Science Dept. Technical Report Abstract 95–011, containing a date Apr. 28, 1995, and residing at http://www.cs/bu/edu/ techreports/abstracts/95–011 (1 page).

M(aurice) William Collins, "A Network File Storage System," IEEE Seventh Symposium on Mass Storage Systems, Nov. 4–7, 1985, Tucson, AZ, pp. 1–11, Los Alamos Nat. Lab. No. LA–UR–85–3183.

Matt Kramer, "Fault–Tolerant LANs Guard Against Malfunction, Data Loss", PC Week, Sep. 15, 1987, vol. 4, No. 37, p.C/26–C/34.

Herrick Johnson and Mark Adams, "RPC: The Key To Distributed Software," EXE Magazine, Nov. 1987, pp. 58–61.

John H. Howard et al., "An Overview of the Andrew File System," USENIX Winter Conference, Feb. 9–12, 1988, Dallas, TX, pp. 23–26.

John H. Howard et al., "Scale and Performance in a Distributed File System," ACM Transactions on Computer Systems, vol. 6, No. 1, Feb. 1988, pp. 51–81.

Eric Strandberg, "Not My Fault Tolerance," Connect, Winter 1989, p. 66.

"Fault Tolerance for LANs and Microcomputers," Atlantic Microsystems, Inc., Salem, NH, 1989, 7 pages.

Alex Siegel et al., "Deceit: A Flexible Distributed File System," USENIX Summer Conference, Jun. 11–15, 1990, Anaheim, California, pp. 51–61.

Richard G. Guy et al., "Implementation of the Ficus replicated File System," USENIX Summer Conference, Jun. 11–15, 1990, Anaheim, California, pp. 63–71.

David C. Steere et al., "Efficient User–Level File Cache Management on the Sun Vnode Interface," USENIX Summer Conference, Jun. 11–15, 1990, Anaheim, California, pp. 325–331.

Thomas W. Page, Jr., et al., "Management of Replicated Volume Location Data in the Ficus Replicated File System", USENIX, Summer '91, Nashville, TN, pp. 17–29.

Matt Blaze et al., "Long–Term Caching Strategies for Very Large Distributed File Systems," USENIX, Summer '91, Nashville, TN, pp. 3–15.

Tim Berners–Lee et al., "World–Wide Web: The Information Universe," Electronic Networking: Research, Applications and Policy, vol. 1, No. 2, Meckler, Westport, CT, Spring '91, 9 pg.

Nathan Torkington, "World Wide Web Primer," Sep. 16, 1993, pp. 1–10.

Nathan Torkington, "An Information Provider's Guide to Web Servers", Sep. 16, 1993, pp. 1–8.

Nathan Torkington, "An Information Provider's Guide to HTML," Sep. 16, 1993, pp. 1–6.

T. Berners–Lee et al., "Hypertext Transfer Protocol—HTTP/1.0" Internet–Draft, Mar. 8, 1995, pp. 1–57.

Application Programmer's Interface for the NCSA Mosaic Common Client Interface (CCI), Version 1.1, Mar. 31, 1995, pp. 1–9. (http:/www.ncsa.uiuc.edu/SDG/Software/SMosaic/CCI/cci–api.html).

T. Berners–Lee et al., "Hypertext Markup Language—2.0," Internet Task Force, Jun. 16, 1995, pp. 1–77.

"The CGI Specification" (http://hoohoo.ncsa.uiuc.edu/cgi) including "CGI Environmental Variables," CGI Command Line Options, "CGI Script Output," "Decoding FORMs with CGI," "Common Gateway Interface," 20 pages.

Mosaic for X version 2.0 Fill–Out Form Support (http://www.ncsa .edu/SDG/Software/Mosaic/Docs/fill–out–forms/overview.html), pp. 1–8.

First Floor Software Corporate Backgrounder, First Floor Software, Mountain View, CA, 1995, 4 pages.

"Internet Marketing with Bulletins," First Floor, Inc., Mountain View, CA, 4 pages.

"Smart Bookmarks, The radically simple way to stay on top of the web," First Floor, Inc., Mountain View, CA, 1995, 2 pages.

Stewart Alsop, "Bookmarks mark the next chapter in the continuing story of the War of the Web," InfoWorld, Sep. 11, 1995, 2 pages.

Richard Karpiski, "SmartMarks Technology a pet project for First Floor CEO," Interactive Age, Aug. 21, 1995, 2 pages.

Netscape Press Releases, "Netscape Introduces Netscape Smart–Marks and Netscape Chat, Applications Bring New Navigation and Communications Capabilities . . . " Aug. 22, 1995, 2 pages.

Robert Hertzberg, "Agent–Aided Bookmarking for Win95 Browers," Web Week, Jan. 1996, p. 33.

Jessica Davis, "First Floor tools monitor Web site changes," InfoWorld, Feb. 19, 1996, p. 51.

Bowman et al., Harvest: A Scalable, Customizable Discovery and Access System, Technical Report CU–CSA–731–94, Department of Computer Science, University of Colorado, Boulder, Colorado, (Revised Mar. 1995).

Bowman et al., "The Harvest Information Discovery and Access System." (9 pages).

Gertzman and Seltzer, "The Case for Geographical Push-–Caching," VINO: The Fall Harvest, TR–34–04 Dec. 1994, Center for Research in Computing Technology, Harvard University, Cambridge Mass.

⌐ 301

Enter the URL of the documents you wish to check:

Enter the CCI port number you have selected on your browser:

[ Submit Info ]  [ Clear Form ]

☐ Alert me on source update for: http://www.teknowledge.com/

Check for souce update every [   ] seconds

Enter the URL of the documents you wish to check:

[ Submit Info ]  [ Clear Form ]

FIG. 6

AUTOMATIC RETRIEVAL OF CHANGED FILES BY A NETWORK SOFTWARE AGENT

This application is a continuation of provisional application Ser. No. 60/005,896 filed Oct. 26, 1995.

This invention was made with the Government support under contract No. N66001-94-C-6041 awarded by the Naval Command, Control and Ocean Surveillance Center Research, Development, Test, and Evaluation Division. The government has certain rights in this invention.

BACKGROUND OF THE INVENTION

The present invention relates generally to data processing, and more particularly to information retrieval from a local or remote server in a data network or internetwork.

In 1989, researchers at CERN (the European Laboratory for Particle Physics) wanted to develop a better way to give widely dispersed research groups access to shared information. They wanted to develop a system that would enable them to access quickly all types of information via a common interface, removing the need to execute many steps to achieve the final goal. At that time, to read a document or view an image from a remote site often required finding the location of the desired item, making a remote connection to the machine where it resided, and then retrieving it for storage on a local machine. Over the course of a year, the proposal for this project was refined, and work began on the implementation.

During 1992, CERN began publicizing their project as a world-wide web (WWW). People saw what a great idea it was, and began creating their own WWW servers to make their information available to the Internet. Some people also began working on WWW clients, designing easy-to-use interfaces to the WWW. By far the most successful has been the Mosaic browser from the National Center for Supercomputing Applications (NCSA) and its kindred WWW browsers.

Mosaic and its kindred browsers use a computer interface method known as hypertext. Hypertext is text having embedded cross-references that can be followed to obtain related information. At a display terminal, a user can follow a cross-reference by "clicking" a mouse to point to a cross-referenced phrase, causing a related document or index to appear in a "browser window" on the display. The hypertext used by Mosaic and its kindred browsers is defined in a document using Hypertext Markup Language (HTML) created by the Internet Engineering Task Force and described in an Internet draft document by T. Berners-Lee and D. Connolly entitled "Hypertext Markup Language—2.0" (Jun. 16, 1995). Mosaic and its kindred browsers use an application-level protocol called the Hypertext Transfer Protocol (HTTP) when communicating with network file servers to follow hypertext cross-references. HTTP is described in an Internet draft document by T. Berners Lee, R. T. Fielding, and H. Frystyk Nielsen entitled "Hypertext Transfer Protocol—HTTP/1.0" (Mar. 8, 1995). Servers that recognize the HTTP are known as HTTP Daemon (HTTPD) servers.

There are two freely distributable UNIX-based WWW HTTPD server programs that are widely available and adopted by numerous WWW sites, one from NCSA the other from CERN. According to Netscape Communications Corp., there are now over 3 million WWW users accessing 10,000 Web servers. Currently, there are numerous free and commercial WWW browsers available: NCSA Mosaic, Cello, Viola, Emacs-W3, Lynx, Chimera, MacWeb, WinWeb, OmniWeb, Netscape Navigator from Netscape Communications, BookLink Internetworks, IBM Web Explorer, Netcom NetCruiser, Pipeline, Microsoft Network, Apple's Cyberdog technology, and packages from O'Reilly Associates, Spry, Spyglass, Quarterdeck, Infoseek, Ubique, Quadralay, and SunSoft's HotJava.

BookLink and Netscape Communications are the two most aggressive contenders offering a Web browser. They are start-up companies founded in March and April, 1994, respectively. Netscape released its first browser in October, 1994, and BookLink announced its highly functional browser in June, 1994.

Netscape recently announced its Netsite Communications Server and Commerce Server, as well as a new suite of applications for building a complete electronic commerce system on the Internet. Netscape products feature a built-in proprietary security mechanism that supports Netscape's Secure Sockets Layer (SSL) extension to the HTTP protocol. Based on SSL technology, they offer a secure commercial credit card billing and order processing system. The distinguishing features of the BookLink browser are: speed, multithreading (which allows simultaneous multiple data transfer sessions in an unlimited number of windows), multipaned windows that allow different documents in each window, progressive rendering of graphical elements (e.g., Graphics Interchange Format files—GIFs) so that users don't have to wait to see the completed page, and persistent caching of rendered pages so that there is no delay in redrawing of graphics elements.

The direction of commercial WWW technology development is clearly going toward communication security and faster, better browser displays. However, there has not been a similar degree of development in the area of Distributed Information Logistics Services (DILS). DILS are techniques for reducing human effort, communication costs, and latency in the access by users to information whose value may be time dependent and perishable. Some WWW users have complained about the lack of facilities supporting DILS. For example, the following are quotations from a "www-talk" newsgroup.

Christian Mogensen (mogens@CS.Stanford.EDU) Tue. Jan. 10, 1995 20:43:50+0100

>Is there any way in HTTP for a Server to automatically
>update a page without requiring the user of the client
>to click on anything?

Currently, no. HTTP is connectionless, and that makes it hard to do things after a transaction is completed.

>An example use of this would be if a Client requests a
>stock price page and keeps the page displayed. Now
>suppose the stock price changes. Is there a way
>within HTTP for the Server to update the page
>automatically without requiring the user to click on
>the reload option?

Another way to do this is to provide a stock-ticker application that is initialized by the web client when it receives application/x-stock-ticker data. The browser forks off the special viewer which opens a separate communication channel to the server.

The previously noted use of Expires: xxx header is interesting—I don't think it will work in the described manner until after a few revisions of browser software have passed . . .

jjjones—SIO Technologies Corp. (jjones@helpmt.sio.com) Tue, Jan. 10, 1995 21:44:39+0100

Question:

I know of no client that will automatically refetch a document (if it is the current one on the screen) if the current time surpasses the Expire time specified for the document. Correct?

Marc Salomon (marc@library.ucsf.edu) Tue, Jan. 10, 1995 23:07:50+0100

The problem is that the data changes on the server side and there is no way in the current HTTP model for the server to contact a client to inform them of this. A solution that would be within the http model would be for the server to inform the client that the content of this document changes rapidly and a interval for refreshed. Something like:

C: GET/stock_quote.html HTTP/1.1 S: HTTP/1.1 200 OK Content-type: text/html →Refresh: <time_interval> Last-modified: Wednesday, Dec. 7, 1994 22:03:38 GMT Expires: Wednesday, Dec. 7, 1994 22:03:39 GMT Content-length: 1721

This would allow the client to set a timer and perform a GET on the URL every time_interval so you would have the perception of a dynamically updated document. The updates would be dependent on the alarm clock, of course, instead of any real change in the content of the document, but I think its the closest you are going to get under the current scheme.

marc

Mark J Cox (M. J. Cox@bradford.ac.uk) Tue. Jan. 10, 1995 15:22:05+0100

The HTTP documentation mentions the Expires: header which "Gives the date after which the information ceases to be valid and should be retrieved again" to "allow for the periodic refreshing of displays of volitile [sic.] data".

Some clients are now starting to support the Expires header, but I know of none that will automatically refresh without user intervention. If they do then there is a need for a second header: one that tells the client that the document will expire at some given time—but don't bother getting it again.

End of quotations

Other network communication protocols have similar deficiencies in providing timely information to interested users. For example, Computerworld, Aug. 14, 1995, p. 45, says: "Although pleased with [Lotus] Notes effectiveness in enhancing communication and replacing paper, she has had to deal with cultural issues. For one, the information does not come directly to the user, the user has to open Notes and look for it. . . . "

Therefore, there is a problem of updating a client such as a browser when a page is changed, because all HTTPD servers are stateless and connectionless, so it is impossible for servers to maintain clients' states with the standard server software design and implementation. Changing the behavior of the standard browser and server software, which is now in use by millions of people, would be very costly in terms of ensuring backwards compatibility as the new software is installed.

SUMMARY OF THE INVENTION

The basic objective of the present invention is to provide a software agent for automatically retrieving changed documents previously accessed from network and internetwork servers. Such a software agent will be referred to below as a "Revision Manager."

According to one aspect of the invention, the Revision Manager operates as an intermediary between a client, such as a browser executed at a user's terminal, and a local or remote network server. The Revision Manager is viewed by the network server as a kind of client that fetches documents from the network server. The Revision Manager is viewed by the client as a kind of server that sends these documents to the client's browser for viewing by the user.

In accordance with another aspect of the invention, the Revision Manager maintains a cache system based on client requests, which means it need not cache every page it fetches, but only those pages that a client specifically requests to be updated automatically. Such a Revision Manager is different from a proxy server by: (1) selectively caching documents; (2) not requiring a browser to preselect a proxy server—a browser can communicate with any number of other servers while using the intermediate software agent; (3) updating registered clients' browsers' displays when a document is changed; and (4) deleting cached document files when no client interests are registered, obviating other techniques for garbage collection. An object such as a document will be referred to as "changed" when it is modified (i.e., updated) and also when it is created (i.e., a new object). In the case of a new object, the "changed portion" or "changes" in the object will be a new object itself. In addition, the cache in the Revision Manager can provide a foundation for highly desirable economies of scale in information distribution and dissemination, such as when the Revision Manager is located close to multiple users so that their common information requirements can be served quickly from a shared local cache. Such a local cache obviates repetitive accesses by each user to distant sources that consume significant amounts of long-distance communication. Users employing standard WWW HTTP browsers can automatically receive notification and a view of the most recent version of documents of interest when these documents change. In this fashion, the Revision Manager augments the typical WWW browser with capabilities for accessing a shared cache of automatically updated documents and for responding appropriately and automatically to the change in information within a previously viewed document.

In accordance with a further aspect of the invention, the Revision Manager can notice changes in various sorts of objects by a variety of means and can respond to these changes by notifying interested parties using a variety of appropriate techniques. In addition, each Revision Manager can serve a group of parties that have similar interests with a shared cache of pertinent objects, and multiple Revision Managers can be employed in this manner to optimize the costs and performance of providing timely and high-quality information to many groups over a wide area. Finally, a Revision Manager can be configured to redirect requests for resources to particular ones of several alternative servers to access those expected to produce higher quality information at lower costs.

In a specific embodiment, the operation of the Revision Manager is broken into two basic phases, one corresponding to a "start up" and the other corresponding to "continuing use." In the start-up phase, the user accesses a Revision Manager start-up document encoded as a Hypertext Markup Language (HTML) page on a Revision Manager server. The start-up requests the user to provide two items of information: (1) a resource the Revision Manager should retrieve for the user and (2) the port number on the user's local machine where the user's browser can be notified to receive the resources retrieved by the Revision Manager for the user. In the continuing-operation phase, objects retrieved by the Revision Manager are modified in two ways: (a) a form is appended to the retrieved object and (b) uniform resource locators (URLs) embedded in the object are altered. When the user views the modified retrieved object, the form allows the user to specify whether this is an object of interest and a maximum desirable frequency for notification of subsequent updates to the object of interest. The alteration of embedded URLs is designed to cause subsequent resource requests for the associated resources to be directed to the Revision Manager. If the user activates a hyperlink that has been so modified, the Revision Manager receives the request and decides how best to service the request. In general, it can service the request from a cache that it maintains or it can redirect the request to another server to access the request. In either case, once the resource request is satisfied, the user receives an object modified in the two ways just discussed.

In a specific embodiment, the user may send requests for resources to the Revision Manager by directly supplying the resource locator in the form appended to modified objects previously accessed. In this case, when the user submits the form, the URL is modified to prepend the address of the Revision Manager so that the request is handled by the Revision Manager. The user, alternatively, may use the normal functions of his or her browser to "open" or "retrieve" any object in the typical manner. In such a case, the access request is sent to the user-specified server, which in most cases would not be the Revision Manager itself. In this manner, the user either may direct requests through the Revision Manager to exploit its capabilities for caching, change monitoring, and update notification or may bypass the Revision Manager as appropriate. The relative frequency of these two alternatives is determined entirely at the user's discretion.

The Revision Manager accepts a user input indicating that the user has some interest in monitoring a particular document. We refer to this input as a specification of an "object of interest" and to the user making the specification as "the interested party." In one specific embodiment, the specification of an object of interest consists of two components: (1) the unmodified URL for the object and (2) a check box flag that is toggled on by the user. In addition, in this specific embodiment, the interested party specifies a maximum frequency for receiving notification updates, which the Revision Manager uses to assure update notifications do not occur too often. The Revision Manager also keeps a list of parties interested in particular updates as well as information required to notify each of them appropriately when an update notification is due. In this specific embodiment, the interested party supplies a port number so that update notifications can be conveyed to each through a separate browser window that is opened and displayed automatically for the user. This specific embodiment of the Revision Manager therefore provides: (1) caching of objects of interest to support ready access in case of subsequent repeated requests; (2) translation of resource locators embedded in retrieved resources from their original values to enable subsequent accesses to be directed to the Revision Manager; (3) interception by the Resource Manager of modified resource requests; (4) determination of the best source for supplying the requested resource; and (5) redirection of the request to the best supplier of the requested resource, if a resource of sufficient quality is not already present in the cache; (6) spontaneous updating of the cache when objects of interest have changed; and (7) notification of interested parties when objects of interest have changed.

In a specific embodiment, the Revision Manager receives a URL for a document sent by an off-the-shelf World-Wide Web HTTP browser which has a common gateway interface (CGI) built in, retrieves the document and, if the user specifies an interest in being alerted on updates to the document, caches the document, and subsequently spontaneously monitors the server to notice if the document has been modified. In the preferred embodiment, moreover, the monitoring is performed by periodically querying the document's server to determine if the document has changed since it was last retrieved. When the document is determined to have been modified, the Revision Manager saves the updated document to its cache and then informs each interested party's registered browser, through a CCI channel, to issue a GET command to the Revision Manager. In this way, the browser of the interested party accesses the modified document from the Revision Manager's cached file and updates its view to correspond with the most recently accessed updated object.

In a specific embodiment, the method employed for intercepting a URL includes: (1) use of forms to accept a URL from a user through an HTTP browser, and (2) delivery of the requested document with translated hyperlinks, each of which has the Revision Manager's address as the prefix. This translation of hyperlinks means that when the user next selects a resource for access by activating the hyperlink, the user's request is first directed to the Revision Manager, regardless of the resource's actual location on the network. The delivered document also has a short form attached. This form allows a user to register interest in the currently viewed document and to specify the shortest interval in seconds desired by the user between successive update notifications on the same document. In this specific embodiment, there are two ways to cancel a registration: one is through the short form provided on the returned document, and the other is when the user terminates the browser. Other policies and mechanisms could also be easily supported. In this specific embodiment, other hyperlinks that refer to non-textual multimedia objects are not translated, but are retained intact along with the document's cache file. When the query as to whether a file has been modified is made by the Revision Manager, these multimedia URLs are also queried. Hence, although documents are not modified to cause browsers to access multimedia objects from the Revision Manager, any change made to the document, including its multimedia links, will trigger the browser to retrieve and update the display of the document. Deeper levels of change monitoring can also be adopted as a matter of policy, such as checking whether any of the objects referred to by URLs within a document have changed. This kind of monitoring of changes can be carried to multiple levels by a recursive application through linked documents of the change detection mechanism applied at the top level defined by a single document with its embedded hyperlinks.

Thus, the Revision Manager provides means for users to inform it of which documents are worthy of monitoring and techniques for alerting users when documents of interest have been updated. The Revision Manager serves as an intermediary between standard HTTP browsers and HTTP servers thereby obviating the need for significant new or different infrastructure. The Revision Manager, further, collects at a site convenient to a group of users a single cache of the most recent versions of documents so that all members of the group can have quick and inexpensive access, while the group as a whole can significantly reduce communication costs. Unlike other HTTP servers, the Revision Manager can spontaneously update its cache to keep its information current. Lastly, the Revision Manager can be configured to provide a user a comprehensive view of documents of interest that have changed since the last time the user looked.

BRIEF DESCRIPTION OF THE DRAWINGS

Other objects and advantages of the invention will become apparent upon reading the following detailed description with reference to the accompanying drawings wherein:

FIG. 5 is a form that is filled in by a user to specify a document of interest to be monitored by the Revision Manager;

FIG. 6 is a form that is attached to Revision Manager monitored documents and filled in by the user to specify an update interval;

Figure 1:
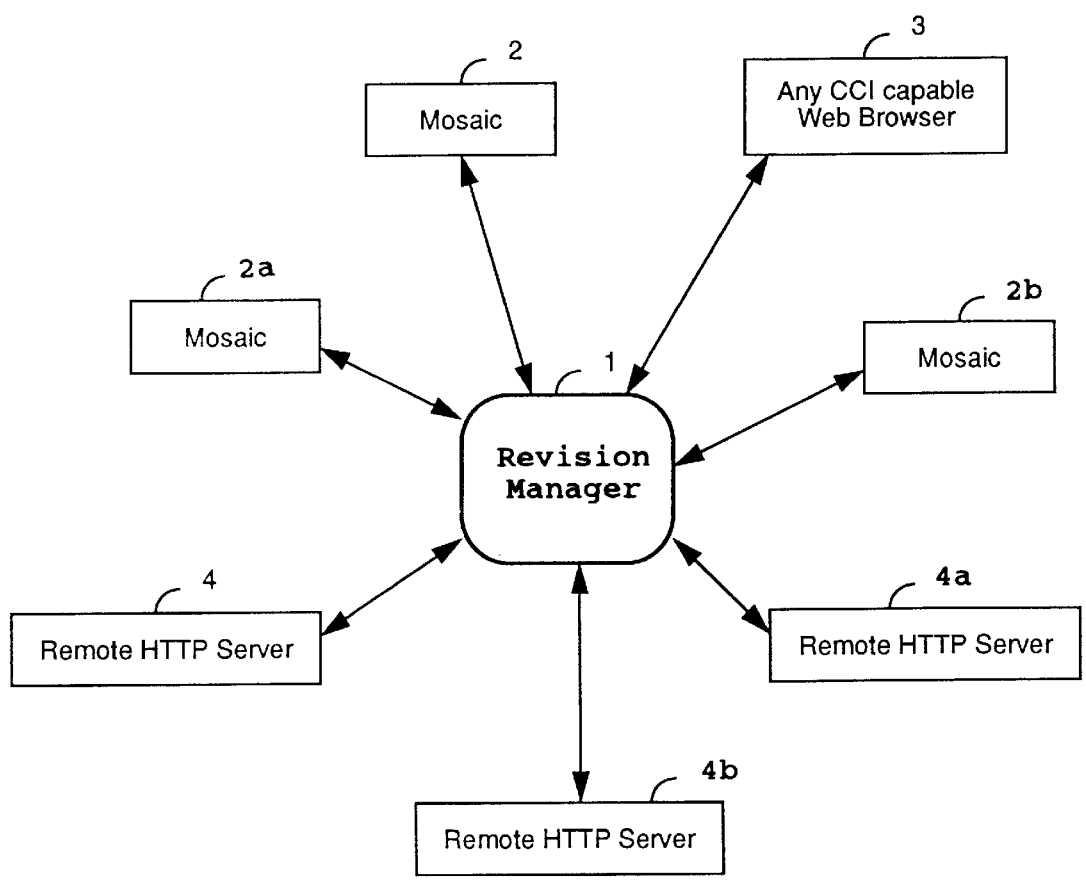
FIG. 1 is a block diagram showing a Revision Manager in a data network.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

Turning now to FIG. 1 of the drawings, there is shown a data network including a Revision Manager 1 in accordance with the invention. The Revision Manager 1 is a programmed digital computer linked by standard internet connections (shown as arrows in FIG. 1) to other nodes in the data network. Preferably, the program for the Revision Manager runs on any operating system that supports TCP/IP communications and that has a way to connect to either a wide or local area network as shown in FIG. 1.

As illustrated in FIG. 1, the Revision Manager is connected to function as an intermediary between a number of Mosaic browsers 2, 2a, 2b, or any other CCI capable web browser 3, and a number of remote HTTP servers 4, 4a, 4b. The program for the Revision Manager could run on a dedicated digital computer. Alternatively, the program for the Revision Manager could be one of many different programs or processes executed by a digital computer. For example, the program for the Revision Manager could be executed by the same digital computer that executes a program for a browser, or by the same digital computer that executes the program for a server.

Figure 2:
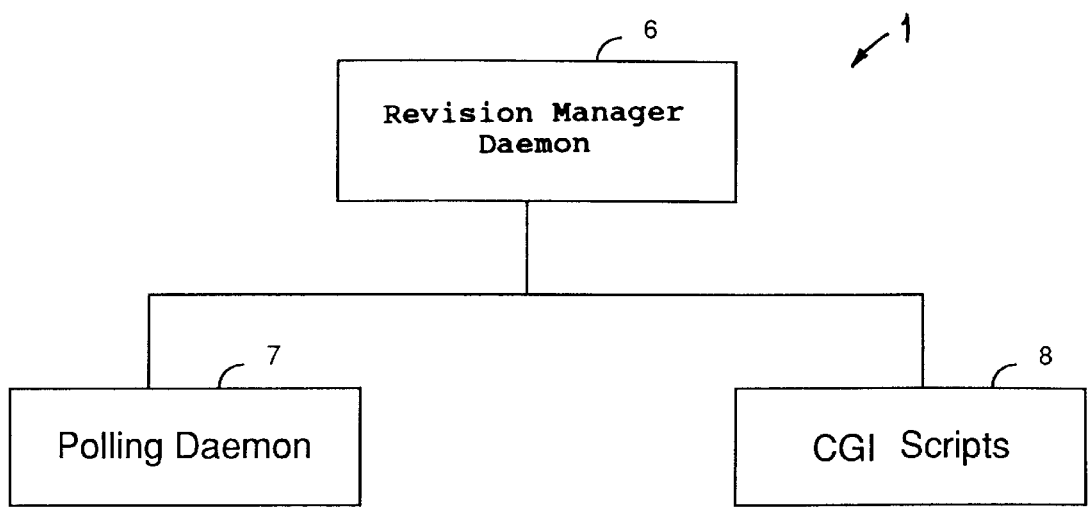
FIG. 2 is a block diagram showing components of the Revision Manager of FIG. 1.

As shown in FIG. 2, the Revision Manager includes three components: a Revision Manager Daemon 6 that is an HTTPD WWW server mechanism; a Polling Daemon 7 that is a cache polling mechanism, and a set of CGI scripts 8 that are services to support Revision Manager Forms. The Revision Manager Daemon 6 provides all HTTPD WWW server functions to any Web browser.

Figure 3:
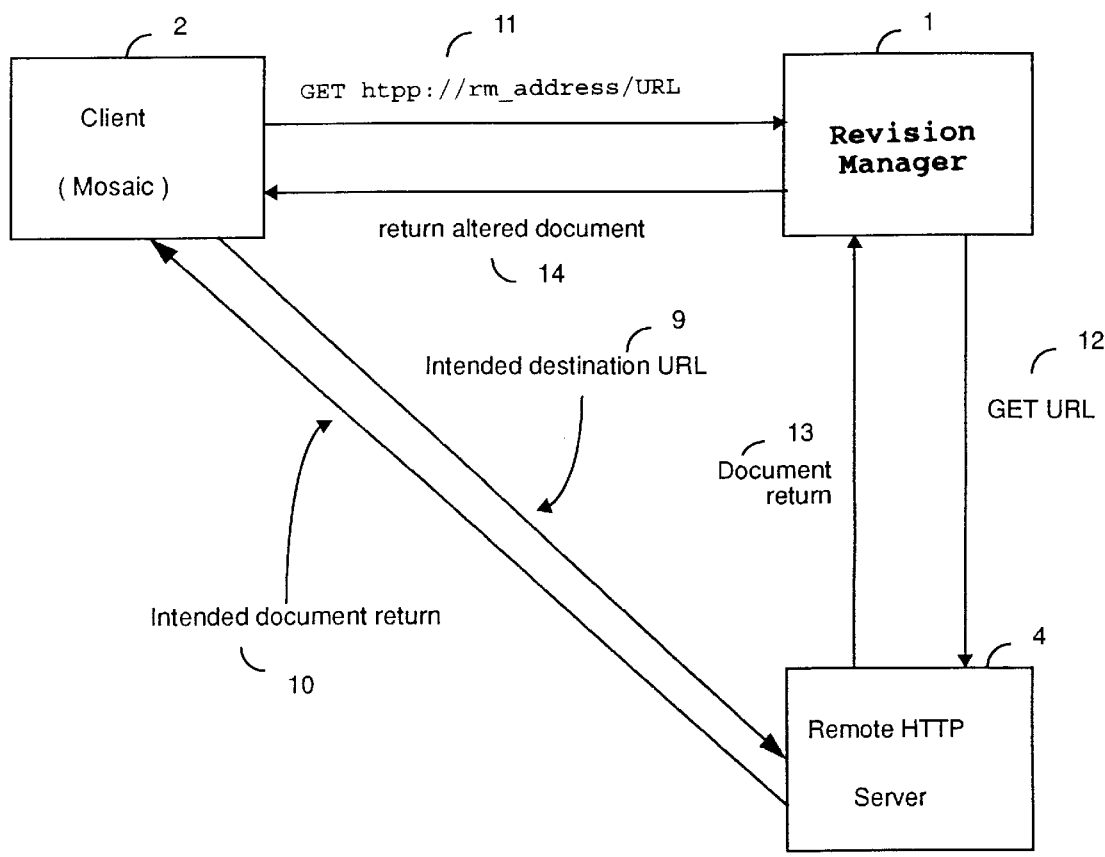
FIG. 3 is a block diagram illustrating data communication among the Revision Manager, a client browser, and a remote server in the network of FIG. 1.

FIG. 3 shows that the Revision Manager acts as an intermediary between a browser client 2 (Mosaic) and a Remote HTTP server 4. In the absence of the Revision Manager 1, the client would send an intended destination URL 9 to the remote HTTP server 4, and the remote HTTP server would provide an intended document return 10 to the browser client 2.

To automatically be provided with updates to a document of interest, however, the browser client sends a GET command 11 to request a HTML document "rm.html" from a Revision Manager 1. The user enters a URL by filling in a form "rm.html" (301 shown in FIG. 5). When the user submits the form, the client 2 sends a POST command to the Deamon (6 in FIG. 4) of the Revision Manager 1. After a series of decisions (as described below with reference to FIGS. 9 to 11), the Revision Manager Daemon then calls either the RM_route.pl CGI services (FIGS. 12 to 16) or RM_cacheParse.pl CGI services (FIG. 17) to provide the document. RM_route.pl takes the URL from the POST command parameter value and issues a GET command 12 to the remote server, which is the destination of the URL. After the document is returned 13, RM_route.pl saves the document into a cache file, and then concatenates a Revision Manager short form to the document in order to attach this short form and create an altered document. The hyperlinks in the original document are translated to include the Revision Manager's URL as the prefix. Multimedia URLs need not be translated.

The following example shows how a hyperlink is translated. Suppose the original hyperlink is:

http://www.teknowledge.com/company/Patent.html

Then, the translated hyperlink will be:

http://SomeRevisionManager.CompanyName.com:8042/
http://www.teknowledge.com/company/Patent.html where "SomeRevisionManager.CompanyName.com" is the host IP address of the computer on which the Revision Manager is running, and 8042 is the port number the Revision Manager Daemon is using. The details of this mechanism will be discussed below.

The attached short form lists several options that the Revision Manager offers. The altered document then is returned 14 to the client browser 2. A user uses the attached short form to enable the automatic updating service, which will make the browser automatically display the changed document in a new window after the document has been updated at the remote server site.

Figure 4:
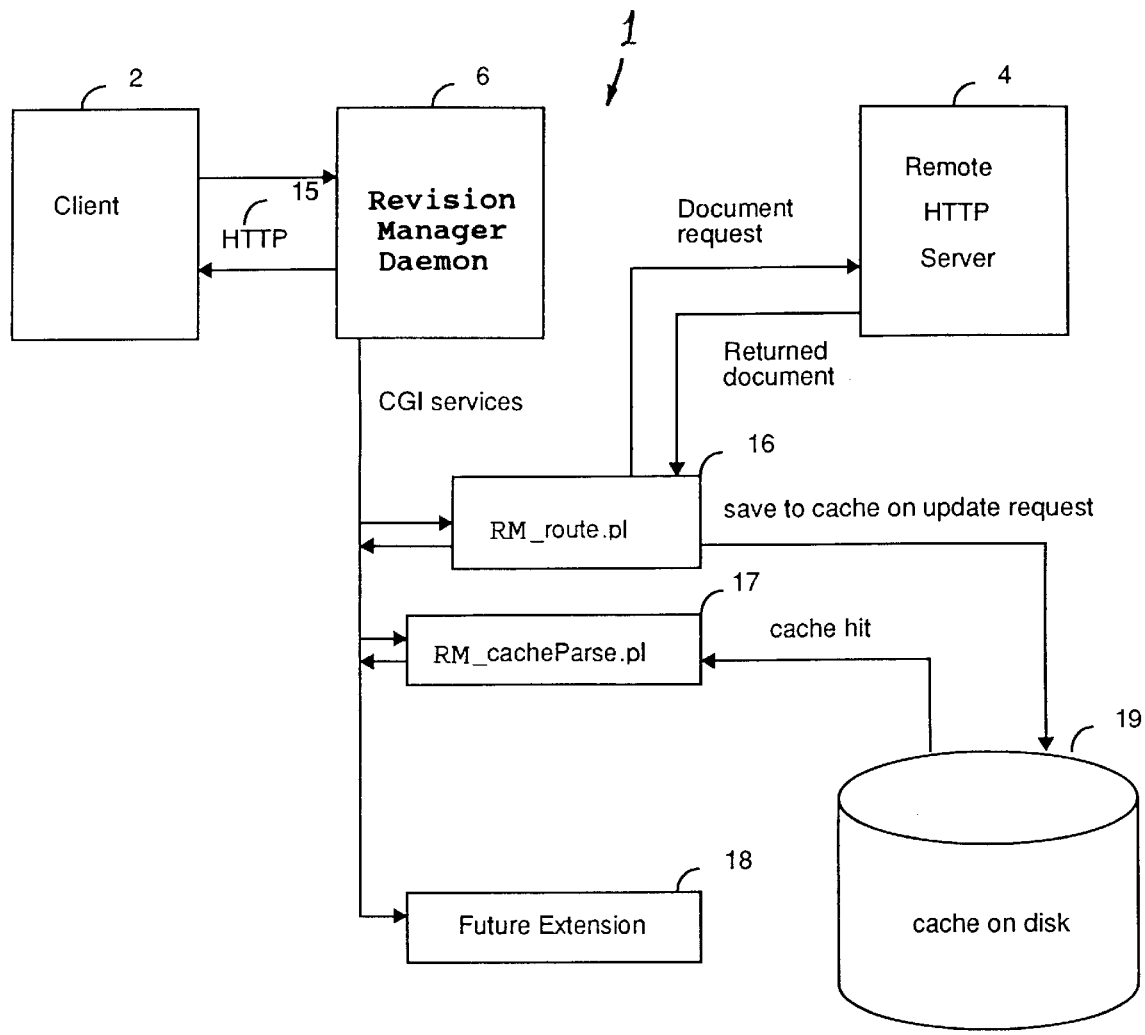
FIG. 4 is a block diagram illustrating the use of a cache in the Revision Manager.

Turning now to FIG. 4, the Revision Manager 1 has been expanded to show some of its internal operations and components. RM_cacheParse.pl 17 does the same thing as RM_route 16, except that it does not get the changed document from the remote server 4; instead, it gets the document from a cached file in a cache 19 on disk. The Revision Manager 1 would also accept as future extension 18 any additional CGI services that might be developed for interfacing with an HTTPD server.

Figure 7:
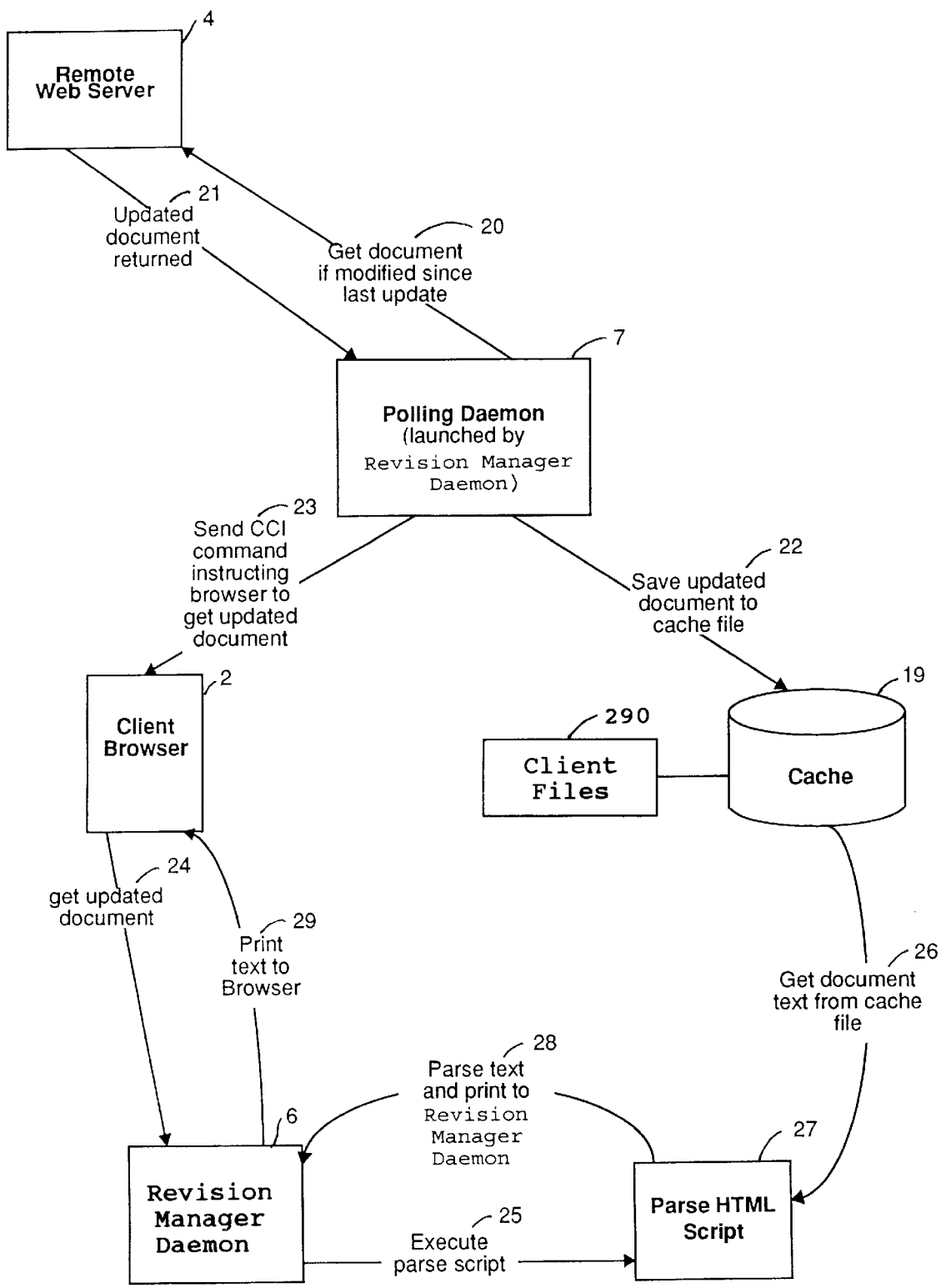
FIG. 7 is a block diagram showing the exchange of data between a client browser, a remote web server, and the cache and various processes of the Revision Manager.

Turning now to FIG. 7, there is an illustration of the data flow to and from the Polling Daemon. As described above, the client browser 2 first communicates with the Revision Manager Daemon to identify a document of interest for which the user would like updates to be sent automatically. The Revision Manager Polling Daemon 7 is spawned by the Revision Manager Daemon at start-up time. The Revision Manager Polling Daemon periodically and spontaneously scans the root directory and any subdirectories of the cache 19 to find any cached documents. Associated with the cache 19 is a set of client files 290. Each document in cache has its own client file containing a list of its registered clients (interested parties). The Revision Manager Polling Daemon opens the client file of each cached document to find out whether there are still any interested parties. If there is at least one client which is due to be notified in case the document has been changed, it issues a GET command 20 for the document to the remote server with an If-Modified-Since header. The time field is the Last-Modified time from the remote server when the document was previously obtained. If the document has been modified, the remote server 4 will send back the entire updated document 21; otherwise, the remote server just sends back a 304 status code, which means that the file has not been modified. If the file has been modified, the Revision Manager Daemon saves 22 the updated document into the cache file. Then, for each interested party which is due for an update, the Polling Daemon 7 sends a CCI command 23 to the client browser 2 instructing the client browser to open and display the updated document including the appended Revision Manager form. If any client browser of an interested party has exited already, the Polling Daemon 7 deletes this client from the saved client file. If all clients have exited, the document is deleted from the cache. When a browser receives a CCI command, it automatically will issue a GET command 24 to the Revision Manager Daemon 6 to retrieve the updated document. Since the updated document is in the cache, the Revision Manager Daemon 6 executes 25 the RM_cacheParse.pl 27. The Parse HTML Script service 27 gets the document text of the updated document from a file in the cache 19, parses the text and prints it to the Revision Manager Daemon 6. The Revision Manager Daemon 6 prints the text to the client browser 2, so that the client browser display the text of the updated document in a new window.

Figure 8:
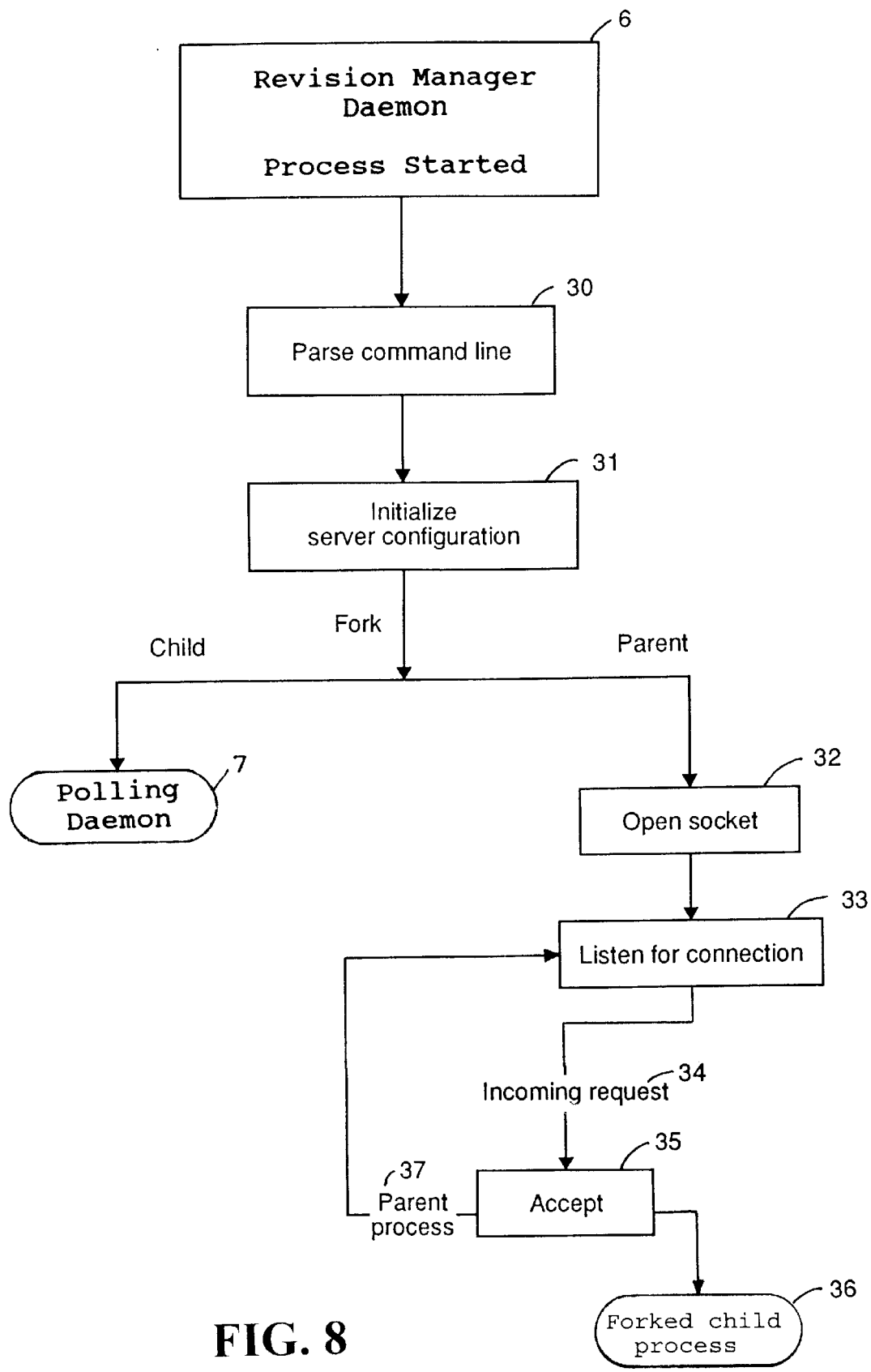
FIG. 8 is a flowchart illustrating the execution of the Revision Manager Daemon process of the Revision Manger.

FIG. 8 shows the starting of the Revision Manager Daemon process. A Revision Manager Daemon is an extended HTTPD server. It differs from an NCSA HTTPD server because it maintains a cache directory referring to cached documents. It also differs from the standard CERN HTTPD server because: first, it does not cache every file it fetches; second, it is not required to be run as a proxy server; and third, it spontaneously updates its cache for documents of interest. The Revision Manager Daemon acts as both a server and a client. It is a server when accepting HTTP requests from browser clients connecting to it, but it acts like a client to the remote servers that it connects to in order to retrieve the documents for its own clients. Moreover, a document returned from a Revision Manager Daemon to the client has a short form attached to it which provides more options and services to its user about the requested document.

As shown in FIG. 8, when a Revision Manager Daemon process starts, like all other HTTPD servers, it reads command line arguments (step 30) and a server configuration file (step 31) in order to customize itself to reflect the configuration of the host system and how it should act as a server in response to a host system such as a client browser. At this stage, it is no different from either NCSA or CERN HTTPD version 3.0 servers.

After initialization, the Revision Manager splits into two processes: an HTTPD server process (parent in step 32) and the Polling Daemon process 7 (a child process). The Polling Daemon process is an infinite polling loop further described below with reference to FIG. 18.

From this point on, the Revision Manager acts differently from both the NCSA and CERN servers. In FIG. 8, the parent process maintains a listening loop (block 33). When a request 34 comes in from a browser and is accepted in step 35, execution forks to a child process 36 to handle the request, and the parent process 37 returns to step 33 to process subsequently-received requests.

Figure 9:
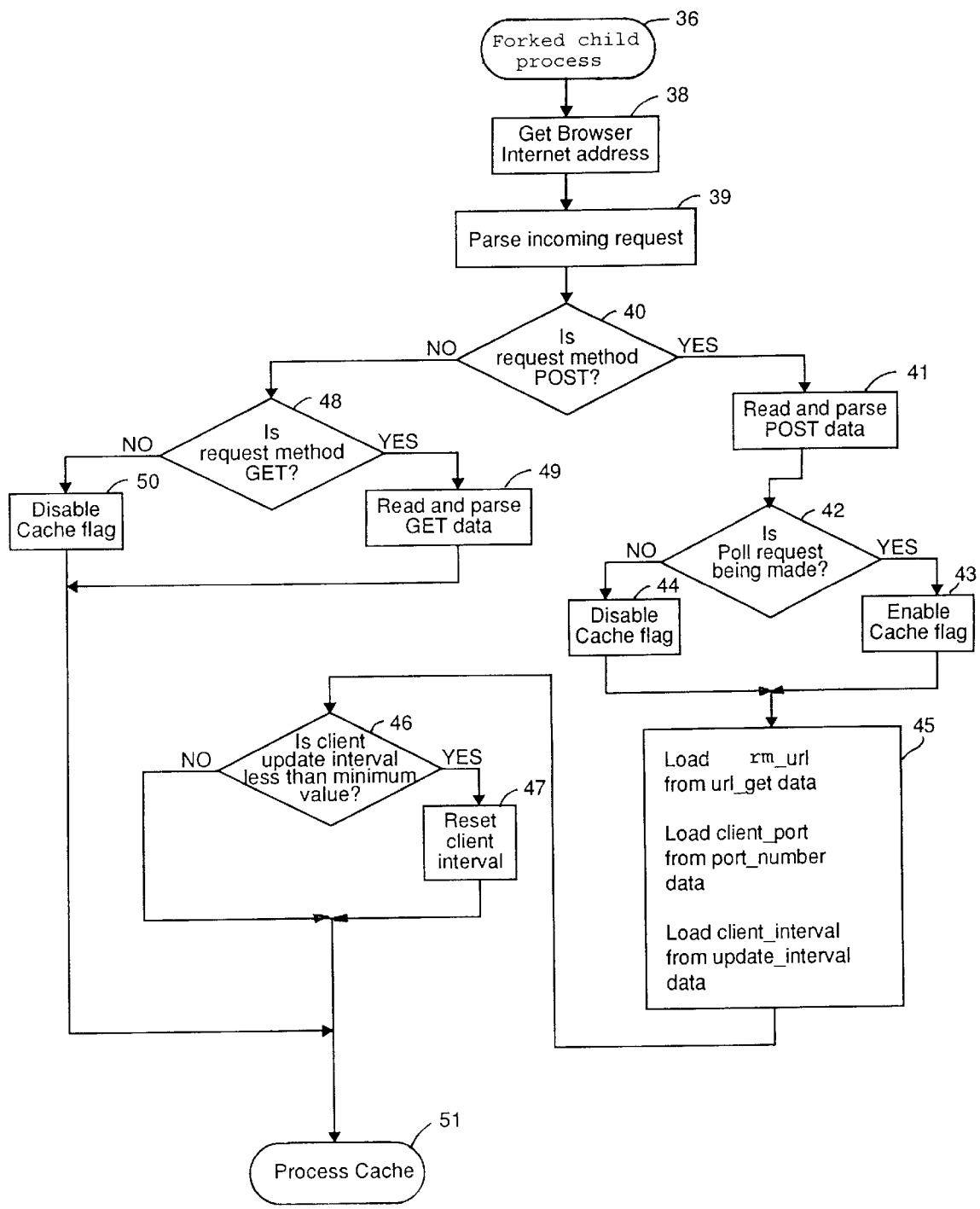
FIG. 9 is a flowchart of a forked child process spawned by the Revision Manager Daemon process upon receiving a request from a client browser.

The forked child process 36 continues in FIG. 9. The child process first gets the client's IP address in step 38 and saves it to a variable called "client_addr". Next, in step 39, the child process reads the headers of the HTTP request. If the request is to get a local file, it returns the file as would a normal HTTPD server. If the request is for a CGI script, then in step 40 the child process examines the method of the request. If the method of the request is POST, then execution of the child process branches to step 41. In step 41, the child process reads the data field of the HTTP request and saves the data into a buffer called "rm_data". In the data, there are Revision Manager-specific name-value pairs. They are "url_poll," "url_get," "port_number" and "update_interval." "url_poll" indicates whether this document needs the updating service or not. In step 42, execution of the child process branches depending on whether this document needs the updating service. If "url_poll" is set, indicating that this document needs the updating service, then in step 43, a flag "rm_do_cache" is set; otherwise, in step 44, the flag "rm_do_cache" is cleared. A variable "url_get" contains the URL absolute address that the Revision Manager needs to get from the remote server. In step 45, the content of a variable "url_get" is saved in a variable called "rm_url". Also in step 45, "port_number" data is loaded into a variable "client_port", and "update_interval" data is loaded into a variable called "client_interval".

The variable "port_number" is the CCI number that browsers such as Mosaic use. It is used by Mosaic to communicate with other agents. The variable "update_interval" shows how often the user wishes to have the document checked for an update. Because the frequency of modification of a document is uncontrollable by a browser, it is desirable for many users that, no matter how often a document changes, the browser gets its updates on a fixed periodic schedule. In steps 46 and 47, this interval, in the variable "client_interval", is limited to a configurable minimum value.

If in step 40 the child process finds that the method of the incoming request is not "POST", then in step 48 the child process branches depending on whether the method of the request is "GET". If so, then in step 49 the argument of the "GET" command is saved in the variable "rm_url," and the rest of Revision Manager variables are not set. If not, then in step 50, the cache flag "rm_do_cache" is cleared to disable caching. Methods other than "POST" and "GET" (block 50) can readily be defined and implemented to augment the Revision Manager services. After all of the Revision Manager variables have been loaded, the cache processing of the Revision Manager Daemon is performed in step 51.

Figure 10:
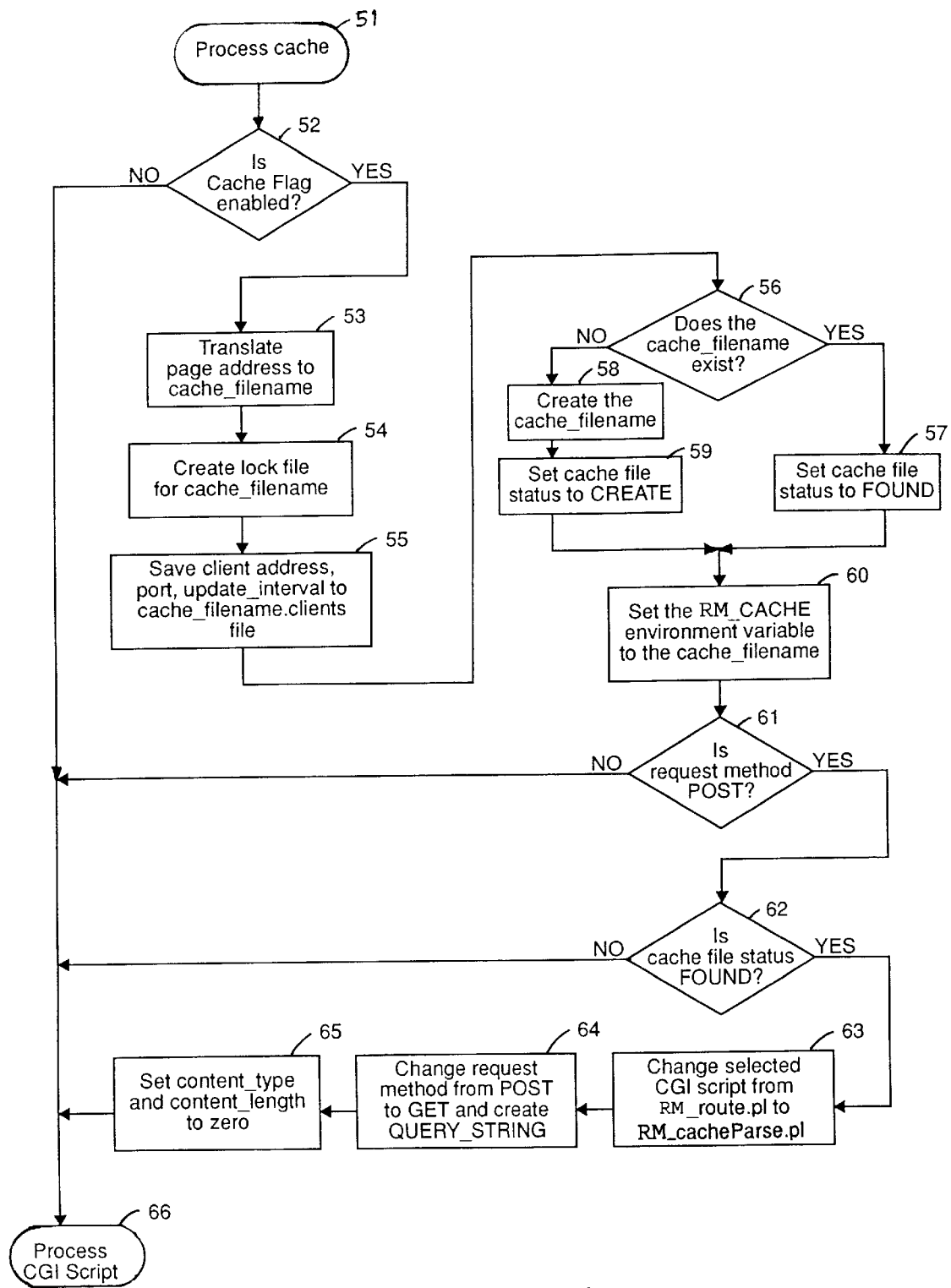
FIG. 10 is a flowchart of a procedure used by the Revision Manager Daemon to process the cache of the Revision Manager.

FIG. 10 shows in detail the cache processing step 51 introduced in FIG. 9. After the method of a request is processed, in step 51 the Revision Manager Daemon examines whether the requested document was cached previously in a local file. This question is answered by converting the variable "rm_url" to a full file path name and checking for the existence of this file. First, in step 52, "rm_url" is checked to ensure it has valid contents. Next, in step 53, a URL converter translates the URL to a full file path name.

For example, the URL http://www.teknowledge.com/company/Patent.html is converted to the filename /cache-root/http/www.teknowledge.com/company/Patent.html where "cache-root" is an alias to a directory name that is configured in the server's configuration file.

Because the Polling Daemon may attempt to access the same file concurrently with the Revision Manager Daemon, in step 54 a file lock is implemented to synchronize the file access. Locking is achieved by creating a lock file with a filename made by adding the suffix ".lock" to the cache file name. The lock file for the above example would be:

/cache-root/http/www.teknowledge.com/company/Patent.html.lock

If the lock file already exists, then the Polling Daemon waits a few seconds to finish processing and proceeds. A client file is created the same way as a lock file. In the above example, the client file would be:

/cache-root/http/www.teknowledge.com/company/Patent.html.clients

There is one client file per document cache file. Each client file contains information for multiple clients which are registered with the cache file. In this client file, each client's IP address, port number, update interval and current time are saved. The current time is saved as the last time a browser was updated. In particular, in step 55, the Revision Manager Daemon searches the cache for the client's entry in the client file, and if the client file has already been created, the last update time is changed to be the current time and no other change is made. If the client entry is not found, the client is added to the client file.

In step 56, the Revision Manager Daemon checks the cache to determine whether the cache file is in the cache. If the cache file is found, then in step 57, a cache lookup flag is set to "FOUND". Otherwise, in step 58, the cache file is created, and in step 59, the cache lookup flag is set to "CREATE". In step 60, an environment variable, "RM__CACHE" is set to be the cache filename. If the method of the request is "POST" (step 61) and the cache lookup flag is "FOUND" indicating that the cache file exists (step 62), then in step 63, the selected CGI script is changed from the "RM__route.pl" process to the "RM__cacheParse.pl" process. Both of these processes are Revision Manager Daemon CGI script processes. Because "RM__cacheParse.pl" expects a "GET" command, in step 64 the Revision Manager Daemon changes "POST" to "GET" and creates a "query__string" for "RM__cacheParse.pl", and in step 65 sets "content_type" and "content_length" to zero. Finally, in step 66, the Revision Manager Daemon processes the CGI script. The selected CGI script process is "RM__rout.pl" unless step 63 was performed, changing "RM__rout.pl" to "RM__cacheParse.pl".

Figure 11:
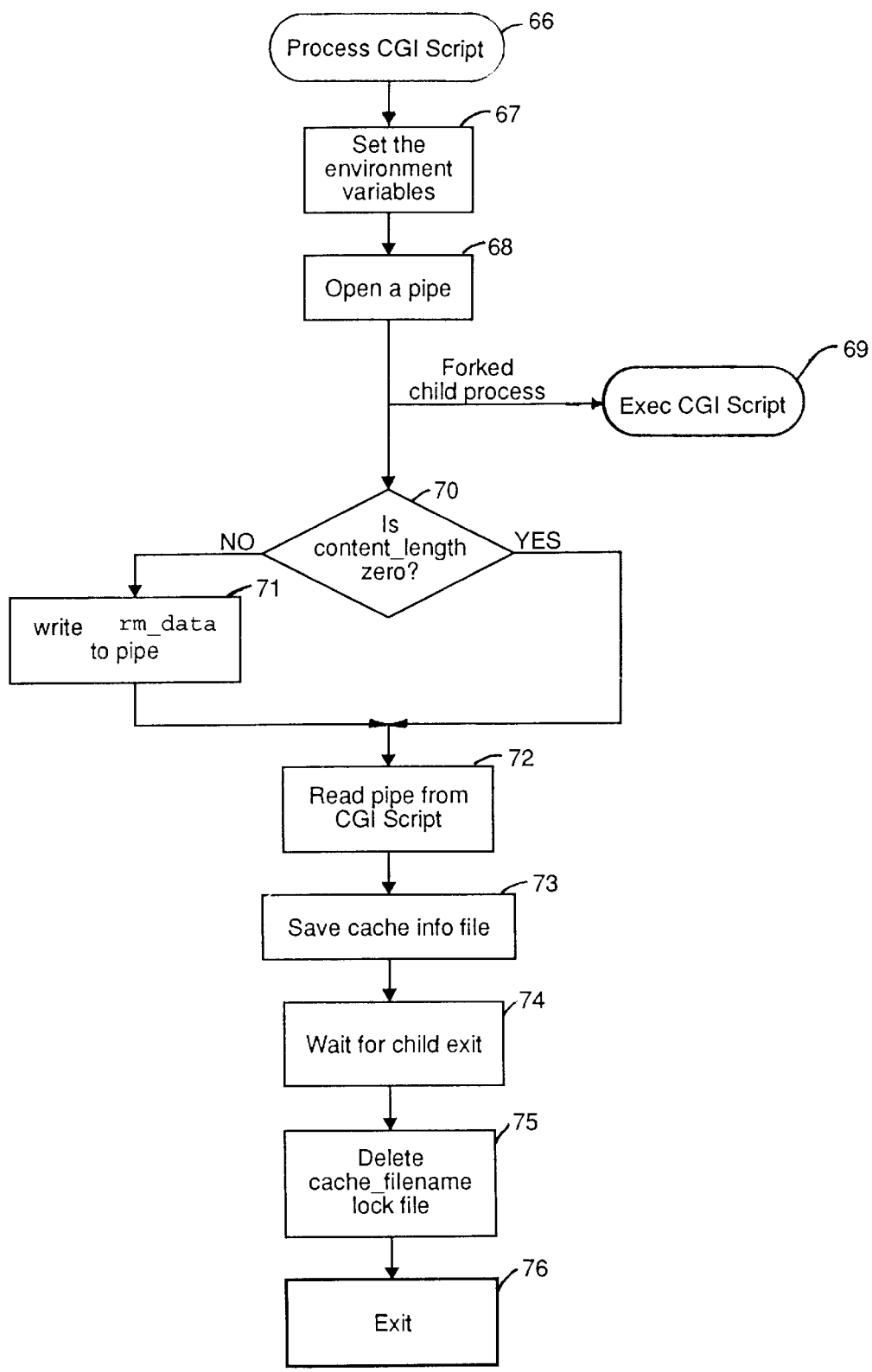
FIG. 11 is a flowchart of a procedure used by the Revision Manager Daemon to process a CGI script.

FIG. 11 shows how a CGI script is processed by the Revision Manager Daemon. Before spawning a child, in step 67 the Revision Manager Daemon sets a group of environment variables needed before an HTTPD server executes any CGI script program. Environment variables include "request_method", "query_string", "content_type" and "content_length". "request_method" indicates which method is requested by the client. "query_string" contains data information for the "GET" method. "content_type" and "content_length" contain data for the "POST" method. "content_type" refers to a CGI Form service (which is one type of CGI script service), "content_length" tells a CGI script how many bytes of data it should read from its standard input channel.

Next, in step 68, a pair of pipes is established for the communication between a child process and its parent process, and the child process 69 is forked and spawned. The child process 69 executes the selected script, and the selected script writes out a "result" document through its standard output. This standard output is the input pipe of the child's parent. There are two CGI scripts defined: "RM__route.pl" and "RM__cacheParse.pl". As noted above with respect to step 63 of FIG. 10, "RM__route.pl" is selected unless step 63 is reached, changing the selected script to "RM__cacheParse.pl". Therefore, if "RM__route.pl" has been selected, then execution is transferred in step 69 to an entry point 77 of the "RM__route.pl" routine beginning in FIG. 12, and if "RM__cacheParse.pl" has been selected, then execution is transferred in step 69 to an entry point 137 of the "RM__cacheParse.pl" routine beginning in FIG. 17.

If "content_length" is not zero, as tested in step 70, then in step 71 the parent process writes out "rm__data" to the pipe. The child process reads its standard input to get the contents of "rm__data". In step 72 of FIG. 11, the parent process reads the "result" document from the pipe. Then in step 73, the parent process captures the "Last-Modified" time stamp, and saves this time stamp into a cache information file such as:

/cache-root/http/www.teknowledge.com/company/Patent.html.cache__info

The document is then sent back to the browser.

One cache information file is established per directory of monitored WWW files. Inside the file, each cached file is represented by one line of data which contains the file name and last-modified time. After saving the cache information file and sending the WWW document back to the client browser, the parent process waits for the child process to exit (step 74), unlocks the lock file (step 75), and exits (step 76).

Figure 12:
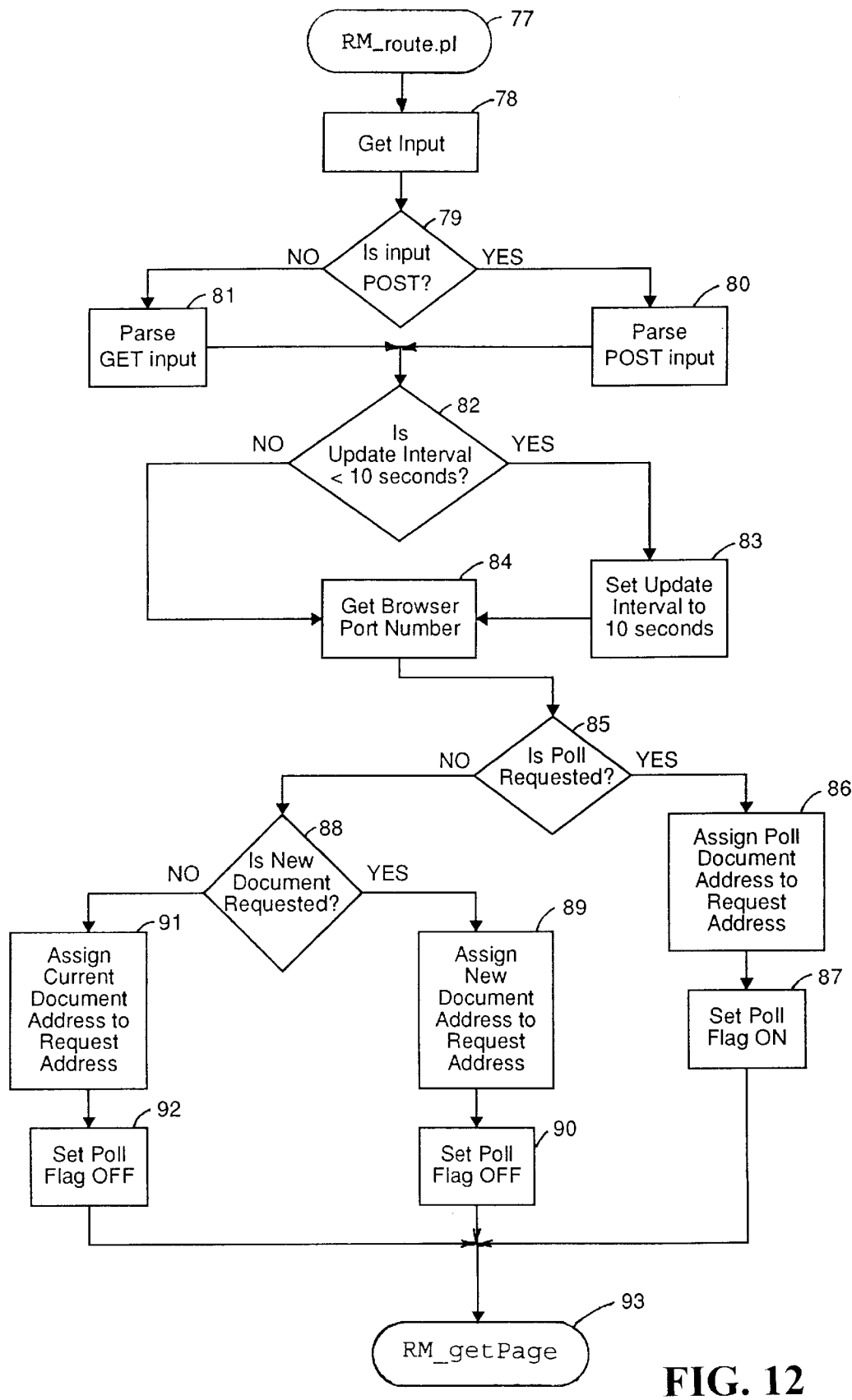
FIG. 12 is a flowchart for a "RM_route.pl" script processing routine.

Turning now to FIG. 12, there is shown a flowchart of a portion of the "RM__route" CGI script process of the Revision Manager, beginning with an entry point "RM__route.pl" 77. "RM__route" services the Revision Manager form "rm.html" (301 in FIG. 5) and various short forms attached to Revision Manager-monitored documents. An example of a short form 302 is shown in FIG. 6.

The function of "RM__route.pl" is to issue an HTTP request, get the requested document from a remote server, save the document to the cache file if requested by the user, and then translate all hyperlinks contained within the document, except for multimedia hyperlinks. The Revision Manager URL address is attached to the parsed hyperlinks as a prefix. All multimedia hyperlinks are then saved into a file with ".images" appended to the cache file name, such as:

/cache-root/http/www.teknowledge.com/company/Patent.html.images.

A short form is also attached to the document according to its current state. There are four states for short forms: document requested, acknowledgment of document update requested, document update in progress, and document updated. Finally, "RM__route.pl" sends the results document to its standard output, which is connected to the Revision Manager Daemon's pipe. The WWW document is then sent back to the client browser by the Revision Manager Daemon. When "RM__route.pl" begins in step 78 of FIG. 12, it gets the input "request_method", and inspects the "request method" in step 78 to decide how to access the data. If the "request method" is "POST", then the POST input string is parsed in step 80; otherwise, the "GET" input string is parsed in step 81. According to the CGI protocol, in step 80 a CGI process gets data from its standard input when the command is "POST". The data length is determined by the environment variable "CONTENT_LENGTH". If the command is "GET", the process gets its data in step 81 through a command line argument or the environment variable "QUERY_STRING". For either command, the data includes values for "port_number", "url_get", "url_poll", "url_previous" and "update_interval". "Port_number" refers to the CCI port number of a client browser, such as Mosaic. The combination of a port number and a host computer's IP address uniquely identifies a client. This also offers a way for the Revision Manager to communicate with the client. "url_get" contains the URL requested from a client. "url_poll" is a flag to inform the Revision Manager that the user wants to be notified if the contents of the document identified by the given URL has changed. "url_previous" remembers the currently displayed document's URL. "update_interval" indicates how long the time interval should be between two consecutive updates.

Since update intervals smaller than 10 seconds are generally not feasible in the Internet environment due to bandwidth-induced response delays and tend to flood the network, the update interval is compared to a minimum of 10 seconds in step 82, and if the update interval is less than 10 seconds, the update interval is set to 10 seconds in step 83.

In step 84, the browser port number is obtained from the input data. In step 85, execution branches on the state of the "url_poll" flag. If "url_poll" is set, then in step 86, the poll document address is assigned to the request address since the request address is the URL to request for a polling service, and in step 87, a poll flag is set ON. Otherwise, if "url_poll" is not set, then "url_get" is inspected in step 88 to determine whether "url_get" is loaded with a value; if so, then a new document is being requested by the user, and in step 89 the new document address is assigned to the request address. Otherwise, if "url_poll" is not set and "url_get" is empty, then "url_previous" contains the requested document, so in step 91 the current document address is assigned to the request address. Since "url_poll" is not set in the latter two situations, the "poll" flag is set to be "OFF" in step 90 or 92. In step 93, "RM_route.pl" transfers execution to a procedure "RM_getPage" to request the HTML document specified by the request address from a remote server.

Figure 13:
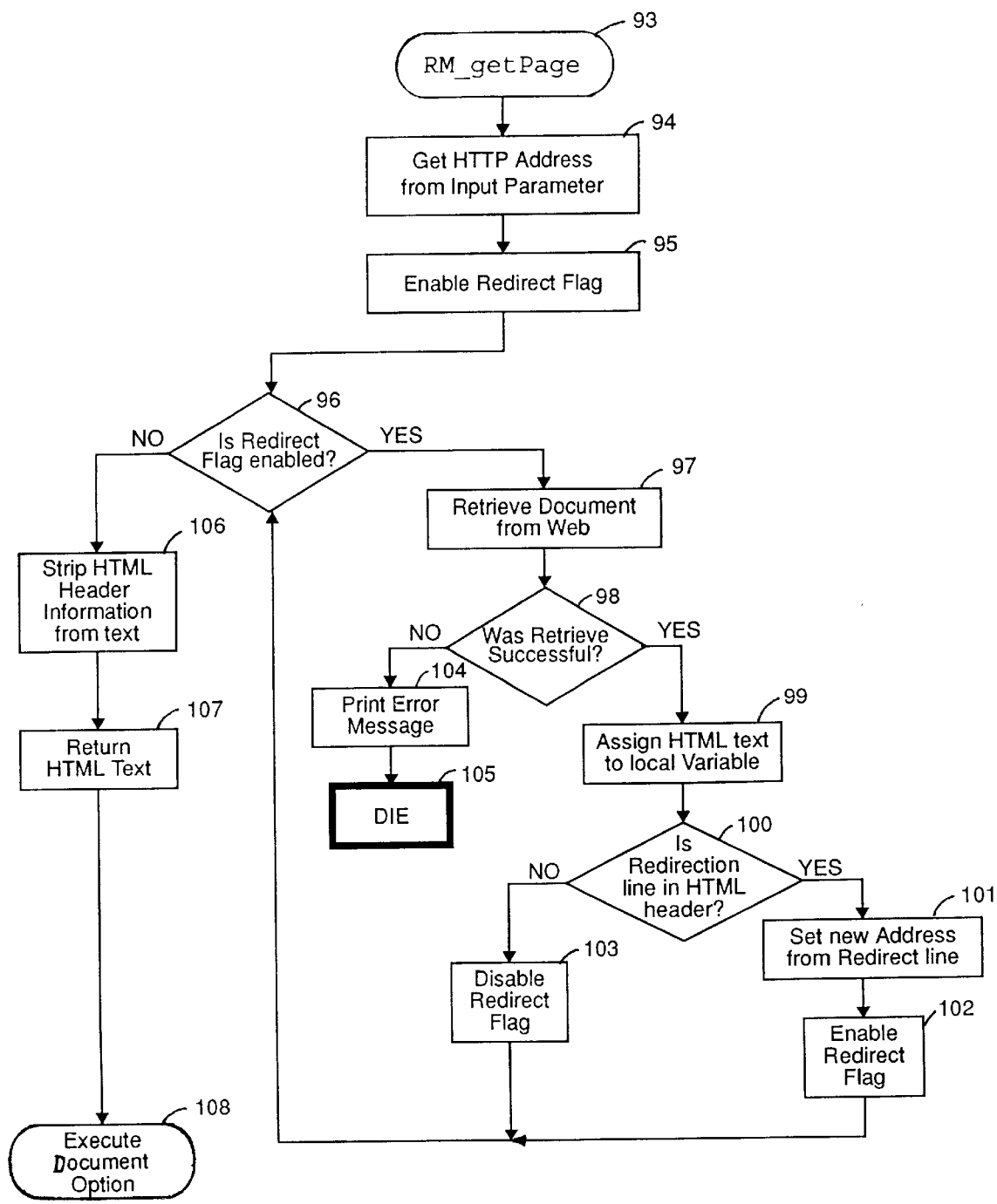
FIG. 13 is a flowchart of a procedure for fetching a page of a requested document.

FIG. 13 shows the steps in the procedure "RM_getPage" to request the HTML document from a remote server. In step 94, the procedure receives a URL from its command line argument. In step 95, the procedure sets the "redirect" flag to trigger document fetching.

In step 96, the procedure "RM_getPage" begins a routine to fetch a document. First, in step 96, the routine checks the "redirect" flag, and if it is set, in step 97, the procedure connects to the remote server and sends a "GET" command with a complete listing of HTTPD acceptance parameters. In step 98, the procedure then checks for error conditions when a response is received, and if the document retrieval was successful, then in step 99 the procedure saves the document into a buffer by assigning the HTML text to a local variable, and in step 100 the procedure checks whether a redirection response is received (step 100). A redirection response is sent by an HTTPD server when a URL no longer points to a valid document and a Location header advises the requester where the new location is. The redirection response is a particular line in the HTML header. A requester that receives this type of response should issue another request with the correct location to get the document, which is done in step 101 by setting the new address to the address in the redirect line in the HTML header, and in step 102 by enabling the redirect flag. If a redirection response is not received, the redirect flag is enabled. After steps 102 or step 103, execution returns to step 96 whether or not a redirection occurs. If the remote server returns an error condition, then in step 104 the process prints or otherwise flags an error condition in step 104 and exits in step 105.

After a valid document is returned, the document fetching procedure "RM-getPage" is done, and "RM_route.pl" strips the HTTP header information in step 106, and starts an Execute Document Option in step 108 to process the document.

Figure 14:
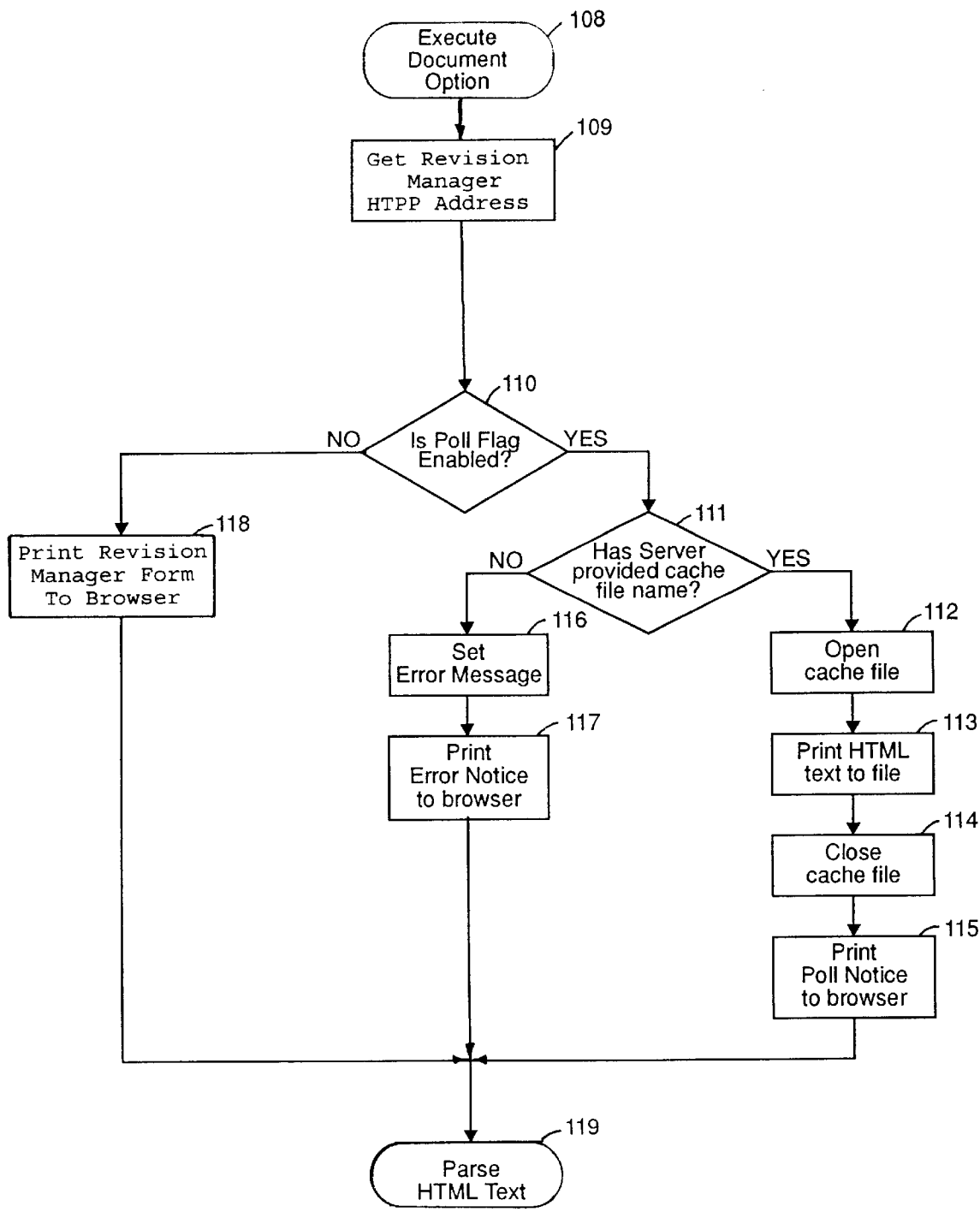
FIG. 14 is a flowchart of a procedure for executing a document option.

Turning now to FIG. 14, there are shown steps of the Execute Document Option. In step 109, the Revision Manager HTTP address is obtained. If "url_poll" is set, as tested in step 110, the document needs to be cached because the Revision Manager Daemon updates clients with documents based on the contents of the cached files. The file pathname of the cache file has already been resolved by the Revision Manager Daemon prior to the execution of "RM_route.pl", and an environment variable "RM_CACHE" is loaded with the cache file pathname. "RM_route.pl" uses this environment variable (obtained in step 109) to save the original document into the cache file in steps 112 to 114 and attach a short form to the document in step 115 to send a poll notice to be displayed by the browser.

The original document is saved into the cache file by opening the cache file in step 112, writing the HTML text to the cache file in step 113, and closing the cache file in step 114. As a precaution, if "RM_CACHE" is not set by the Revision Manager Daemon, as tested in step 111, then an error message is set and attached to the document in step 116 and the error message is sent to the browser in step 117. If "url_poll" is not set, then in step 118, a regular short form is attached to the document to send a poll notice to be displayed by the browser. Step 119 is reached after any of steps 115, 117 or 118. In step 119, execution continues to a procedure for parsing the received document.

Figure 15:
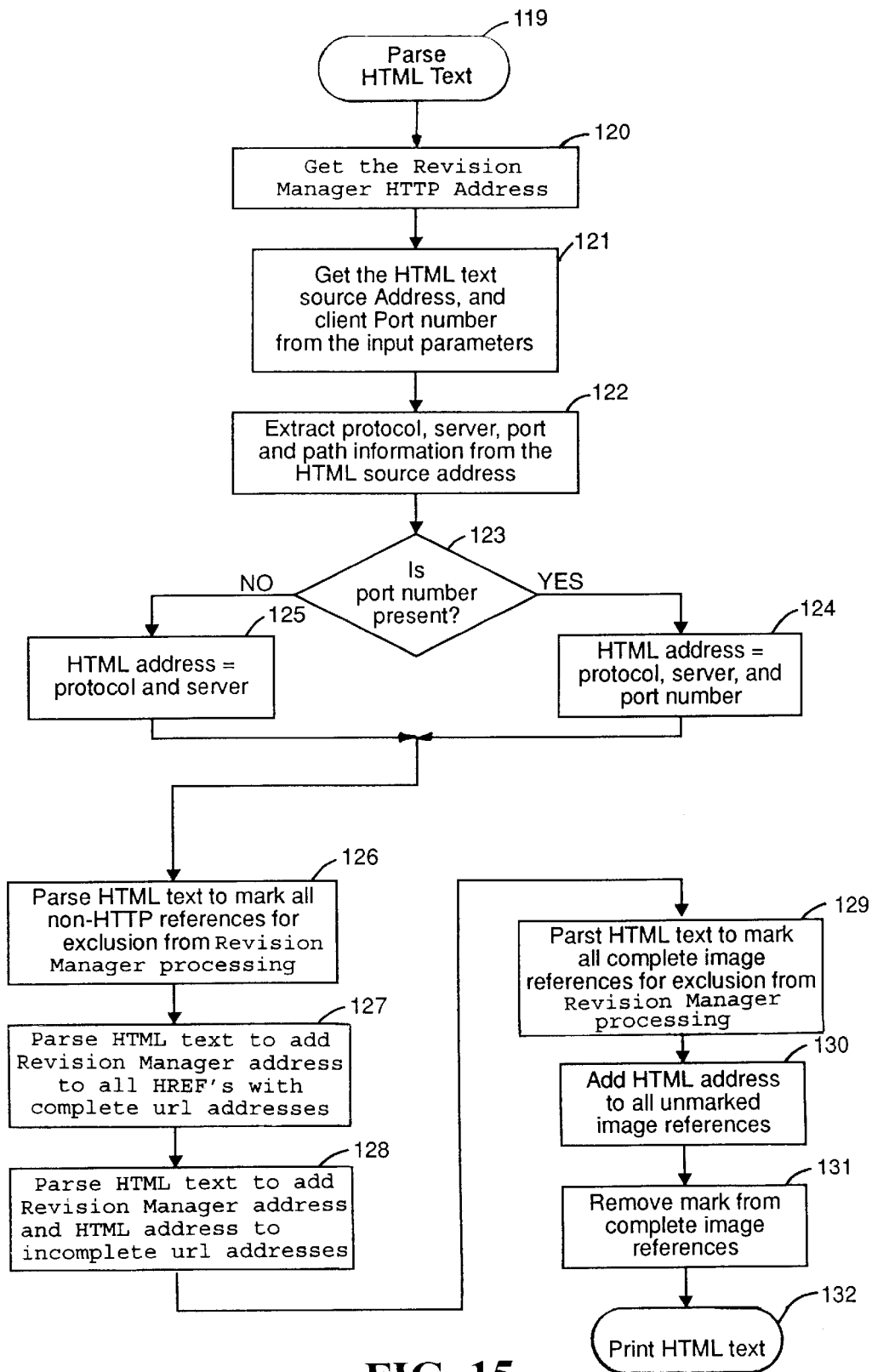
FIG. 15 is a flowchart of a procedure for parsing HTML text.

FIG. 15 shows the procedure for parsing the received document. The goal of parsing the document is to translate resource locators by attaching the address of the Revision Manager and some other information to existing hyperlink URLs so that whenever a user clicks on a hyperlink within the document, the browser will send the request to the Revision Manager instead of to a remote server that is the hyperlink's original destination. This mechanism enables the Revision Manager to intercept the traffic between a client browser and remote servers.

In order to complete the URL translation task, several variables are needed: the Revision Manager's HTTP address, URL protocol, URL server, URL port number, URL path information, and client's CCI port number. In step 120, the Revision Manager's HTTP address is obtained. In step 121, the HTML text source address, and client port number are obtained from the input parameters. In step 122, the protocol, server, port and path information are extracted from the HTML source address. Execution branches in step 123 depending on whether the client port number is present. If the client port number is present, then in step 124, the Revision Manager's address and the port number are added to all URLs containing HTTP hyperlinks in addition to their absolute paths. Otherwise, in step 125, the Revision Manager's address is added to all URLs containing HTTP hyperlinks without using a port number.

HTML has many forms of hyperlinks. HTTP hyperlinks only contain the path associated with a document. Some other forms of HTML hyperlinks contain path information AND query information or data information such as "http://host/cgi-bin/imagemap?0,0".

Next, all relative path URLs with HTTP hyperlinks are changed to absolute path URLs and the Revision Manager's address and client port number are added to the front of the URLs. This is done by marking all non-HTTP references for exclusion from processing in step 126, parsing the HTML text to add the Revision Manager's address to all HREF's with complete URL addresses in step 127, parsing the HTML text to add the Revision Manager's address to incomplete URL addresses in step 128, parsing the HTML text to mark all complete image references for exclusion from Revision Manager processing in step 129, adding HTML addresses to all unmarked image references in step 130, and removing marks from complete image references in step 131. A typical example of a translation would be to change:

http://www.teknowledge.com/company/Patent.html to http://rm.teknowledge.com/cgi-bin/RM_route.pl?port_number8040/http://www.teknowledge.com/company/Patent.html After the document is parsed and modified, it is routed to standard output by continuing in a procedure for printing HTML text in step 132.

Figure 16:
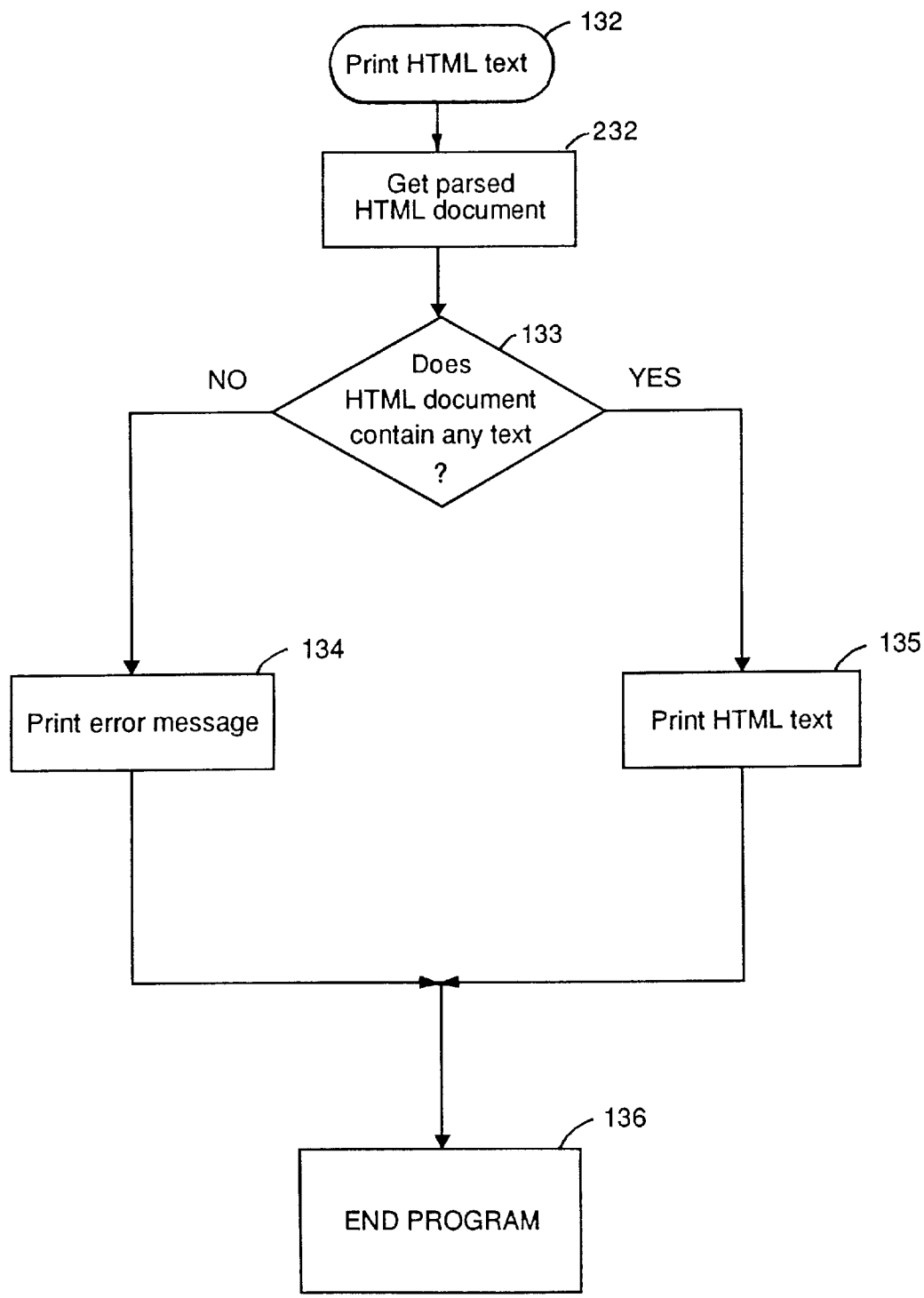
FIG. 16 is a flowchart of a procedure for printing HTML text.

FIG. 16 shows the procedure for printing HTML text. In step 232, the parsed HTML document is obtained. Execution branches in step 133 depending on whether or not the HTML document contains any text. If not, then an error has occurred, and in step 134 an error message printed by sending it to standard output. Otherwise, in step 135, the HTML text is printed by sending it to standard output. After step 134 or 135, the program "RM_route.pl" then terminates in step 136.

Figure 17:
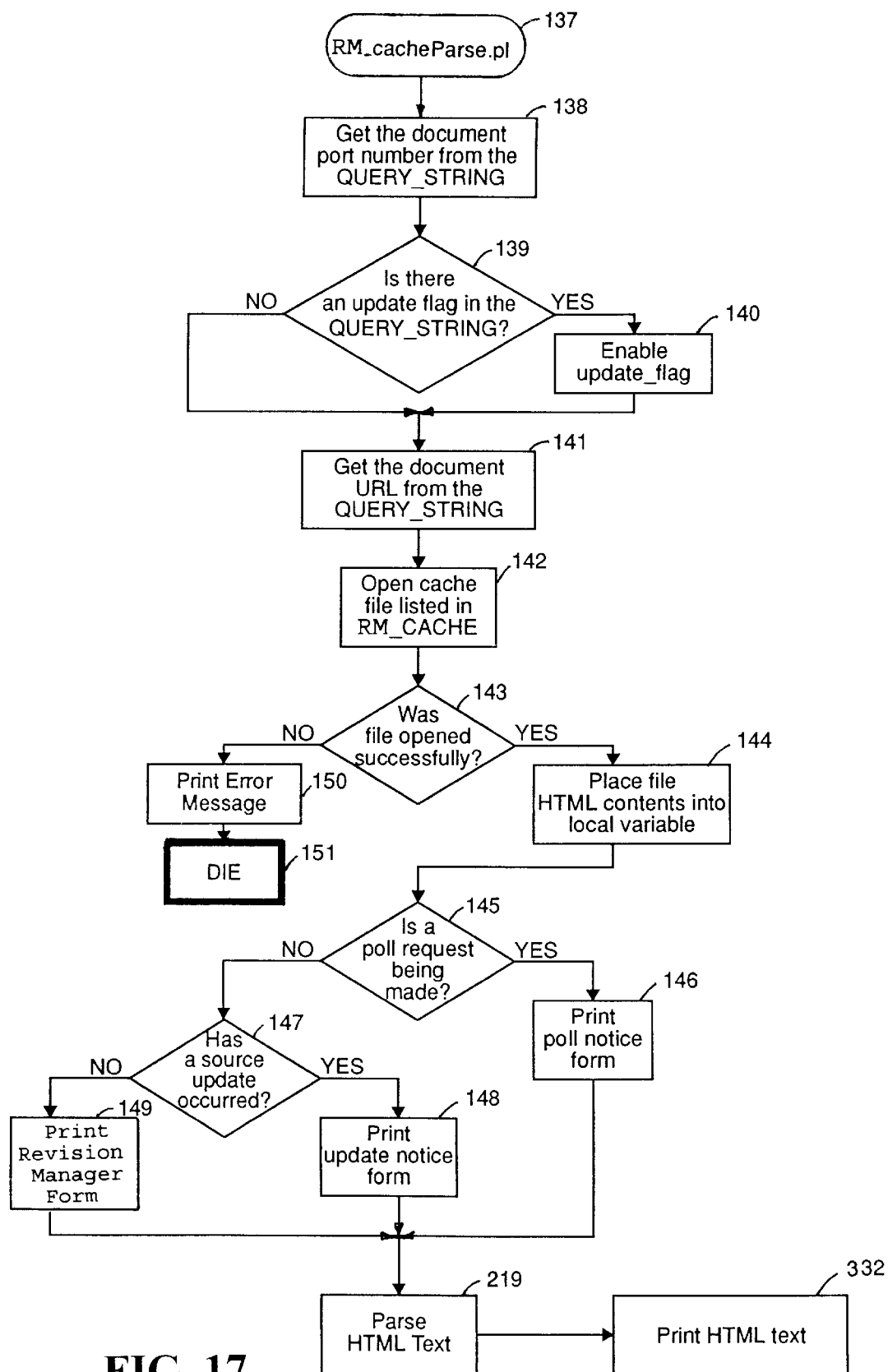
FIG. 17 is a flowchart for a "RM_cacheParse.pl" script processing routine.

FIG. 17 shows a flowchart of the beginning portion of a program "RM_cacheParse.pl", which is entered in step 137. The program "RM_cacheParse.pl" is called by the Revision Manager Daemon when a requested document is found in the cache directory. Before calling "RM_cacheParse.pl", the Daemon has created an environment variable "QUERY_STRING" which contains a client's port number, poll request interval and update flag. "RM_cacheParse.pl" gets the port number from "QUERY_STRING" in step 138, checks "update_flag" in step 139, and if it is an updated page, sets the "update_flag" in step 140. The URL is extracted from "QUERY_STRING" in step 141, the cached document file is opened in step 142, and if the file was opened successfully, as tested in step 143, then the file contents are read into a local variable in step 144. If a polling request has been made, as tested in step 145, then a polling notice short form is attached in step 146 to display the polling notice form on the browser. If "update_flag" is set, as tested in step 147, then an update notice short form is attached in step 148 to print the update notice form; otherwise, a Revision Manager form is attached in step 149 to print the Revision Manager form. Then, in step 219, "RM_cacheParse.pl" parses the HTML text, by performing the same procedure as described above with respect to steps 120 to 131 of FIG. 15, and in step 332, the HTML text is printed, as described above with respect to steps 132 to 136 in FIG. 16, which ends the "RM_cacheParse.pl" program.

If the cached document file is not found on the disk in step 143, the "RM_cacheParse.pl" program sends an error message to the browser in step 150 and then terminates in step 151.

Figure 18:
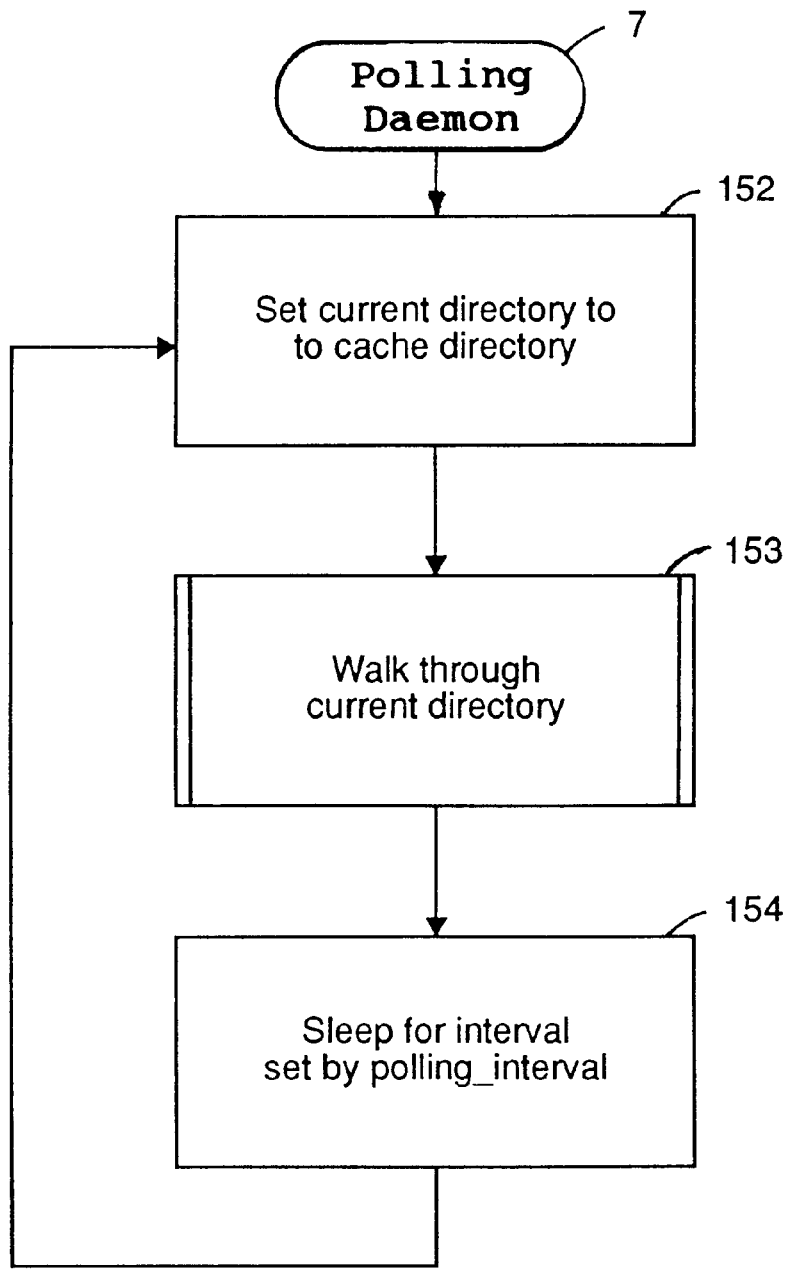
FIG. 18 is a flowchart of a Polling Daemon of the Revision Manager.

FIG. 18 shows a flowchart of the Revision Manager Polling Daemon 7. The Revision Manager Polling Daemon 7 is a child process of the Revision Manager Daemon (6 in FIG. 2). The Revision Manager Polling Daemon 7 never exits unless it is killed manually. The Revision Manager Polling Daemon 7 sleeps for a startup-configurable time interval in step 154, wakes up, accesses the cache root directory in step 152, and starts to process every document file entry in step 153. A cache root directory is a disk directory which can be specified in the HTTPD server configuration file. Whenever a document is registered by a user to be monitored, it is saved in this directory.

Figure 19:
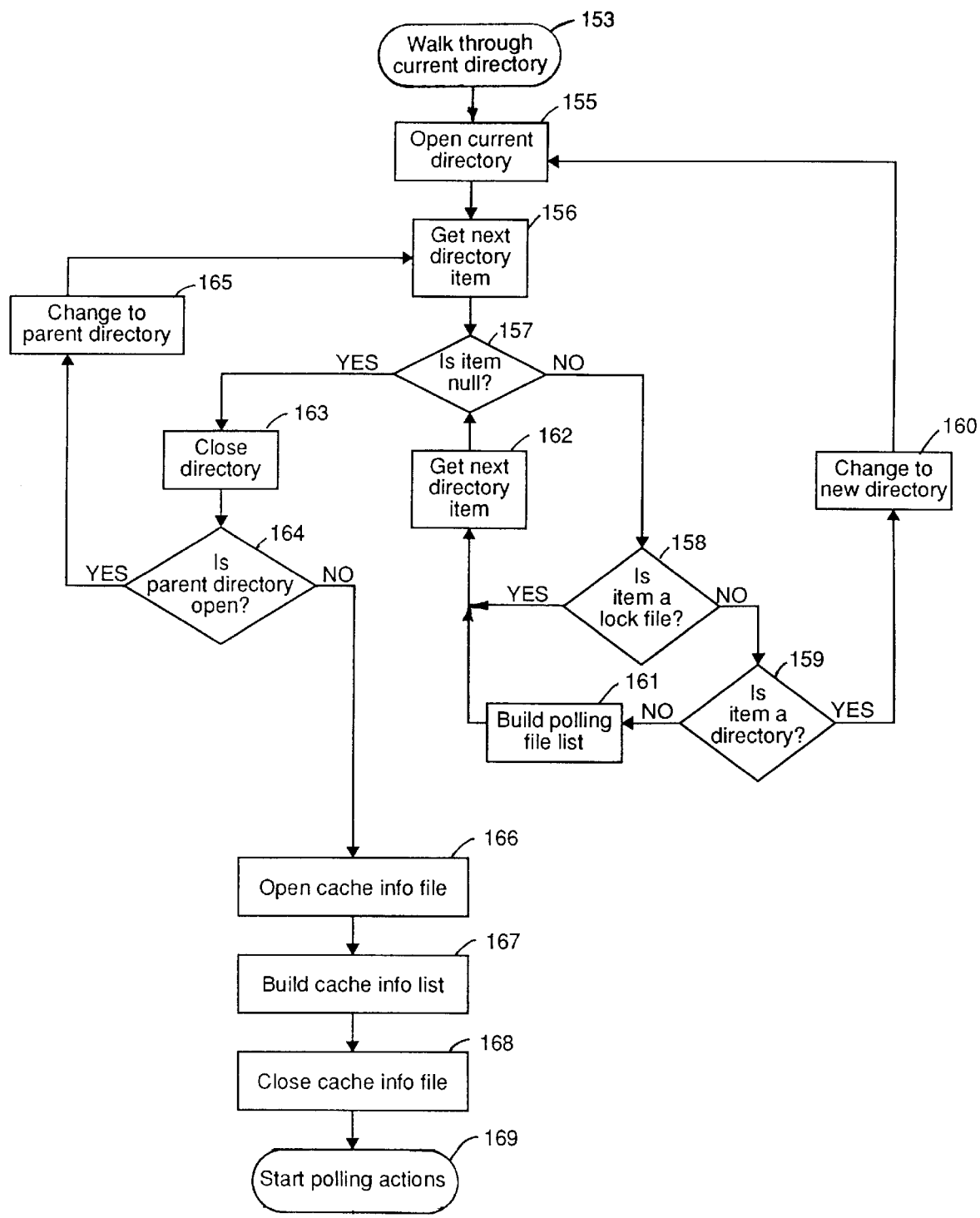
FIG. 19 is a flowchart of a procedure used by the Polling Daemon to walk through a current directory to build a polling list.

As shown in FIG. 19, to walk through the current directory, the Polling Daemon opens the directory in step 155, and loops to access each item in the directory in step 156, which can be a subdirectory or a file, and checks each item in step 157. If the item is not null, execution branches from step 157 to step 158. In step 158, the Polling Daemon checks whether the item is a lock file (such as the lock file created in step 54 of FIG. 10), and if not, then in step 159 the Polling Daemon checks whether the item is a directory. If an item in the cache root directory is also a directory, a recursive call takes place in step 160 by changing the next directory to new directory, and execution loops back to step 155 to process the subdirectory. If the item is a lock file, then execution branches from step 158 to step 162 where the Polling Daemon gets the next directory item. In other words, if the item is a lock file, the Polling Daemon skips this item and goes to the next item in the directory. Otherwise, if the item is not a directory, then in step 162 the Polling Daemon puts this file item into its polling file list. The polling file list is an array of N entries, each entry containing a linked list of filenames. A filename is stored by a simple hash function which calculates the sum of the ASCII values of a filename, and then computes the modulo-N remainder to obtain the array index number. The daemon continues checking each item until a null item is found in step 157, indicating that no more items remain in the directory, whereupon the directory is closed in step 163. Then in step 164, the daemon checks whether the parent directory is open. If so, then in step 165 the current directory is changed to the parent directory, and execution loops back to step 156. Otherwise, execution continues to step 166.

In step 166, a cache information file is opened. One cache information file is created per cache directory which contains all document file names in the directory and their last-modified times. When a document is sent by a remote server, the server usually attaches an HTTP header item called Last-Modified. The time stamp it provides is the time when the document was last updated. The Revision Manager Daemon saves this time value to the cache information file when it creates the cache file. In step 167, the cache information file is read and a linked list of cache file information is built in memory, and in step 168 the file is closed. At this point, the software is ready to begin polling, which is performed in step 169. After polling is finished, execution returns in step 170, since the Polling Daemon has completed all of the functions in step 153 of FIG. 18.

Figure 20:
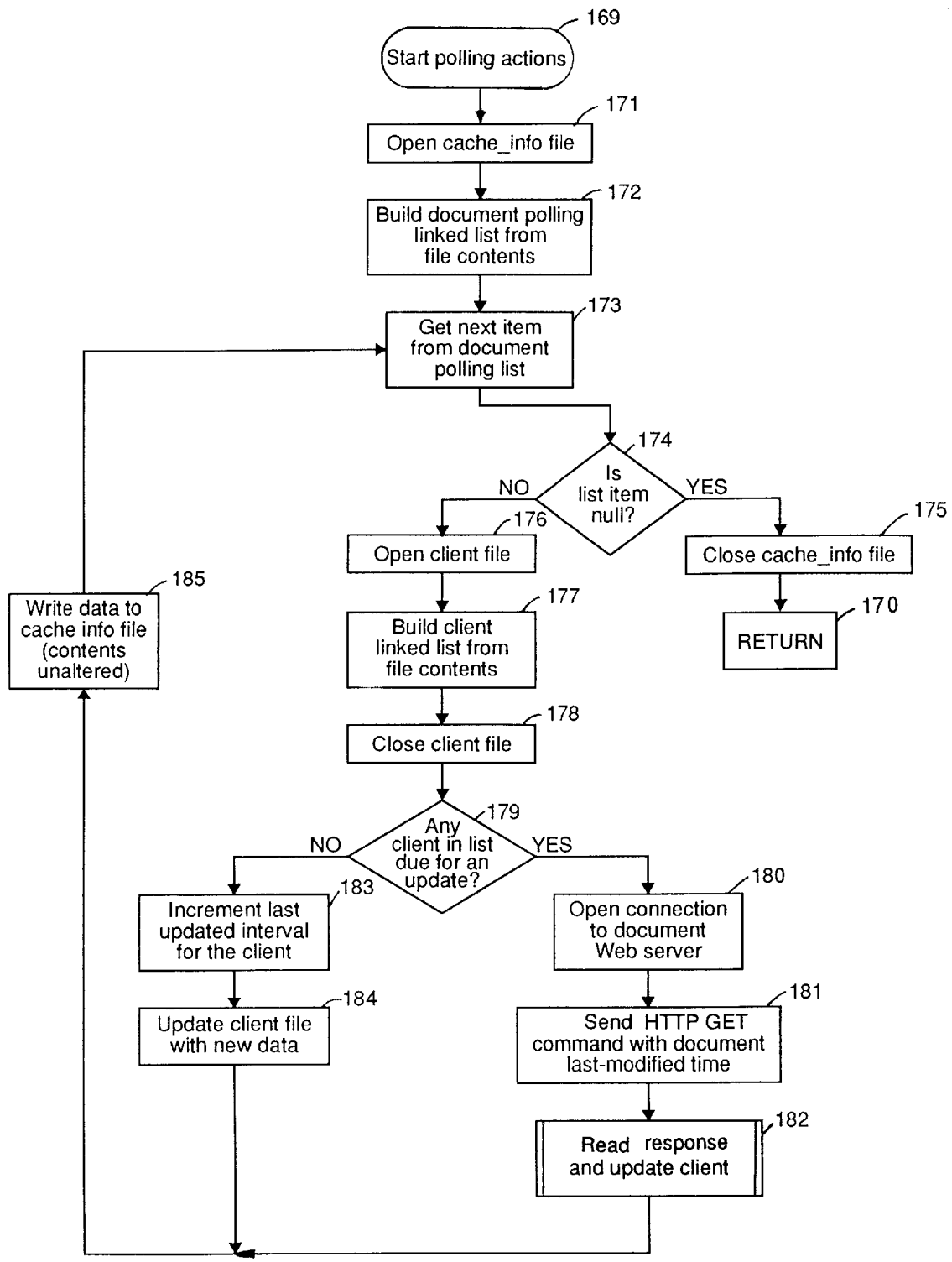
FIG. 20 is a flowchart of a polling action procedure used by the Polling Daemon for fetching documents in the polling list that are of interest to client browsers.

FIG. 20 shows the steps for polling documents by the Revision Manager Polling Daemon. During the polling process, some of the cache files may be deleted due to error messages sent by the remote server indicating that the original files have been deleted. The last-modified times of some documents will change, so it becomes necessary to rebuild the cache information file to reflect the most recent changes. Therefore, in step 171, the cache information file is reopened for writing. Next, in step 172, a document polling linked list is created from the file contents. Then each item in the polling file list is obtained from the list in step 173 and examined in a loop, starting with the first item and ending with the last item. When the end of the list is reached in step 174, the cache information file is closed in step 175, and execution returns in step 170.

For each WWW document file accessed by any client(s) via the Revision Manager, there is a client file which is created and maintained by the Revision Manager Daemon. This file contains the names of all registered clients, their addresses, port numbers, update intervals and times of last update. In steps 176 to 178, the client file is read into a linked list called the client list. In particular, the client file is opened in step 176, a client linked list is created in step 177 from the client file contents, and the client file is closed in step 178. The client list is searched in step 179 to determine whether any client is due to be updated. This is achieved by adding the last-update time to 50% of its update interval, then comparing the sum with the current time.

If the current time is more than 50% of a client's update-due time, polling of the appropriate documents is initiated in step 180 by establishing a connection to the remote server. Next, in step 181, an HTTP "GET" command with an If-Modified-Since header is constructed and sent to the remote Web server. The time value of "If-Modified-Since" is the last-modified time value saved in the cache information file. This time value was provided by the same remote server during the last access. Then, in step 182, a subroutine is called to read the server response and update the client file. This subroutine is further described below with reference to FIG. 21.

If there is no client due for updating, then the last updated interval for the client is incremented in step 183, the client file is written back in step 184 with the modified last-update time. After step 182 or step 184, the cache information is written back unchanged in step 185.

Figure 21:
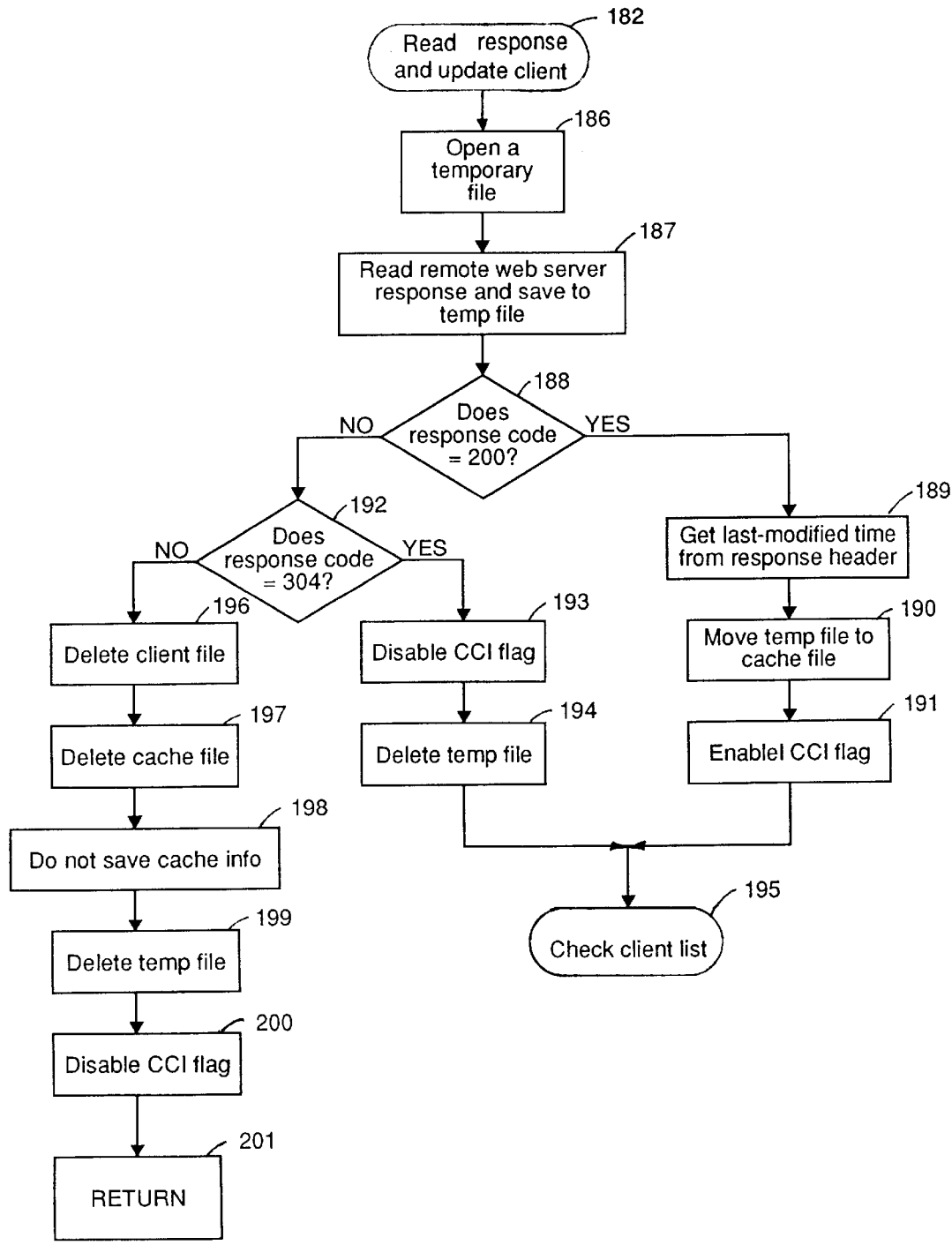
FIG. 21 is a flowchart of a procedure used by the Polling Daemon for checking the status of a response to a request for a document of interest in order to update the Revision Manager cache.

The subroutine for reading the remote web server response and updating the client file is shown in FIG. 21. As introduced above with reference to FIG. 20, when the Revision Manager Polling Daemon wakes up, if the current time is more than 50% of a client's update-due time, polling of the appropriate documents is initiated; otherwise, no action is taken. If polling occurs, and results in an update, then the client's last-update time is set to be the current time. Polling starts with a network connection to a remote Web server (step 180 in FIG. 20). An HTTP "GET" command with an "If-Modified-Since" header is sent to the remote web server (step 181 in FIG. 20). Then in step 186 of FIG. 21, a temporary file is opened to save the incoming data from the remote web server. In step 187, the response from the remote web server is read into the temporary file. In step 188, a response status code is inspected in the response from the web server and compared to a value of 200, and in step 192, the response status code is compared to a value of 304. According to the HTTP protocol, status code 200 means an updated document is attached. In this case, there is a header in the response stating the time when this document was last modified, and this header is obtained in step 189. This time value is scanned and saved into a cache file list in step 190. Later on, when the cache file list is saved back to disk, this value is saved to reflect the most recent time this document was modified. The temporary file holding the new document is saved as a permanent cache file and the original cache file is deleted. A CCI flag is enabled in step 191, and this flag is used later to control updating of a client.

Status code 304 means the document has not been modified since the queried time so that no document data is sent. In this case, the CCI flag is disabled in step 193, and the temporary file is deleted in step 194. After steps 191 or 194, execution continues in step 195 to a procedure for checking the client list. This will be described below with reference to FIG. 22.

In FIG. 21, if a status code other than 200 or 304 is returned, the Revision Manager interprets this as an error condition. This behavior could be modified or extended so that the other status codes could provide additional functionality. For example, the server could be modified to provide special operating functions or data transmission modes for use by the Revision Manager, and the additional status codes could convey information from the host about these special operating functions or data transmission modes.

When a status code is received that is considered to indicate an error condition, the client file is deleted in step 196, the cache file is deleted in step 197, the cache information file is modified to remove this file item in step 198, and the temporary file is deleted in step 199. The CCI flag is disabled step 200, and in step 201 execution returns (to step 185 in FIG. 20).

Figure 22:
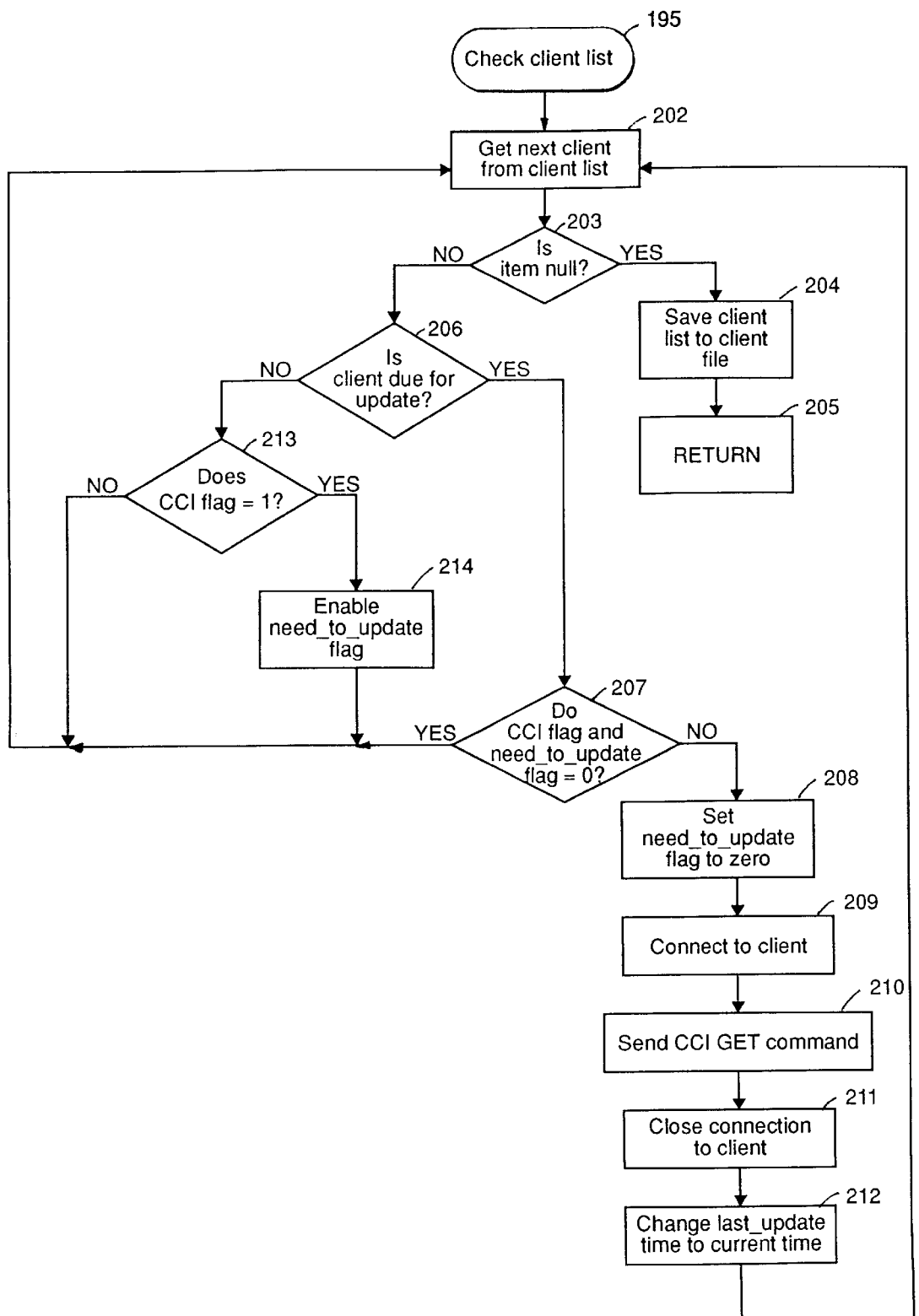
FIG. 22 is a flowchart of a procedure used by the Polling Daemon for checking a client list in order to determine whether to notify clients that the Revision Manager cache has a revised version of a document of interest.

FIG. 22 shows a flowchart of the procedure for checking the client list. The client list is checked in a loop beginning in step 202. Each item in the client list represents a client browser registering interest in the associated WWW document within the cached document file. The item is a data structure which contains the client's IP address, port number, updating interval, last time of update and a needs-to-be-updated flag. The next client is obtained from the client list in step 202 beginning with the first client in the list and continuing until the end of the list is detected in step 203. Whether a client is due for updating is decided in step 206 by comparing the sum of its last updating time and 50% of the updating interval with the current time. If it is not due, the CCI flag is inspected in step 213, and when the CCI flag is set, the needs-to-be-updated flag is set in step 214. The needs-to-be-updated flag is used to remind the Polling Daemon to update the client the next time the due time is met.

If a client is due for updating 206 and either the CCI flag or the needs-to-be-updated flag is found to be set in step 207, the update starts. First, the needs-to-be-updated flag is disabled in step 208, a connection is made to the client in step 209, a CCI "GET" command is sent to the client in step 210, and the connection is closed in step 211. Since the Polling Daemon already has the most recent document saved in the cache, the "GET" command tells the client to get the document from the Revision Manager. This is done by adding the Revision Manager's URL address to the beginning of the document's address. An example would be:
GET URL
   <http://
     SomeRevisionManager.CompanyName.com:8042/cgi-
     bin/RM__cacheParse.pl?port__ number8080+update/
     http://www.teknowledge.com/

This command is not an HTTP command; instead, it is a CCI command. The first address is the Revision Manager's address. "RM__cacheParse.pl" is the CGI script to be executed to process this request, "port__number" is the client's port number and is used to identify which client is sending the request. "update" is a flag to tell "RM__ cacheParse.pl" that this is an updating request and is used to represent a client's state. This flag enables "RM__ cacheParse.pl" to attach the correct short form with a message stating that this is an updated page to the browser's user. After a browser receives this "GET" command, it will issue a "GET" command to the Revision Manager Daemon, pass the provided query information (port number and update flag) to the Revision Manager Daemon, and receive and display the updated page.

In step 212 the Polling Daemon changes the client's last updated time to be the current time. Then in step 202 the Polling Daemon obtains the next client from the client list to begin processing of the next client until all of the clients in the client list have been processed as determined in step 203. When all clients have been processed, the client file is saved back in step 204, and execution returns in step 205 to step 185 in FIG. 20, where the cache information file is updated, and the polling process is repeated for the next item from the document polling list. When all of the items from the document polling list are processed, the cache information file is closed in step 175 of FIG. 20, and execution returns in step 170 to step 160 to continue to process any parent directory if a recursive call had occurred in step 160, or otherwise, when all cache directories have been processed, to step 154 of FIG. 18 where the Polling Daemon goes back to sleep.

FIGS. 23 to 30 show an example of what a user of a client browser sees when interacting with the Revision Manager. In this example, the browser is Mosaic 2.6 for Xwindows, and the Revision Manager is incorporated into a prototype HotBox (Trademark) software agent of Teknowledge Corporation, the assignee of this patent application.

Figure 23:
FIG. 23 shows the display screen of a browser in which a user has accessed a Revision Manager.

FIG. 23 shows the display screen of the Mosaic browser after the user has accessed the Revision Manager by fetching the document "Teknowledge HotBox". This document includes a form similar to the form 301 of FIG. 5, so that the user may enter the URL of the desired Web page and the port number through which the HotBox (Trademark) software agent may communicate with the browser.

Figure 24:
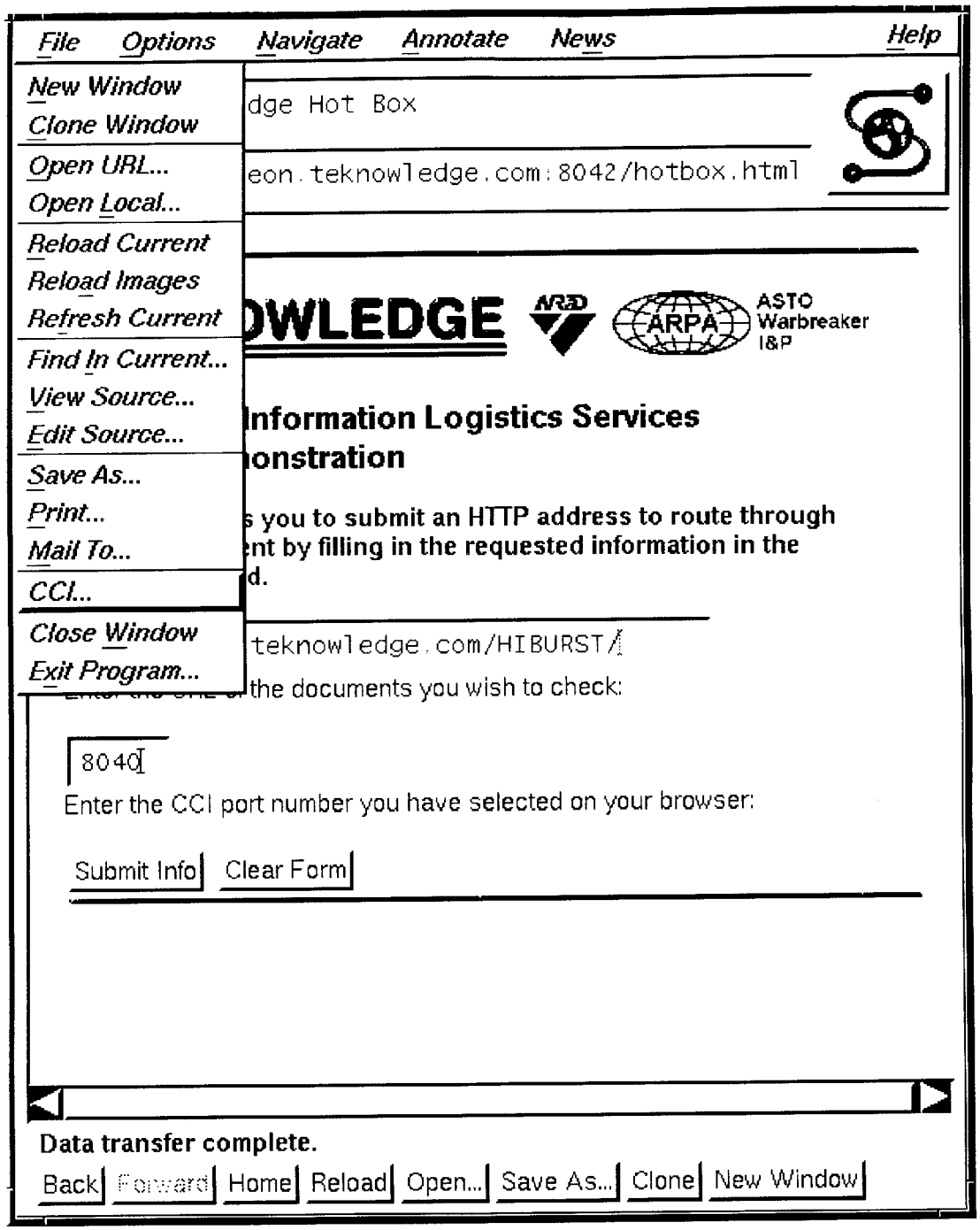
FIG. 24 shows the display screen of the browser when the user is selecting a CCI option in a file pull-down menu.

FIG. 24 shows the display screen of the browser when the user is selecting a CCI option in a file pull-down menu. This file pull-down menu is provided by the Mosaic browser. In general, the method of setting up communication with a server or a Revision Manager is specific to the particular browser.

Figure 25:
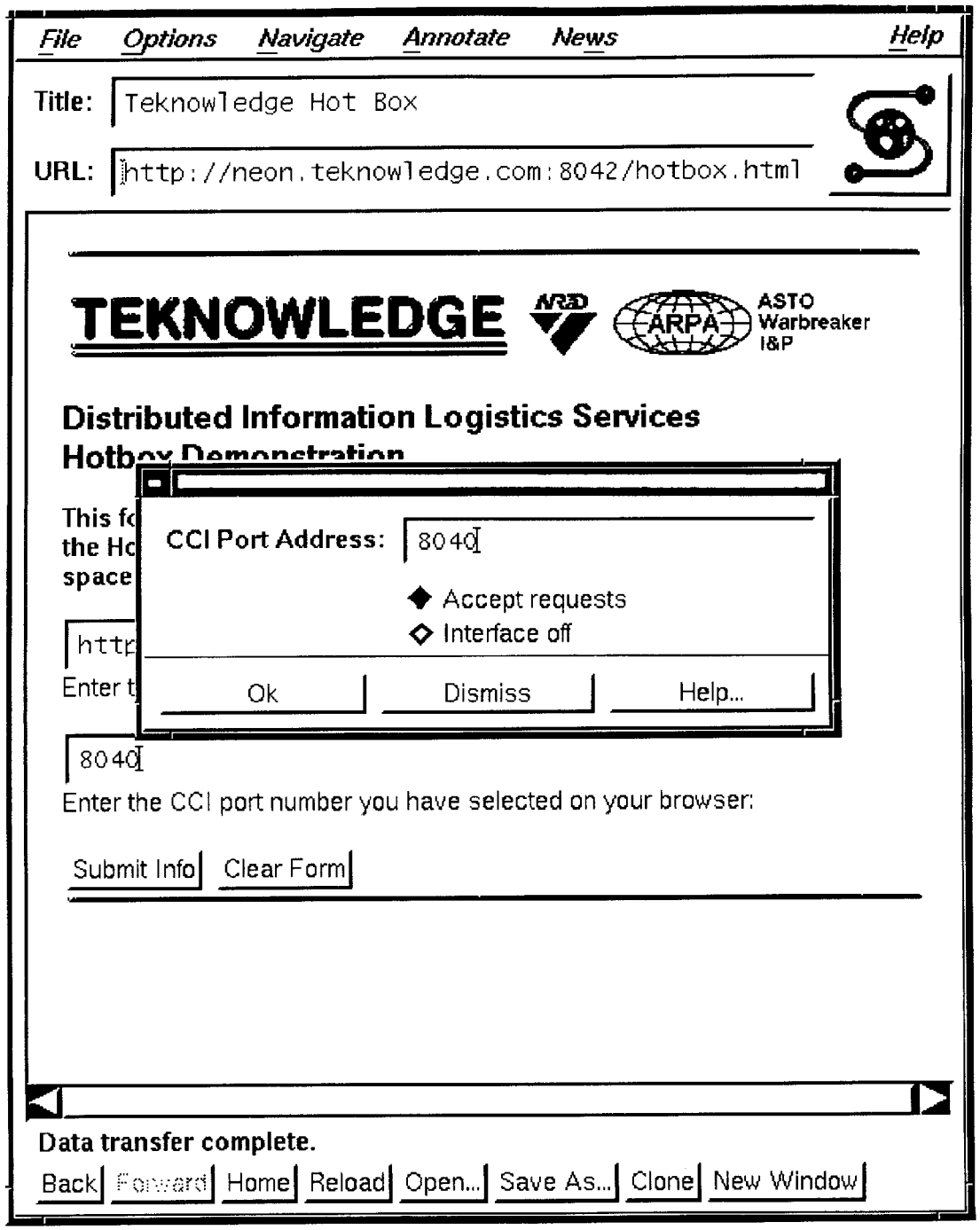
FIG. 25 shows the display screen of the browser when the CCI option presents a dialog box.

FIG. 25 shows the display screen of the browser once the user has selected the CCI option. The CCI option presents a dialog box centered on the display screen. The dialog box requests the user to enter the port number through which to listen for commands, and a switch to turn the communications mode on. The port number "CCI Port Address" entered on this dialog box should be the same port number that was entered in FIG. 23 as "the CCI port number you have selected on your browser." Once the user enters the port number through which to listen for commands, the CCI option confirms that it is listening on the port. The user can then click on either the "Submit Info" button or the "Clear Form" button.

Figure 26:
FIG. 26 shows the display screen of the browser when the Revision Manager presents an interface short form for selecting the options of registering the currently displayed document for update notification, or retrieving another Web page.

FIG. 26 shows the display screen of the browser in response to the user clicking on the "Submit Info" button. The submitted information includes "http://www.teknowledge.com/HIBURST/", which is the URL of the document that the user wishes to check. Therefore, the Revision Manager fetches this document, attaches a short form similar to the form 302 of FIG. 6, and returns the document and attached form to the browser. The browser displays the document and the short form to the user. The short form presents the user with the options of registering the currently displayed document for update notification, or retrieving another Web page. The user also has the option of clicking on a hypertext link on the current page, which will cause the linked Web page to be retrieved.

Figure 27:
FIG. 27 shows the display screen of the browser when the user has entered an update interval of 30 seconds into the interface short form.

FIG. 27 shows the display screen of the browser when the user has entered an update interval of 30 seconds into the interface form. The user then clicks on the checkbox to the left of "Alert me on source update for:", causing the currently displayed document to be selected for update notification. If the user has not entered an update interval when the checkbox is clicked on, then a default value will be used (such as 10 seconds as set in step 83 of FIG. 12). The Revision Manager and browser then responds as shown in FIG. 29.

Figure 28:
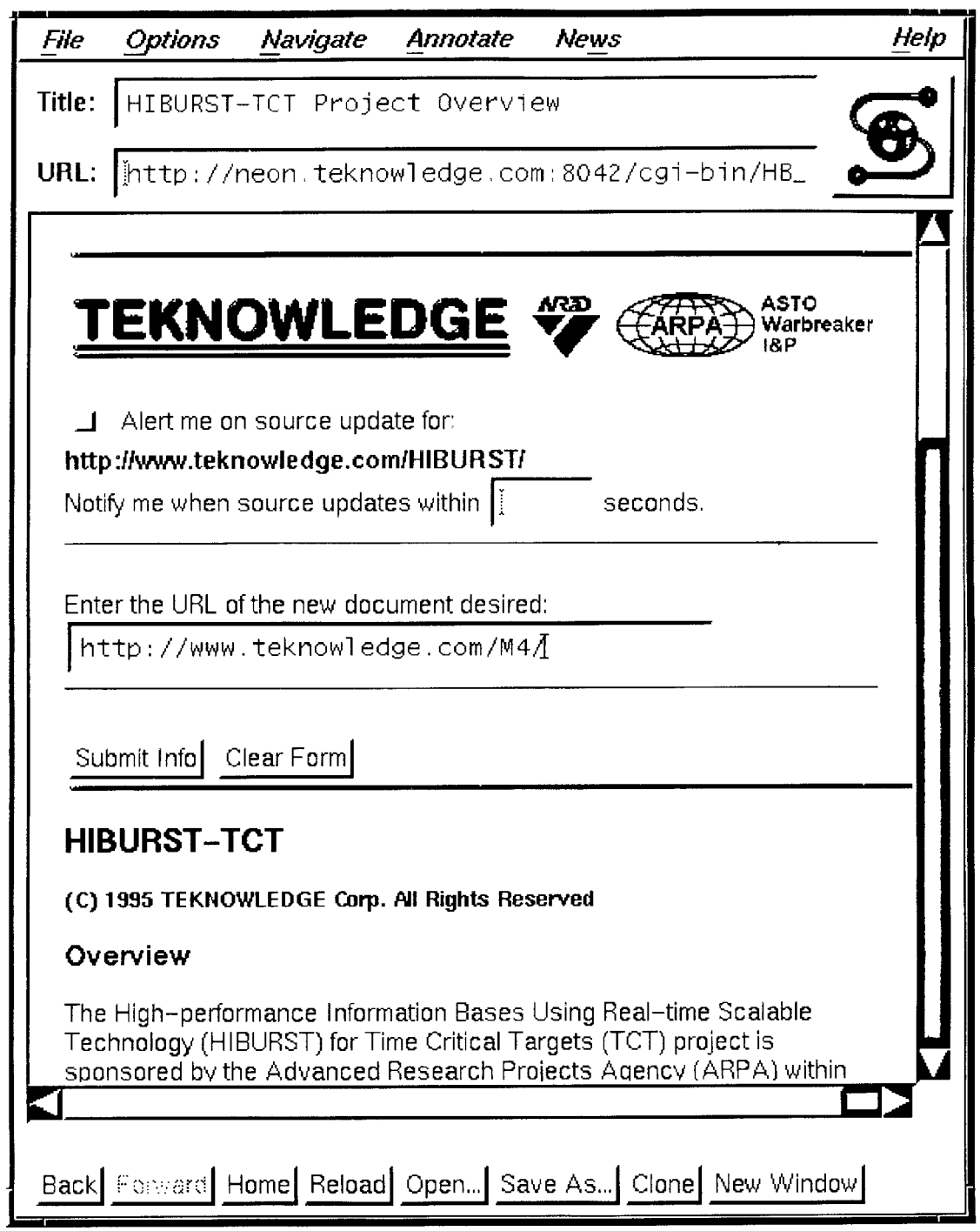
FIG. 28 shows the display screen of the browser when the user has entered a new Web page address.

FIG. 28 shows the display screen of the browser as it would appear if the user enters a new Web page address, instead of entering an update interval as shown in FIG. 27. This new Web page address is http://www.teknowledge.com/M4/. Once entered, the Revision Manager and browser would fetch and display this new Web page. Should the user type in a new Web page address and then click on the checkbox to the left of "Alert me on source update for:", then the Revision Manager and Browser would fetch this new page, and also register this new page as a document selected for update notification.

Figure 29:
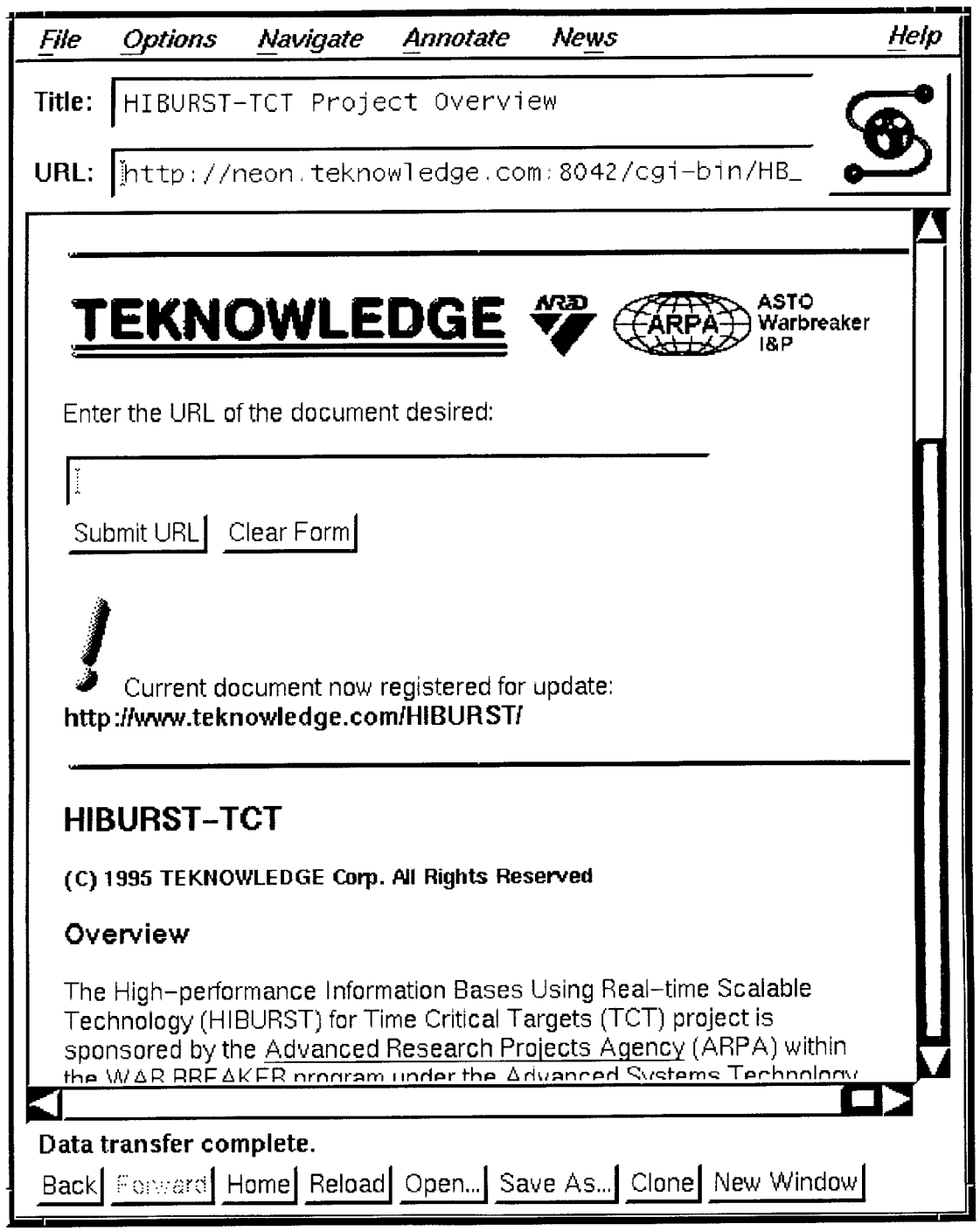
FIG. 29 shows the response of the Revision Manger to the user registering the document for update notification.

FIG. 29 shows the response of the Revision Manger to the user registering the document http://www.teknowledge.com/HIBURST/ for update notification.

The Revision Manager responds with a confirmation message "Current document now registered for update: http://www.teknowledge.com/HIBURST/." The Revision Manager also keeps displaying "Enter the URL of the document desired:" followed by a blank space so that the user may retrieve new documents as well.

Figure 30:
FIG. 30 shows the Revision Manager notifying the user of an update to the document.

FIG. 30 shows the Revision Manager notifying the user of an update to a document having been registered for update notification. The display of the updated document http://www.teknowledge.com/HIBURST/ is informational only; the user is not expected to enter any information into the overlaid display window.

As described above, the invention provides a method to update any number of clients from any number of servers without making any changes to currently existing HTTP clients or HTTPD servers. However, the invention can also provide various other DILS services for clients to reduce latency and communication costs for members of a group with interests in similar objects. In this case, it may be desirable to change existing network file servers and client-server protocols in order to further reduce latency and communication costs for managing multiple versions of objects and reporting changes in objects to interested clients.

In the preferred embodiment described above, the Revision Manager communicated to an HTTP-compliant browser (Mosaic) using a CCI notification protocol. Not all Browsers today support CCI nor are all of them necessarily capable of receiving notifications from the Revision Manager. The Revision Manager, however, can be implemented readily using other notification means and many new browsers will support CCI over time. Each browser and notification protocol can be supported with straightforward variations from the CCI implementation disclosed here.

The Revision Manager could also notify groups of parties about changes made to objects. For example, when a database is modified to include information about a new publication in a certain technical field, then the Revision Manager could notify all of the members of a technical society interested in the publication. The Revision Manager could include, in its list of interested parties, a group name such as "Society of AI Engineers," and send a notification to the Society of AI Engineers along with information about the new publication. Upon receipt of the notification, the Society of AI Engineers would forward the notification and information to all of its members interested in receiving notifications about new publications in the technical field. Groups could be formed solely for the purpose of forwarding information to persons sharing a common interest, and collecting subscription fees to finance the distribution of information. Such organizations could be organized in a hierarchical fashion, to efficiently distribute information to various sections or chapters of members interested in specific information. For example, the hierarchies of clients could be defined in a single Revision Manager, or one Revision Manager could forward change notifications to another Revision Manager to provide a structurally hierarchical network.

Figure 31:
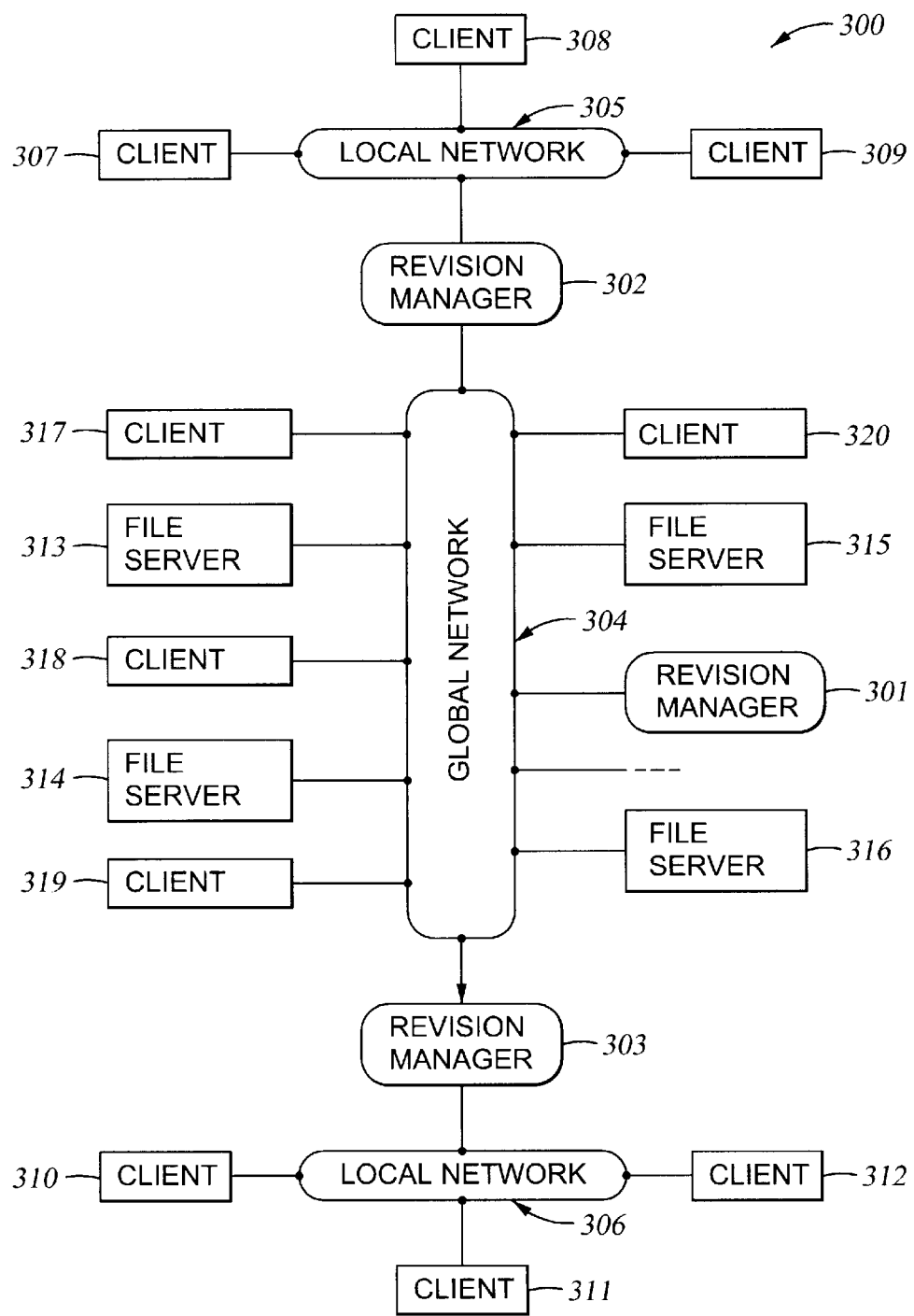
FIG. 31 is a schematic diagram of a data network employing multiple distributed Revision Managers to optimize access and storage of multiple versions of objects.

An example of a distributed data processing system employing especially adapted network file servers and client-server protocols will now be described with reference to FIGS. 31 to 46. Turning first to FIG. 31, there is shown a schematic diagram of a data network generally designated 300 employing multiple distributed Revision Managers 301, 302, 303 to optimize access and storage of multiple versions of objects. The multiple Revision Managers may be used in the distributed environment to provide multiple sources of the same frequently accessed documents as a means of assuring robustness over potential system failures and providing alternative sources that could be accessed to reduce latency and communications costs. In addition, the multiple Revision Managers may be organized to group documents by interest area to reduce the number of times users with similar interests are required to make long-distance retrievals for objects not in the Revision Manager cache.

The data network 300 includes a global network interconnection 304 and two local network interconnections 305 and 306. The Revision Manager 302 serves as a buffer between the first local network 305 and the global network 304, and the Revision Manager 303 serves as a buffer between the second local network 306 and the global network. This network architecture would be useful, for example, in an electronic library system of a university or research center. In this case, each local network 305, 306 would interconnect neighboring clients having a similar technical interest and provide a very high speed data link to a cache memory of its associated Revision Manager 302, 303, which would store copies of objects related to the similar technical interest. For example, clients 307, 308 and 309 are linked by the first local network 305 to the Revision Manager 302, and clients 310, 311 and 312 are linked by the second local network 306 to the Revision Manager 303. The original sources of the objects would be file servers connected to the global network interconnection 304, such as the file servers 313, 314, 315, and 316.

The data network 300 may also have one or more Revision Managers connected only to the global network interconnect 304, such as the Revision Manager 301. The Revision Manager 301, for example, could service clients connected only to the global interconnect 304, such as clients 317, 318, 319, and 310. The Revision Manager 302 need not cache objects related only to a particular field of interest, but instead would assist in notifying neighboring clients of changes in objects originally stored in neighboring file servers. In the data network 300 of FIG. 31, the number of Revision Managers and their placement or location in the network would be chosen to fix latency problems and to reduce cost. Additional Revision Managers could be added to the data network 300 so long as there would be an improvement in an expected value of some objective function in probability over a distribution of expected access by the clients.

Figure 32:
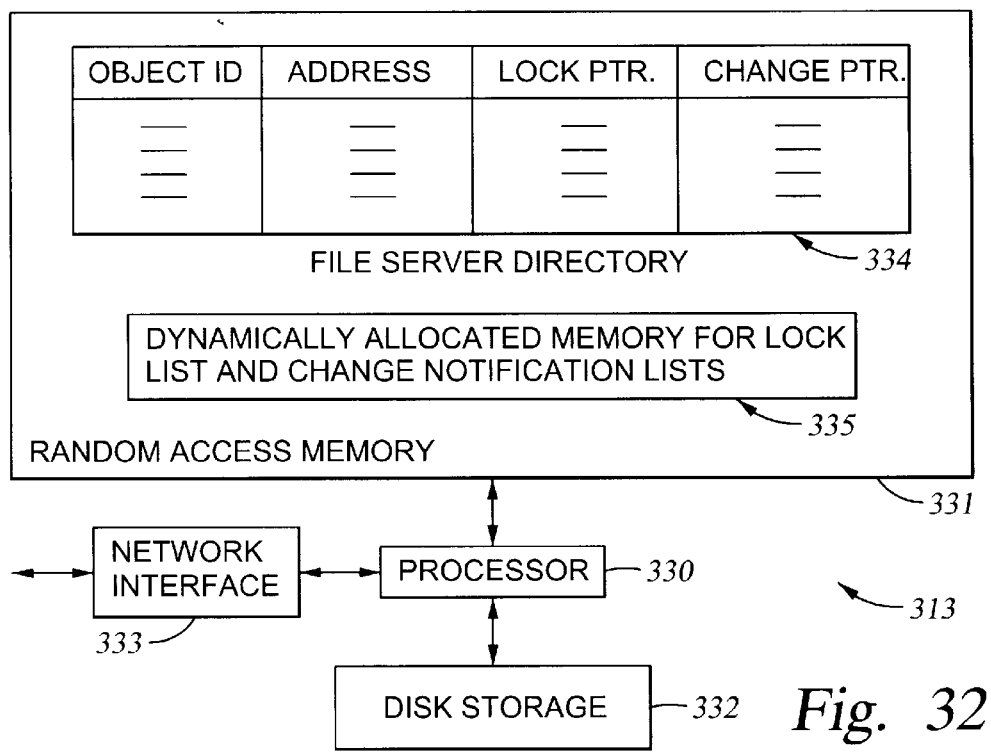
FIG. 32 is a schematic diagram of a file server adapted to notify interested parties when changes are made to objects stored in the file server for use in the data network of FIG. 31.

Turning now to FIG. 32, there is shown a schematic diagram of the file server 313 which has been especially adapted to notify interested parties when changes are made to objects stored in the file server. The file server 313 includes a processor 330, a random access memory 331, disk storage 332, and a network interface 333. To find the location in the disk storage 332 of a requested object, at least a portion of a file server directory 334 is accessed in the random access memory 331. A nonvolatile copy of this file server directory is kept in the disk storage 332, in order to provide back-up for the directory or to reduce the necessary capacity of the random access memory 331.

As shown in FIG. 32, the file server directory 334 is a table including a unique object identifier for each object in the disk storage, an address of the object in the disk storage 332, an associated lock pointer, and an associated change pointer. As is conventional, the lock pointer is zero if the object is not locked, and otherwise points to a lock list of clients in a pool of dynamically allocated random-access memory. The lock list identifies the type of lock, the network clients holding the lock, and network clients that are waiting for a lock on the object and that will be notified if and when they are granted the lock on the object.

In the file server directory 334, the associated change pointer (CHANGE PTR.) is zero if no clients are interested in being notified of changes in the object, and otherwise points to a change list for the object. The change list is in the dynamically allocated portion 335 of the random access memory 331. The change list includes a list of the clients that are interested in being notified of changes in the object. The change list could also include other information to permit the network file server 313 to perform additional Revision Manager functions that will be further described below. For example, the change list could include change notification methods to be used for notifying clients of changes to the objects, or time-value calculations to determine whether changes in particular objects are significant enough to each client to require notification of the client of the change. In this example, however, the change list includes only the list of clients to be notified so as to reduce the amount of overhead and modification of the file server 313 needed to provide change notification service. Further in this example, all of the clients in the change list are Revision Managers, so that the Revision Managers relieve the file server of the burden of notifying all of the interested network clients of changes to the objects of interest in the file server 313, and of distributing new versions of the objects of interest to the interested clients.

Figure 33:
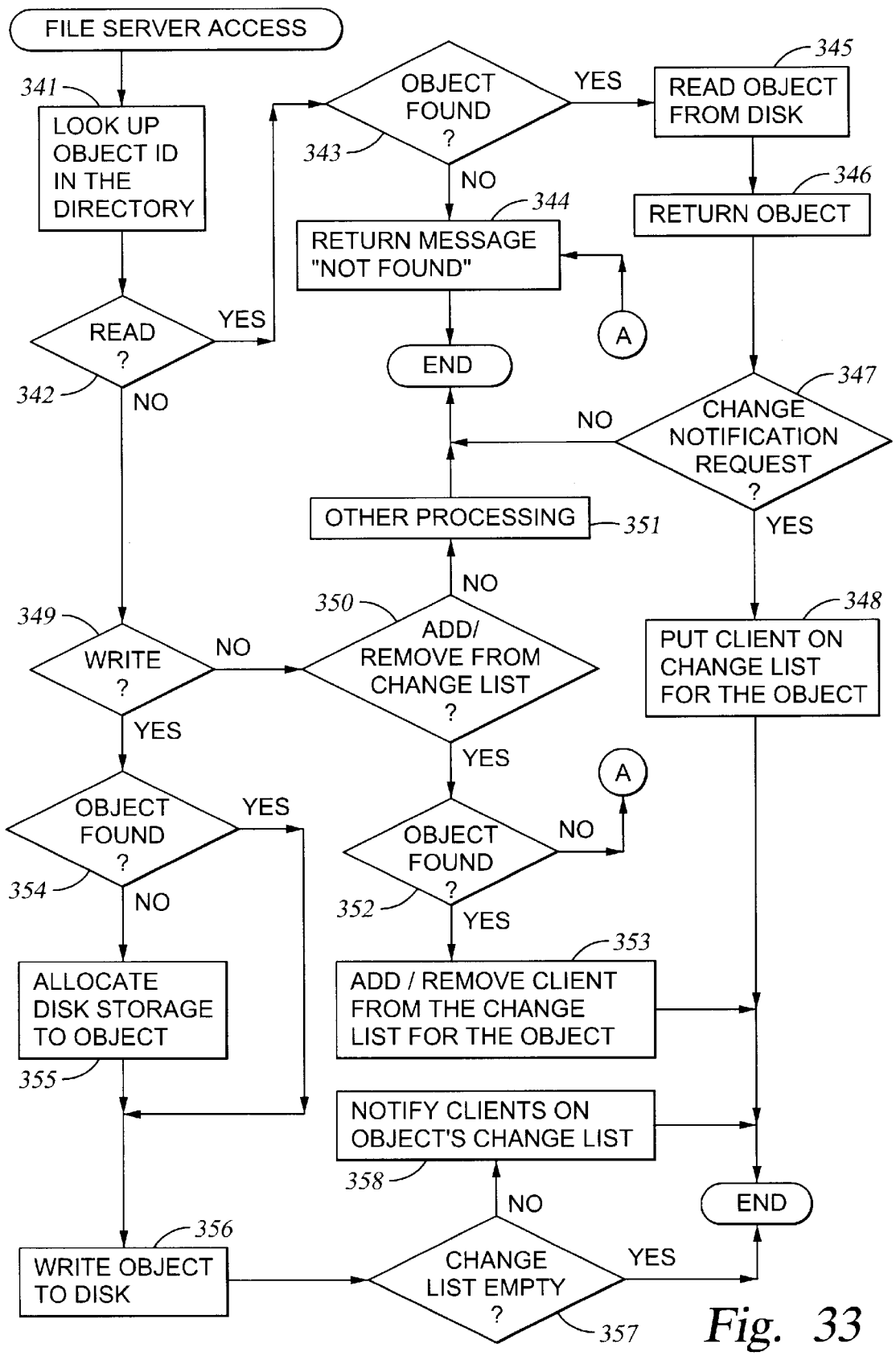
FIG. 33 is a flowchart of a control procedure executed by a processor in the file server of FIG. 32.

Turning now to FIG. 33, there is shown a flowchart of a control procedure executed by the processor 330 in the file server of FIG. 32 for responding to a client request to access an object. In a first step 341 of FIG. 33, the processor looks up the object identifier in the file server directory (334 in FIG. 32). If the client requests a read of the object, then execution branches from step 342 to step 343. Execution branches in step 343 to step 344 if the object is not found in the directory. In this case, in step 344 the file server returns a message "NOT FOUND" to the client, and the control procedure is finished processing the client request.

If in step 343 an object is found, then execution branches to step 345 where the object is read from the disk storage (332 in FIG. 32). Then in step 346 the object is returned to the requesting client. Next, in step 347, execution branches depending on whether the client included a change notification request in the read request. If not, processing of the client request is finished. Otherwise, execution branches from step 347 to step 348, where the client is put on the change list for the object, and then processing of the client request is finished.

If the client request was not a read request, then execution continues from step 342 to step 349. Execution branches from step 349 to step 350 if the client request is not a write request. In step 350 execution branches to step 351 if the client request is not a request to add or remove the client from the change list. In step 351, the file server does other processing to satisfy the client request. For example, the file server could respond to a client request to delete an object from the disk storage, and upon deleting the object, the file server could notify all of the interested clients in the change notification list that the object has been deleted.

If the client has requested to be added or removed from the change list of the object, then execution branches from step 350 to step 352. If the object was not found in the file server directory, then execution branches from step 352 to step 344 to return the message "NOT FOUND" to the client. Otherwise, when the object is found in the directory, execution continues from step 352 to step 353, where the client is added or removed from the change list for the object, and then the control procedure is finished processing the client request.

If the client request is a write request, then execution continues from step 349 to step 354. If the object is not found in the file server directory, then in step 355 disk storage is allocated to the object. After step 355, or when the object is found in the directory in step 354, the object is written to the disk storage in step 356. After writing the object to the disk storage, execution branches in step 357 depending on whether the change list for the object is empty. If so, then the control procedure is finished processing the client request. Otherwise, execution branches from step 357 to 358, where the file server processor notifies all of the clients on the object's change list that the object has changed, and then processing of the client request is finished.

Figure 34:
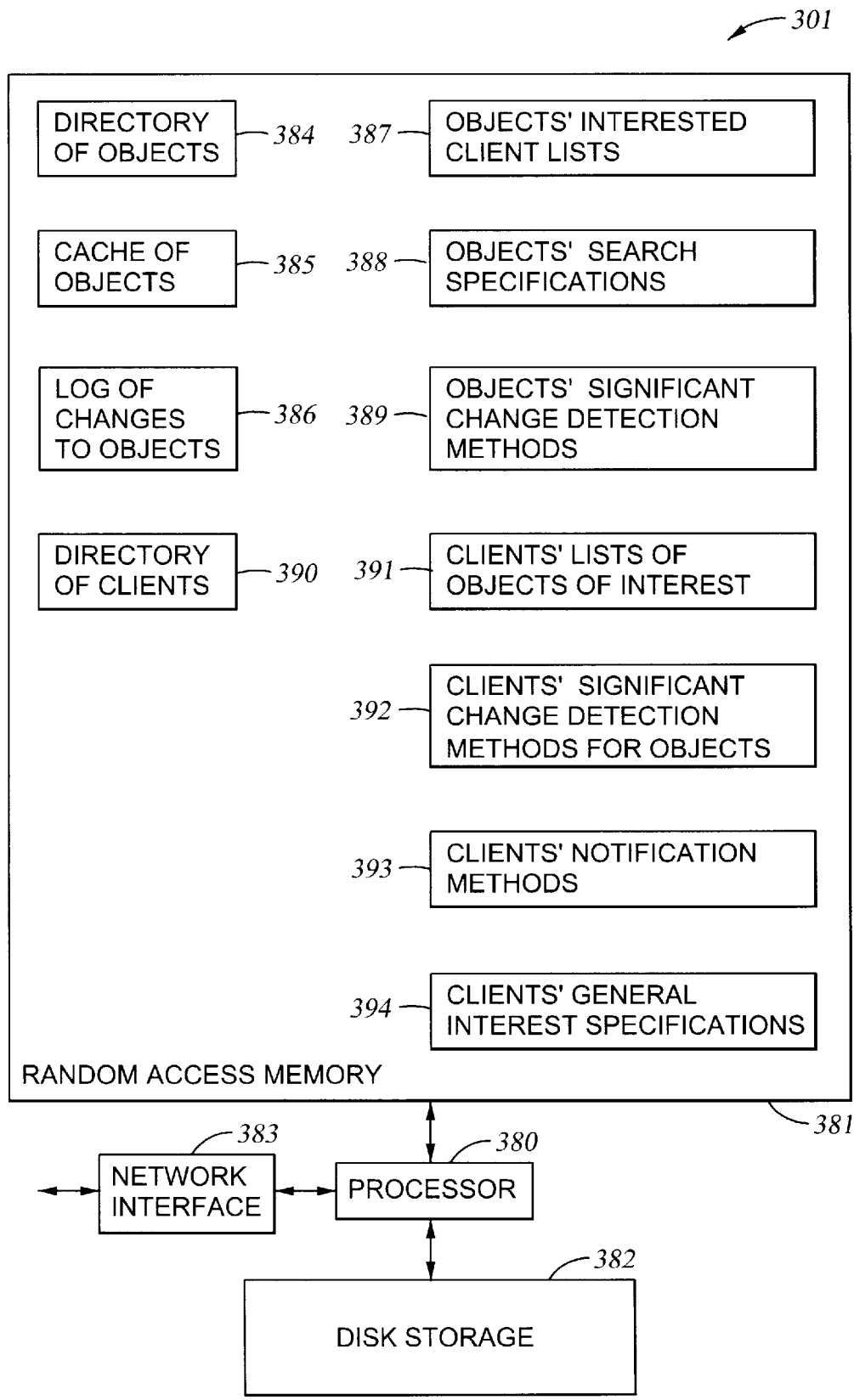
FIG. 34 is a schematic diagram of a Revision Manager especially adapted for use in the data network of FIG. 31.

Turning now to FIG. 34, there is shown a block diagram of the Revision Manager 301 introduced in FIG. 31. As shown in FIG. 34, the Revision Manager 301 includes a processor 380, random access memory 381, disk storage 382, and a network interface 383. A number of data structures are shown in the random access memory 381, and a nonvolatile copy of these data structures are also kept in the disk storage 382. Depending on the relative cost of the random access memory and the speed at which the Revision Manager is desired to service client requests, only a portion of the data structures shown in the random access memory 381 of FIG. 34 may reside in the random access memory 381 at any given time. If a portion of the data structures shown in FIG. 34 is not presently in the random access memory 381 but is needed for access by the processor 380, the processor would read the desired portions of the data structures from the disk storage 382 and write them into the random access memory 381.

A frequently accessed data structure shown in random access memory 381 is a directory of objects 384. The directory of objects 384 is accessed to determine whether a specified object is recognized by the Revision Manager, and whether the object is in a cache of objects 385. The Revision Manager also includes a log 386 of changes to the objects in the cache of objects 385. The log of changes 386 provides an audit trail of changes in the objects of interest over time. The objects in the directory 384 have lists 387 of interested clients. The list 387 of interested clients for each object in the directory 384 includes the clients that are interested in receiving notifications of significant changes in the object. The list 387 also includes, for each object and client, a time stamp indicating when the client was last notified of the change in the object.

The data structures in the random access memory 381 may further include search specifications 388 for objects in the directory 384. The search specifications 388 are useful because there need not be a unique source for a specified document. If there are a plurality of alternative sources for the same or similar document or object, it may be desirable for the Revision Manager to use the search specifications 388 to investigate alternative sources for obtaining a requested document or object. The Revision Manager could check whether access to an alternative source requires special permission, for example, by comparing a security classification level of the document at the source to a security clearance level of the client. The Revision Manager could check whether there would be a latency or delay in retrieving the document from the source, and compare the latency or delay to a time limit specified by the client, to determine whether any latency or delay would be acceptable to the client. The Revision Manager could also check any cost associated with retrieving the document from the source (such as communication charges, server charges, and copyright holder charges), and any quantification of the quality, such as accuracy or precision, associated with the document from the source. If the cost would not exceed an acceptable level, and the quality would exceed an acceptable level, then the source would be acceptable. However, it would be advantageous for the Revision Manager to compare the cost, quality, and timeliness of delivery from the acceptable sources and select one of the sources having the best combination of cost, quality, and timeliness. For example, an objective function of cost, quality, and timeliness could be computed to determine a cost-benefit value for obtaining the document from each acceptable source, and the Revision Manager could select the acceptable source having the minimum value of the objective function. The objective function, for example, could be a linear combination of the cost, quality, and timeliness of obtaining the document from each acceptable source.

The data structures may include significant change detection methods 389 for the objects in the directory 384. As will be described below, the significant change detection methods 389 for objects in the directory are used to determine whether or not a change in an object of general interest is significant enough for recording in the log of changes to objects 386 and for updating the version of the object that is stored in the cache of objects 385.

Another important data structure in the random access memory 381 is a directory of clients 390. The directory of clients 390 includes a list of the clients that are being serviced by the Revision Manager 301. The data structures further include lists 391 of objects of interest to the clients in the directory of clients 390. Also associated with the clients in the directory 390 are the client's significant change detection methods 392 for the objects of interest. These methods consist of procedures or parameters for predetermined procedures that can compute changes in altered objects and determine which changes are material to the client.

The data structures include clients' notification methods 393. As described above, a client could be notified by following the CCI protocol. Alternatively, each client could send to the Revision Manager a computer program or specification that is executed or followed to notify the party of interest. For example, the Revision Manager could execute a procedure call, send a message, display information, or trigger a specified event for notifying a party of interest of a change in an object of interest. In this case, the client's notification methods 393 may include a separate method or list of methods for each client.

The data structures also include clients' general interest specifications 394, which may include criteria specified by each client by which a change to an object is evaluated to determine whether or not the change would be of sufficient significance to require notification to the client. For example, a client could have interest in a financial document, and could send to the Revision Manager a computer program that would monitor the price of certain stocks and bonds, and notify the client of the price trends for the last week when the price of any one of these stocks and bonds would change by more than five percent over a weekly interval.

Figure 35:
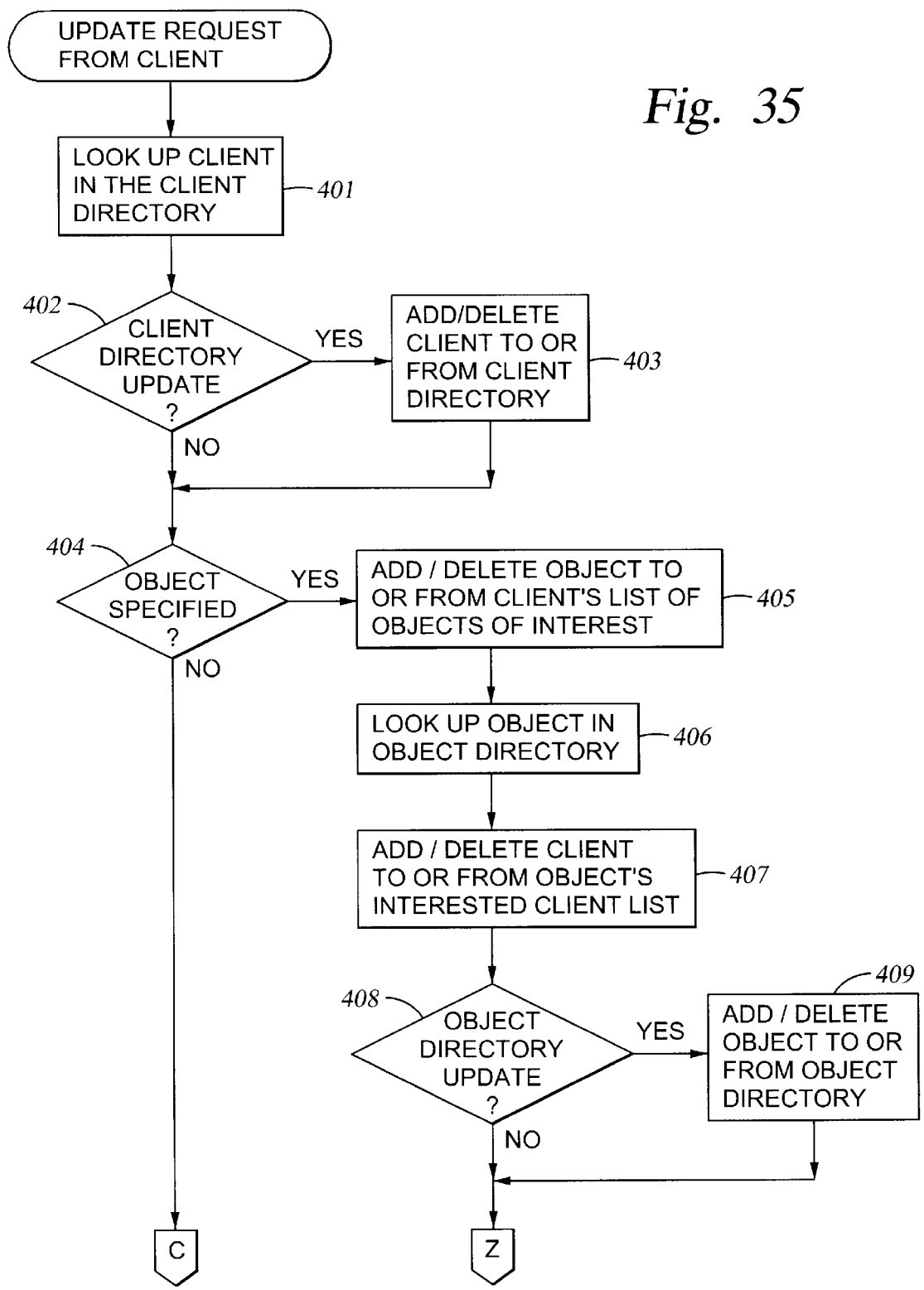
FIG. 35 is a first portion of a flowchart of a procedure executed by a processor in the Revision Manager of FIG. 34 for responding to a request from a client to establish or change update service to the client.

Turning now to FIG. 35, there is shown the first portion of a flowchart of a routine for managing the data structures in the random access memory 381 of the Revision Manager 301 of FIG. 34 in response to a request from a client to be provided with update service. In a first step 401 in FIG. 35, the processor 380 in FIG. 34 of the Revision Manager looks up the client in the directory of clients (390 in FIG. 34). If the client is requesting a directory update, then execution branches from step 402 to step 403 where the processor adds or deletes the client to or from the client directory. If a client is deleted from the client directory, then the other data structures associated with the client are also deleted or de-allocated from memory. For example, before deleting the client from the directory, the directory is used to locate any list of objects of interest to the client, and the interested client list of each object of interest is accessed to delete the client from that list, also the client's significant change detection method for the object (392 in FIG. 34) is deleted, then the client's list of objects of interest 391 is deleted, the client's notification method 393 is deleted, and also the client's general interest specification 394 is deleted.

If an update service request from the client specifies an object, as tested in step 404 of FIG. 35, then execution branches to step 405. In step 405 an object is added to or deleted from the client's list of objects of interest. Next, in step 406, the object is looked up in the object directory. Then, in step 409, if an object was added to or deleted from the client's list of objects of interest in step 405, the client is added to or deleted to or from the object's interested client list (387 in FIG. 34). Next, if an object directory update is requested by the client, as tested in step 408, execution branches to step 409 to add or delete the object to or from the object directory. However, in step 408, an object should not be deleted from the object directory if other clients are interested in the object, as indicated by the object's interested client lists, unless the requesting client has authority to act on behalf of the other clients interested in the object. Also, when an object is deleted from the object directory, the memory storing the object's log of changes, interested client list, search specification, and significant change detection method is de-allocated.

Figure 36:
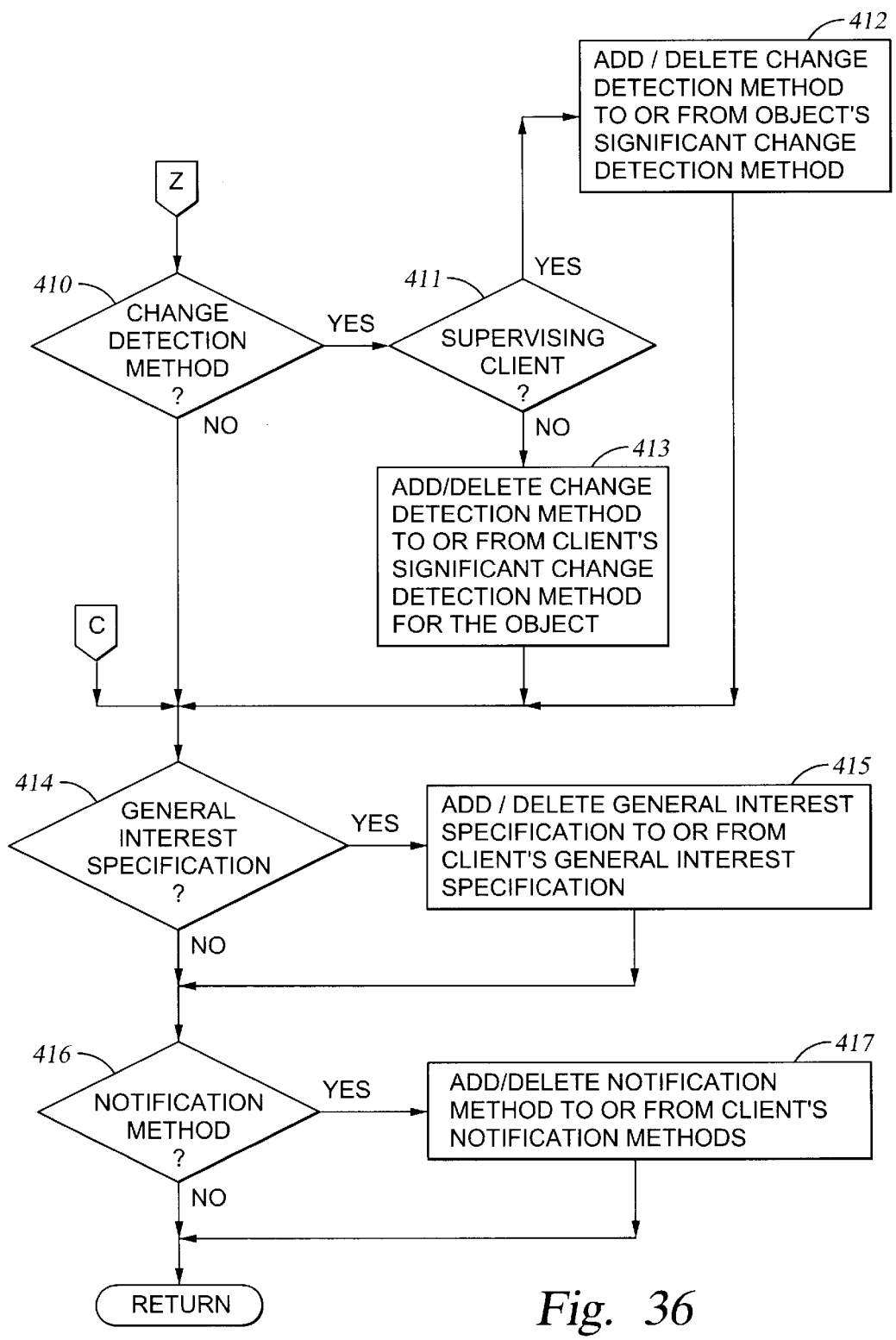
FIG. 36 is a second portion of a flowchart of the procedure executed by the processor in the Revision Manager of FIG. 34 for responding to a request from a client to establish or change update service to the client.

Continuing now to FIG. 36, a client may request an update to a change detection method for an object. If so, then in step 410 execution branches to step 411. Execution branches from step 411 depending on whether the client is a supervising client, having authority to update the significant change detection method for the object in step 412. If not, then in step 413 the client can only add or delete the change detection method to or from the client's significant change detection method for the object.

The update request from the client may request a change in the client's general interest specification. If so, then in step 414, execution branches to step 415 to add or delete the general interest specification to or from the client's general interest specification. Finally, the client may request a change in its notification method. If so, then execution branches from step 416 to step 417, where the notification method is added to or deleted from the client's notification methods.

Figure 37:
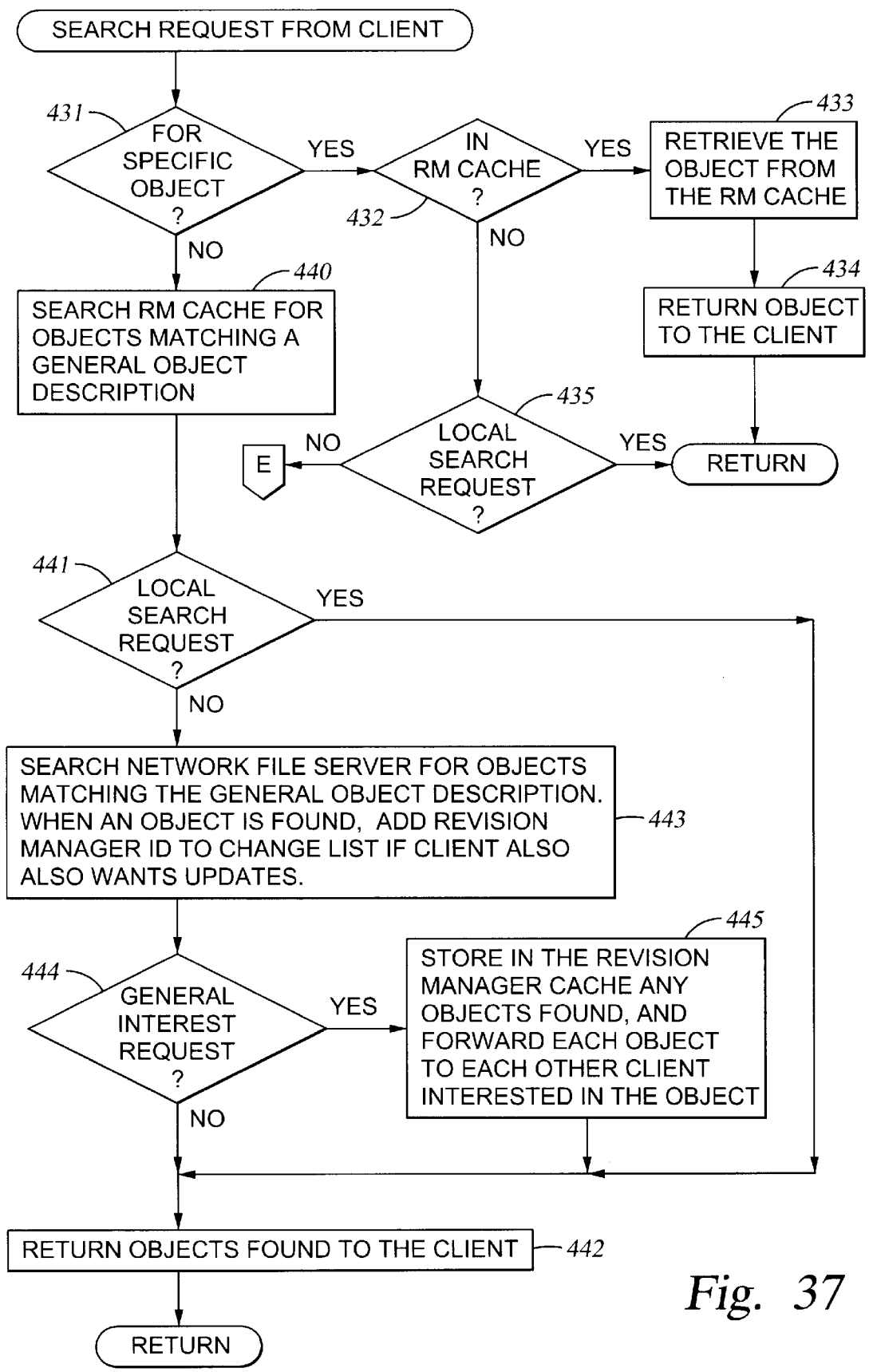
FIG. 37 is a first portion of a flowchart of a procedure executed by the processor in the Revision Manager of FIG. 34 for responding to a search request from a client.

Turning now to FIG. 37, there is shown a first portion of a flowchart of a procedure executed by the processor (380 in FIG. 34) of the Revision Manager to process a search request from a client. In a first step 431, execution branches if the search request is for a specific object. If so, then in step 432 the processor searches the Revision Manager cache of objects (385 in FIG. 34). If the object is found in the Revision Manager cache, then execution branches to step 433 where the processor retrieves the object from the Revision Manager cache, and then in step 434 the processor returns the object to the client. Otherwise, if the object is not in the Revision Manager cache, execution continues from step 432 to step 435. Execution branches in step 435 depending on whether the search request is a local search request. If the search request is a local search request, then the processor will not search any further for the object. Otherwise, the processor will search for the object in other servers or sources of objects in the network, as will be further described below with reference to FIG. 38.

If the search request from the client is not a request for a search for a specific object, then execution continues from step 431 to step 440. In step 440, the Revision Manager processor searches the Revision Manager cache for objects matching a general object description.

The general object description is an abstract characterization which multiple objects could potentially match. The general object description could use key words to specify desired objects. Search specifications of key words are commonly used in computerized literature searching systems such as the LEXIS/NEXIS (trademark) system sold by Mead Data Central, Inc., 9443 Springboro Pike, Dayton, Ohio 45401, and the DIALOG (trademark) system sold by Dialog Information Services, Inc., P.O. Box 10010, Palo Alto, Calif. 94303-9620. Such a search specification is commonly expressed as a Boolean expression of terms including key words and functions or operators indicating the association or frequency of the key words. For example, the search specification:

"((dog or cat) w/5 (pet or domestic!) w/5 (rabi!) and (date aft 1994)"

would tend to specify documents in a LEXIS/NEXIS (trademark) database that are dated after 1994 and are about rabid domestic dogs or cats. The words "or" and "and" in the search specification is interpreted as a logical operator. The operator "w/5" in the search specification specifies that the key words are within five words of each other. The exclamation mark is a "wild card" match symbol, meaning that a key word match will be found so long as the letters preceding the exclamation mark match the first letters of a word in a document in the database. It would also be desirable to provide in the specification a function or operator requiring a certain number of key word matches in each document or object to be retrieved, so as to permit specification of a required "value" for the document or object other than its date or time-value. Moreover, it would be desirable to permit the client to specify a procedure in a conventional computer programming language for accessing the text or content of a document or object (or an abstract, concordance or index for the document or object) to determine whether or not the document or object is of interest and to quantify the degree of interest. The degree of interest could be used for sorting the documents to display first the documents of highest interest, as well as for rejecting those documents of least interest. It would also be desirable to permit a client to provide knowledge, for example facts or rules, to a knowledge-based system that would evaluate the interest value of objects.

In step 441 of FIG. 37, execution branches to step 442 depending on whether the search request is a local search request. If so, the processor of the Revision Manager searches no further than the Revision Manager cache, and in step 442 the processor returns any and all objects found to the client. If the search request is not a local search request, then execution continues from step 441 to step 443.

In step 443, the processor of the Revision Manager issues search requests over the network to network servers or other sources of objects in order to find objects matching the general object description. If the client also wants updates to the object, then when an object is found in a server on the network, the Revision Manager requests its identification code to be added to the change notification list for the object in the memory (335 in FIG. 32) of the server. Then in step 444, execution branches depending on whether the search request from the client is a general interest request indicating that any objects found should be stored in the cache of objects in the Revision Manager. For example, a general interest request could be requested from a client having supervisory authority. If the search request is a general interest request, then in step 445 all of the objects found are stored in the Revision Manager cache, and each object is forwarded to each client interested in the object, as determined by the clients' general interest specifications (394 in FIG. 34). For example, a client's general interest specification could simply specify that all new objects stored in the Revision Manager cache should be forwarded to the client, or a client's general interest request could be more specific and use key words or other mechanisms similar to the key words or mechanisms used in a general object description as described above with reference to step 440. Then in step 442 the objects that are found are returned to the client having requested the objects.

Figure 38:
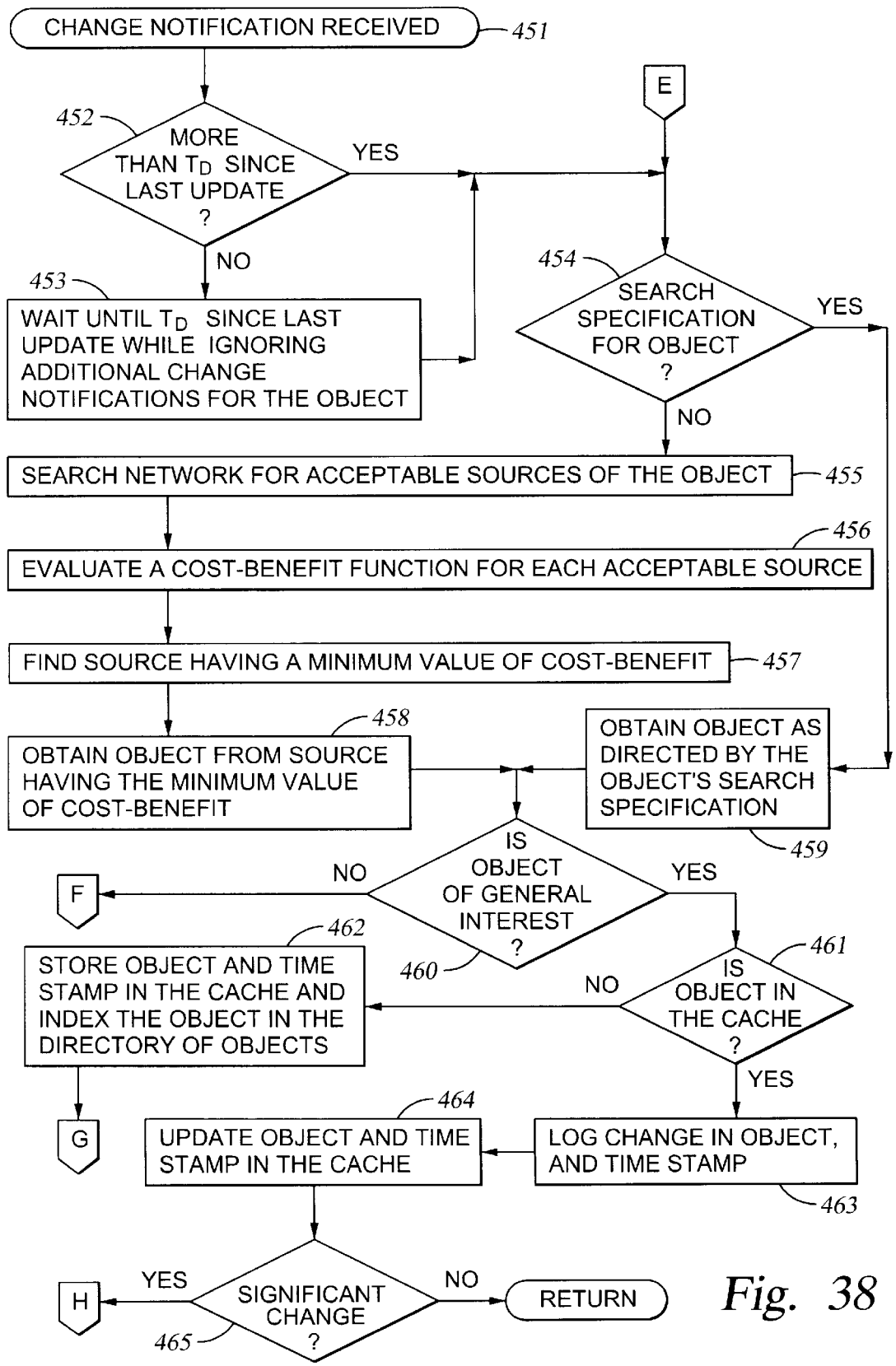
FIG. 38 is a second portion of the flowchart begun in FIG. 37, and also showing an entry point entered when the Revision Manager receives a change notification from a file server as shown in FIG. 32.

Turning now to FIG. 38, there is shown a continuation of the flowchart begun in FIG. 37. FIG. 38 also shows an entry point 451 entered when a change notification is received by the Revision Manager from a server such as the file server 313 in FIG. 32. If a change notification is received by the Revision Manager, then in step 452 of FIG. 38, the processor of the Revision Manager looks up in the directory of objects to find the object specified by the change notification. The object should be found in the directory of objects; if not, an error condition is detected. Otherwise, in the usual case, the processor checks a time stamp in the directory indicating when the object was last updated. If more than a certain time TD has not elapsed since the last update, then execution branches to step 453 where the processor waits until the amount of time $T_D$ has elapsed since the last update while ignoring any additional change notifications for the same object. In other words, step 453 acts as a filter to prevent the Revision Manager from being overloaded by excessively frequent change notification requests pertaining to the same object. $T_D$, for example, has a value of 10 minutes, although it could depend on the particular object, and have a relatively small value if information expected in the object is relatively important.

Execution continues from step 453 to step 454. Step 454 is also reached from step 452 if more than the amount of time TD has elapsed since the last update, or after step 435 of FIG. 37 when a search request for a specific object does not find that object in the Revision Manager cache and the request is not a local search request. In step 454, execution branches depending on whether there is a search specification (388 in FIG. 34) defined for the object. If a search specification is defined for the object, then the object is obtained from the network in step 459 by following the object's search specification. For example, the object identification code itself may specify a primary or unique source for the object, and in this case the Revision Manager directs a request over the network to the primary or unique source for the object. Alternatively, the object's search specification could include a prioritized list of alternative sources for the object.

If there is not a search specification defined for the object, then execution branches from step 454 to step 455, where the Revision Manager searches the network for acceptable sources of the object. For example, in a background process, as described below with reference to FIG. 45, the Revision Manager may monitor sources of objects to compile current costs and availability of objects from the various sources. Therefore, in step 455 the Revision Manager may only need to access a directory that the Revision Manager compiles during the background process to determine acceptable sources of the object. A source would be deemed acceptable, for example, if it could deliver the object with no more than a certain acceptable latency and at no more than a certain acceptable cost. Then in step 456 the processor of the Revision Manager evaluates a cost-benefit function for each acceptable source. The cost-benefit function is a user objective function trading off cost factors such as latency and communication costs against quality of service factors such as information quality, recency, and value. The cost-benefit function may also include other factors such as the reliability of obtaining the object from each source. Also, it may not be necessary to obtain a unique version of an object. For example, there may be situations in which the most recent object would be desirable but not necessary. Therefore, the cost-benefit function may take into account the likelihood or desirability of obtaining the most recent, up-to-date version of an object. Once the cost-benefit function has been evaluated for each acceptable source, in step 457 the source having a minimum value of cost benefit is found so that in step 458 the object can be obtained from the source having the minimum value of the cost-benefit function. In step 458, the Revision Manager could also investigate and select one of a number of appropriate network links that could be used to obtain the object from the source having the minimum value of the cost-benefit function. The Revision Manager could also investigate and select one of a number of appropriate network links whenever communicating with file servers or clients. This would enable the Revision Manager to avoiding congested communications links or congested servers when alternative servers are accessible with lower latency or lower cost. This would also provide redundancy in case of network or server failures.

Once the object has been obtained in step 458 or step 459, execution continues to step 460. Execution branches in step 460 depending on whether the object is of general interest. If the object is of general interest, then execution branches from step 460 to step 461. In step 461, execution branches depending on whether the object is in the cache. If not, then in step 462 the object and a time stamp are stored in the cache and the object is indexed in the directory of objects. If the object is in the cache, then in step 463 the change in the object is determined by comparing the new version of the object to the existing version in the cache, and the change is logged in the log of changes to the object (386 in FIG. 34) along with a time stamp. Then in step 464 the object is updated and time stamped in the cache. After step 464, the change in the object is evaluated by any significant change detection method defined for the object (389 in FIG. 34). If a significant change detection method is defined for the object, then in step 465 the change in the object is evaluated and if the change is not significant then the Revision Manager processor is finished responding to the change notification. (If the object is in cache, as detected in step 461, then step 465 is not reached in response to a client's search request).

Figure 39:
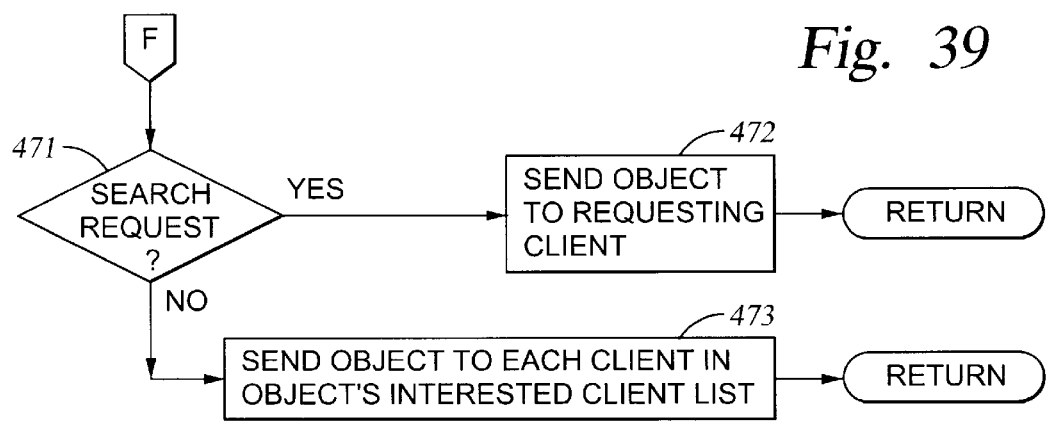
FIG. 39 is a third portion of the flowchart begun in FIG. 37, and showing steps for sending an object to a client having issued a search request for the object, or to all interested clients in response to a change notification, when the object is not an object of general interest and thus is not retained in a cache memory of the Revision Manager.

Turning now to FIG. 39, when an object is not of general interest, execution branches from step 460 of FIG. 38 to step 471 of FIG. 39. In step 471 execution branches depending on whether the processor of the Revision Manager is responding to a search request. If so, then in step 472, the Revision Manager sends the object to the requesting client, and processing of the search request is completed. Otherwise, if the processor of the Revision Manager is processing a change notification, then execution branches from step 471 to step 473. In step 473, the processor of the Revision Manager sends the object to each client in the object's interested client list (387 in FIG. 34). Therefore, if the object is not of general interest, the Revision Manager responds to change notifications by obtaining the object and directing that object to each client that is interested in the object, and processing of the change notification is finished.

Figure 40:
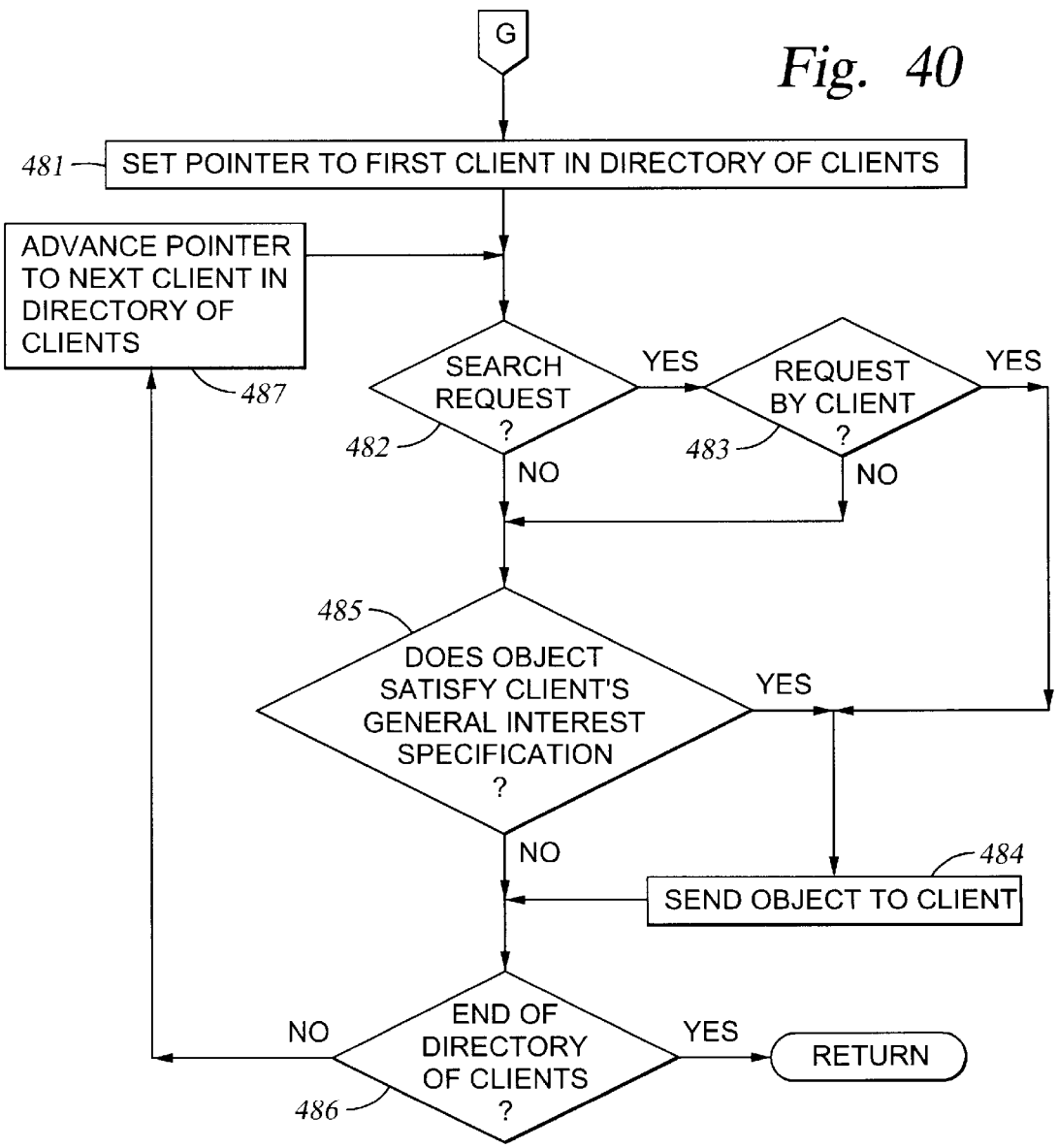
FIG. 40 is a fourth portion of the flowchart begun in FIG. 37, showing steps for sending a new object of general interest to all clients associated with the Revision Manager and being interested in the new object.

Turning now to FIG. 40, when a new object of general interest has been stored in the cache in step 462 of FIG. 38, execution continues in step 481 of FIG. 40 in order to determine what clients, if any, should receive the object. In the first step 481, a pointer is set to the first client in the directory of clients. Then if the Revision Manager processor is processing a search request, as tested in step 482, and the request was by the client pointed to by the pointer, as tested in step 483, then in step 484 the object is sent to the client. Otherwise, if the Revision Manager processor is not processing a search request, or the search request is not by the client pointed to by the pointer, then execution branches from step 482 or 483 to step 485. In step 485, the Revision Manager processor checks whether the object satisfies the client's general interest specification. If so, then execution branches from step 485 to step 484 in order to send the object to the client. If not, or after sending the object to the client, execution continues to step 486. In step 486, processing by the Revision Manager processor is finished if the pointer is pointing to the end of the directory of clients. If not, execution branches from step 486 to step 487, in order to advance the pointer to the next client in the directory of clients. Execution then loops back from step 487 to step 482. In this fashion, the object is sent to the client requesting the object if the Revision Manager is processing a search request, and otherwise to any client that is interested generally in the object.

Figure 41:
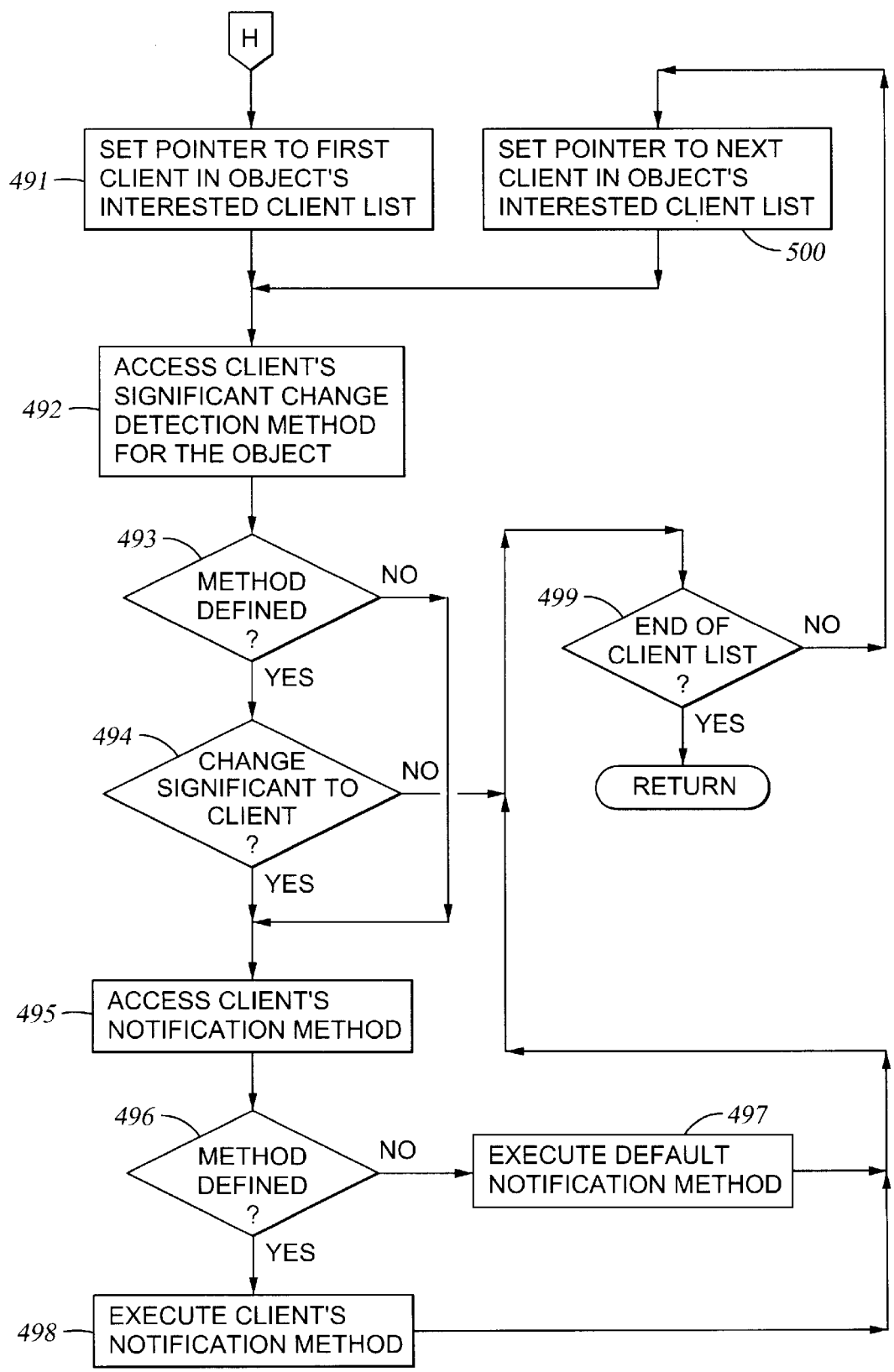
FIG. 41 is a fifth portion of the flowchart begun in FIG. 37, and showing steps for deciding whether to report changes in an object to clients interested in the object.

Turning now to FIG. 41, execution continues from step 465 in FIG. 38 to a first step 491 in FIG. 41. The steps in FIG. 41 determine whether a client should be notified of an update to an object of general interest stored in the cache of objects in the Revision Manager. In the first step 491, a pointer is set to the first client in the object's interested client list. In this example, a client will not be notified of updates unless the client, after being sent a new object, requests the update service. Execution continues from step 491 to step 492, in which the Revision Manager processor accesses any significant change detection method for the client and the object. If the client has a significant change detection method for the object, then execution continues from step 493 to step 494 where the processor of the Revision Manager applies the method to the change in the object to determine whether the change is significant to the client. If so, or if no such method is defined, then execution continues from step 493 or 494 to step 495.

In step 495 the Revision Manager processor accesses any notification method for the client. If no such method is defined, as tested in step 496, then execution branches to step 497 to execute a default notification method, for example, a method which merely sends a message to the client that the object of interest has changed. Otherwise, if a notification method is defined for the client, then execution continues from step 496 to step 498 where the Revision Manager processor executes the client's notification method. If the change in the object was not significant to the client, as tested in step 494, or after steps 497 or 498, execution continues to step 499. In step 499, the processor of the Revision Manager checks whether the pointer is at the end of the list of clients interested in the object, and if so, the processor is finished processing the change notification. Otherwise, execution branches from step 499 to step 500, where the pointer is advanced to the next client in the object's interested client list. From step 500, execution loops back to step 492. In this fashion, all interested clients are notified of significant changes in the object. Moreover, the Revision Manager also causes the interested clients to receive the notifications virtually simultaneously, and to present changes in the object concurrently to interested users. This feature could be used, for example, in a user-group environment in order to permit one member of the group to make edits in an object of interest and to cause the edits to be presented concurrently to other members of the user group. If the object would represent a single view on a display screen, for example, one member of the group could successively change the object to present a "slide-show" to the other members of the group. Alternatively, the object could represent the display screen of one member browsing on the network, and the browsing would be mimicked on the display screens of the other members of the group.

Figure 42:
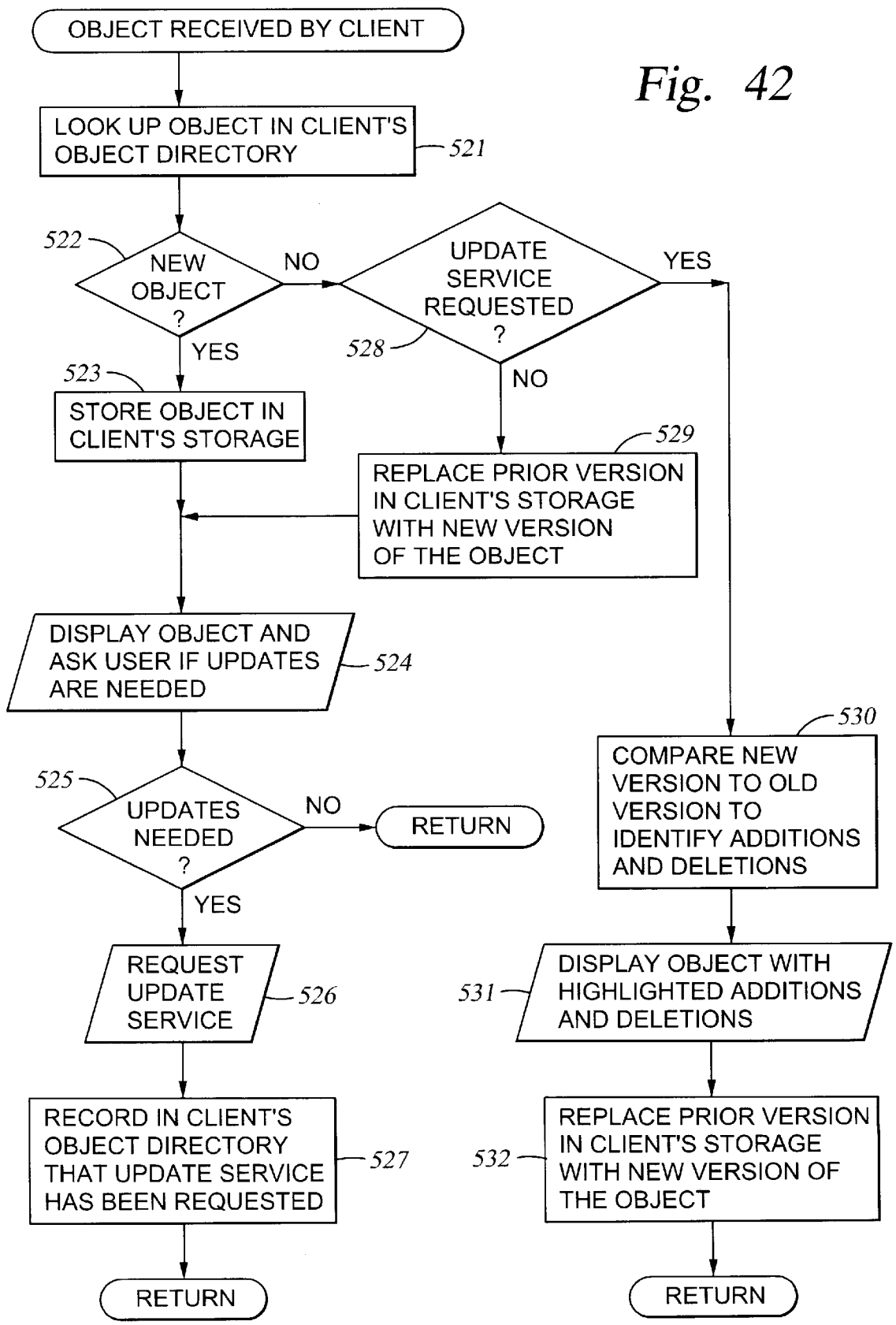
FIG. 42 is a flowchart of a general routine executed by a client when an object is received by the client.

Turning now to FIG. 42, there is shown a flowchart of a procedure performed by a client upon receiving an object. In a first step 521, the client looks up the object in an object directory maintained by the client. If the directory look-up indicates that the object is a new object, then execution continues from step 522 to 523. In step 523, the client stores the object in the client's storage. Then in step 524, the client displays the object to a user and asks the user if updates are needed. If updates are not needed, as tested in step 525, then the procedure followed by the client is finished. Otherwise, in step 526, the client requests update service from the source of the object. Finally, in step 527, the client records in its object directory that update service has been requested for the object.

If in step 522 the client determines that the object is not a new object, then execution branches from step 522 to step 528. In step 528, execution branches depending on whether the client has requested update service for the object, as indicated in its object directory. If not, then execution branches from step 528 to step 529. In step 529, the client replaces the prior version in the client's storage with the new version of the object, and execution continues in step 524.

If the client finds in step 528 that update service was requested, then execution branches from step 528 to step 530. In step 530, the client compares the new version of the object to the old version in its storage, in order to identify the changes in the object, such as the additions and deletions required to convert the old version to the new version. Then in step 531 the client displays the object to the user, with the additions highlighted, for example in one color, and the deletions also highlighted, in another color. Alternatively, sidebar lining or underlining could be used to indicate elements of the updated object document that differ from those in the previous document. Moreover, any portion or component of the updated object that matches an abstract characterization (such as an occurrence of any one of a number of specified key words) could also be highlighted. Finally, in step 532, the client replaces the prior version of the object in the client's storage with the new version of the object.

Figure 43:
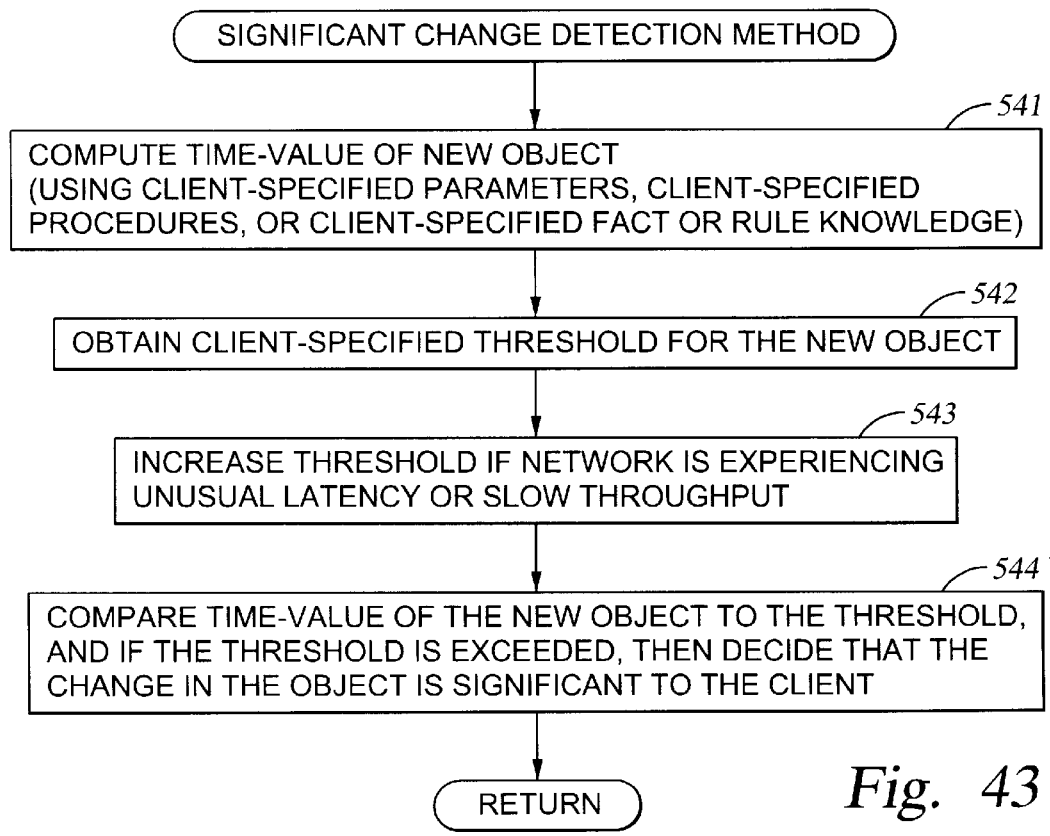
FIG. 43 is a flowchart of an example of a client's significant change detection method performed by the Revision Manager of FIG. 34 for deciding whether to report a change in an object to the client.

Turning now to FIG. 43, there is shown a flowchart illustrating an example of a client's significant change detection method for an object. Such methods are stored in the data structure 392 of FIG. 34, and are accessed and applied in steps 492 and 494 of FIG. 41 in order to determine whether an object has changed sufficiently for that change to be reported to a client. In a first step 541 of FIG. 43, the processor of the Revision Manager computes the time-value of the new object, using client-specified parameters, client-specified procedures, or client-specified fact or rule knowledge. For example, in addition to the intrinsic value of the new information in the object, the Revision Manager may consider the timeliness of the new information, and also the duration in time since a change has been reported to the client. The new object itself may specify a priority level indicating the general value of the new object to the client. In this case, the value of the object could be independent of time; i.e., independent of the time of the most recent change to the object, and independent of the current time. The client may specify a threshold which the object-specified priority level must exceed for the client to consider the change significant. Alternatively, the client may specify procedures, or fact or rule knowledge that is applied to determine the significance of the changes in the object. For example, the client specified procedure or fact or rule knowledge may instruct the Revision Manager to perform a computation of the number of occurrences of key words in the added or deleted portion that is changed in the object, in order to determine the value of the new object to the client.

Once the time-value of the new object is computed in step 541, then in step 542 the Revision Manager obtains a client-specified threshold for the new object. Next, in step 543, the Revision Manager increases the threshold if the network is experiencing unusual latency or slow throughput. The Revision Manager, for example, has a background process as described below with reference to FIG. 45 that compiles statistics of network throughput and latency in order to determine whether the network is experiencing unusual latency or slow throughput. Then, in step 544, the Revision Manager compares the computed time-value of the new object to the threshold, and if the threshold is exceeded, then the Revision Manager decides that the change in the object is significant to the client.

In this fashion, the Revision Manager improves overall system performance and in particular optimizes the time-value of information delivered to clients when network resources are limited. Moreover, by reducing network communication of information not of particular interest to each client, the Revision Manager also reduces average latency for average members of a group serviced by the Revision Manager. The time-values of the objects to their interested clients could also be used for prioritizing the transmission of the updated objects to the interested clients when network communication resources are limited, so that the transmission of updated objects having a higher time value would be given some priority over the transmission of updated objects having a lower time value. For example, when sending an updated object to an interested client, the Revision Manager would place the updated object in a transmission queue at a position in the queue ordered by the time value of the updated object for the interested client to which the updated object is being sent. The updated object at the head of the queue would be sent to its interested client whenever communication resources would become available. In a similar fashion, additional queues could be used in the Revision Manager for re-ordering the processing of client requests or change notification requests according to respective priorities assigned to the clients, the objects, and various components of the objects, as well as the time-values of the updated objects for their interested clients.

Figure 44:
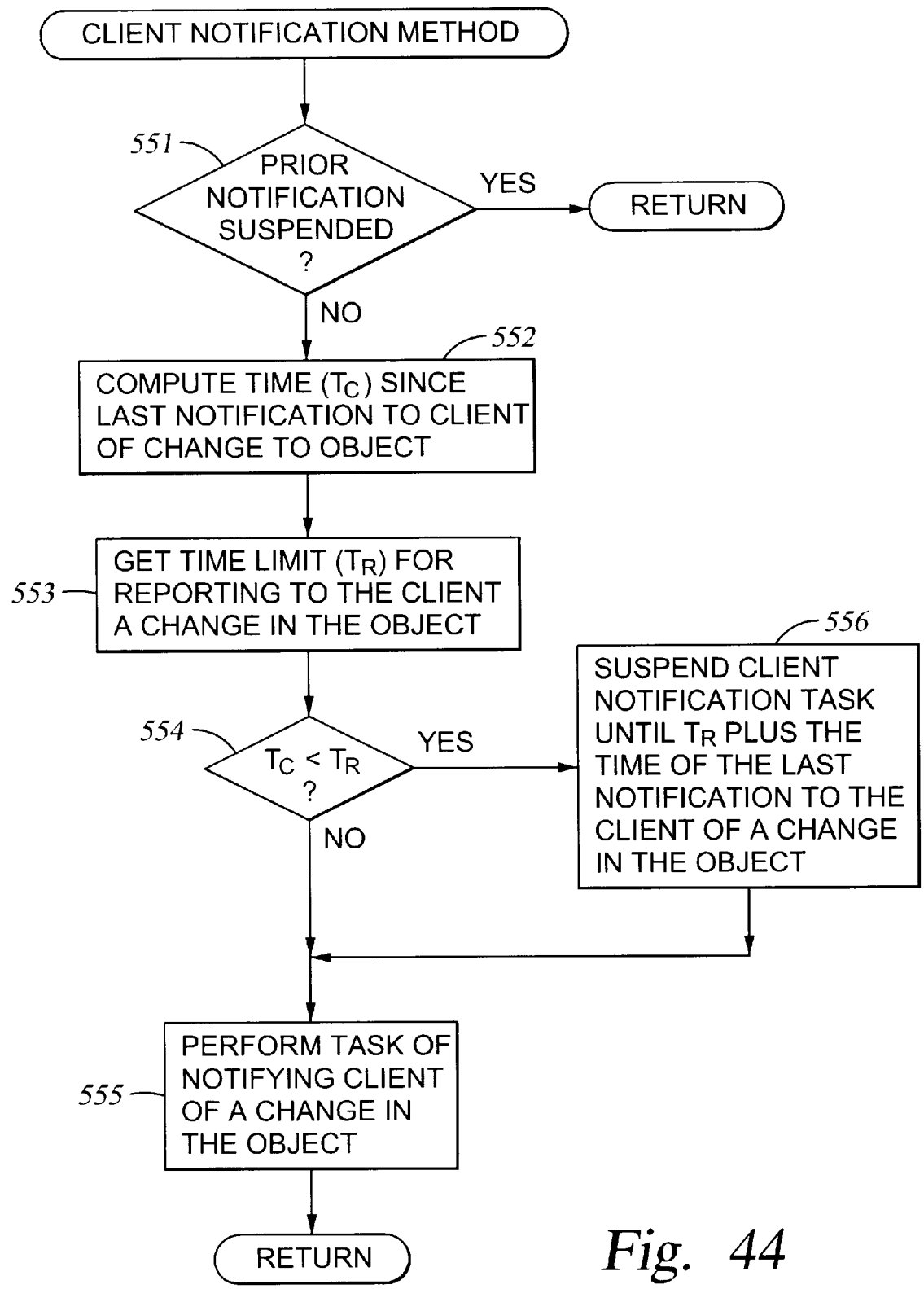
FIG. 44 is a flowchart of an example of a client's notification method for notifying the client of a change in an object.

Turning now to FIG. 44, there is shown a flowchart of an example of a client notification method of the kind stored in the data structure 393 of FIG. 34 and which is accessed in step 495 of FIG. 41 and executed in step 498 of FIG. 41. In a first step 551 in FIG. 44, the Revision Manager checks whether a prior notification to the client for a change in the same object under consideration has been suspended. If so, then the notification method is finished because the client will be notified of the most recent change in the object when the time limit for the suspended notification has expired. In this regard, the client notification method of FIG. 44 uses a filter technique to prevent notification at a client-specified rate less frequent than, but in a similar manner to, the method described above with reference to steps 452 and 453 of FIG. 38. If a prior notification to the client for the same object was not suspended, then execution continues from step 551 to step 552. In step 552, the Revision Manager computes the time ($T_C$) since the last notification to the client of the change to the object. This time is computed by subtracting the time stamp stored in the object's list of interested clients (see 387 of FIG. 34) from the current time. Then in step 553 the Revision Manager obtains a time limit $T_R$ for reporting to the client a change in the object. The time limit $T_R$, for example, is stored in the client's list of objects of interest (see 391 in FIG. 34) and is received from the client when the client requests update service, or if the client does not specify such a time limit when requesting update service, the Revision Manager may assign a default time to the time limit $T_R$. The time limit $T_R$ is a specification, for each client of interest, of the maximum desired update notification frequency. Next, in step 554, the Revision Manager compares the time $T_C$ to the time limit $T_R$. If the time since the last notification to the client of the change to the object is less than the time limit for reporting to the client a change in the object, then execution continues from step 554 to step 555, where the Revision Manager performs a task of notifying the client of a change in the object. Otherwise, if $T_C$ is less than $T_R$, then execution branches to step 556 to suspend the client notification task until the amount of time $T_R$ has elapsed since the time of the last notification to the client of a change in the object.

Figure 45:
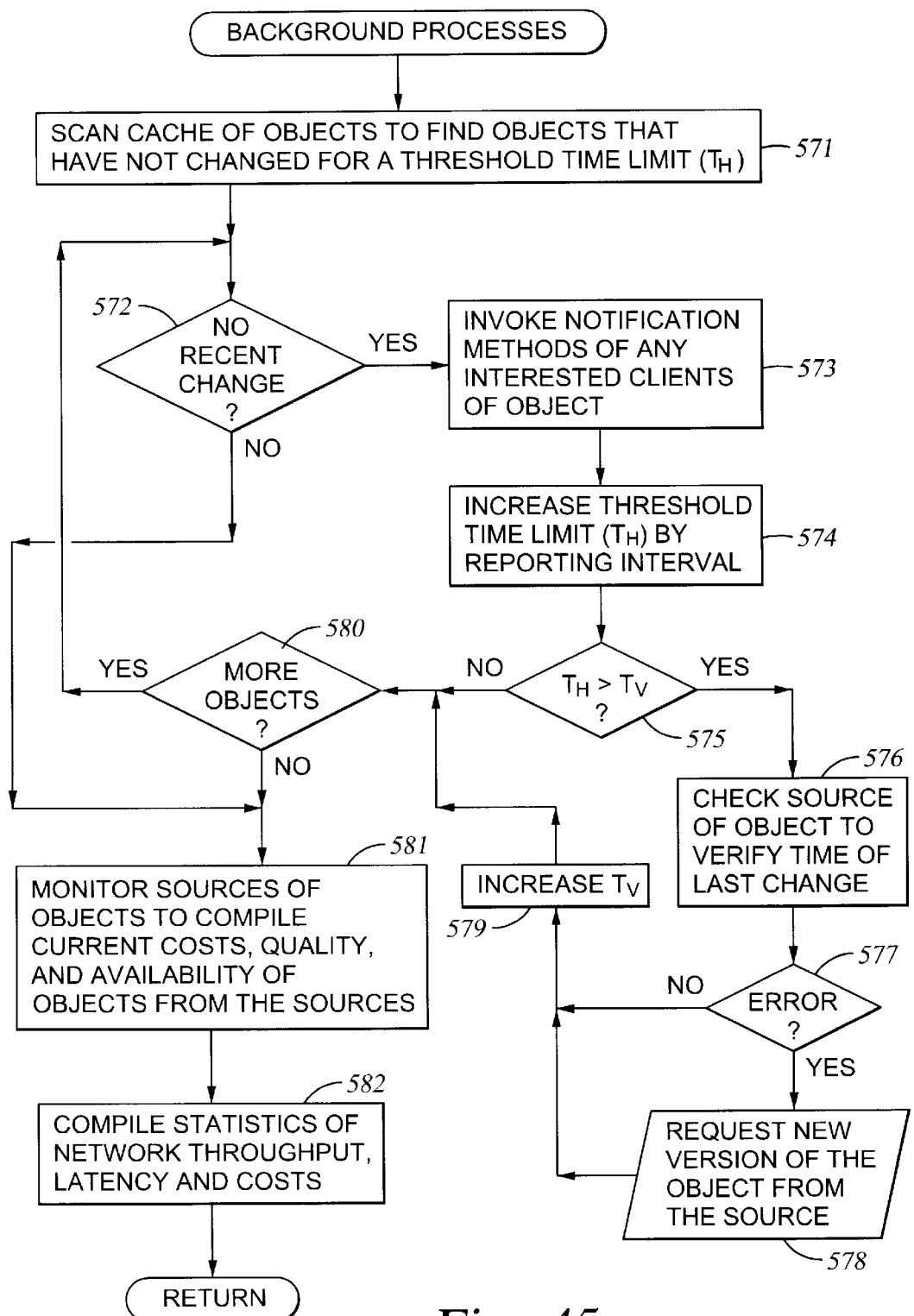
FIG. 45 is a flowchart of background processes performed by the Revision Manager of FIG. 34 for notifying clients interested in being informed when objects are not frequently changed, for monitoring sources of objects to compile current costs, quality, and availability of objects from the sources, and for compiling statistics of network throughput, latency and costs.

Turning now to FIG. 45, there is shown a flowchart of background processes performed in the Revision Manager (301 of FIG. 34). One of these background processes is to notify any clients that are interested in the fact that changes might not be made to an object within a certain threshold time-limit. Such a determination would be useful, for example, to determine whether a source of updates to an object has been experiencing difficulties in timely reporting of information or has experienced a malfunction. Each interested client or party can be assured that information of interest has not become "stale". This technique could also monitor changes in any of the components of a compound document, by recording times of last updates for all components and then checking for updates since last recorded updates. For example, in a first step 571 of FIG. 45, the Revision Manager scans its cache of objects to inspect the time stamps associated with the objects to find objects that have not changed for a threshold time limit ($T_H$). The initial value of the threshold time limit $T_H$ could be a parameter included in each object's significant change detection method (389 in FIG. 34). When an object has been found that has no recent change, as tested in step 572, execution branches to step 573 to invoke the notification methods of any and all clients interested in being notified when there is no recent change in the object. Then in step 574 the threshold time limit ($T_H$) is increased by a reporting interval. (The threshold time limit $T_H$ is reset to its initial value when the Revision Manager receives a new version of the object, at which time the object is also time-stamped). The reporting interval could be the same as the initial value of the threshold time limit ($T_H$) or it could be larger, depending on how frequently clients would like to be reminded that there have been no recent changes in an object. After step 574, in step 575 the threshold time limit $T_H$ is compared to a predetermined threshold $T_V$ to determine whether the Revision Manager should check the source of the object in step 576 to verify the time of the last change to the object. If the checking in step 576 detects that an error has occurred, as tested in step 577, then in step 578 the Revision Manager requests the source of the object to provide a new version of the object. If an error is not detected in step 577 or after step 578, then in step 579 the Revision Manager increases the threshold $T_V$ in order to schedule the next time that the source of the object would be checked in step 576. (The threshold time limit $T_V$ is reset to its initial value when the Revision Manager receives a new version of the object, at which time the object is also time-stamped). After step 579, or when step 575 finds that the threshold $T_V$ is not exceeded by the threshold $T_H$, then in step 50 the Revision Manager checks whether there are more objects to scan in the cache for the absence of any recent changes. If there are more objects, then execution loops back from step 580 to step 572 to determine whether there have been no recent changes in the additional objects. Once all of the objects have been scanned, then execution continues to step 581. In step 581, the Revision Manager performs the background task of monitoring sources of objects to compile statistics of current costs, quality, and availability of objects from the sources. This compiled information is used as described above in steps 455 and 456 of FIG. 38 in order to select the most appropriate source when the Revision Manager needs to obtain an object or a new version of an object. By monitoring cost, quality and timeliness of alternative sources of the same information, subsequent retrievals can be directed to the sources with the highest quality or highest recency or other appropriate optimal ranking.

The Revision Manager performs another background process in step 582. In step 582, the Revision Manager compiles statistics of network throughput, latency and costs. For example, each time that the Revision Manager requests an object from a source, it computes the turnaround time of the source to respond to the request, and the Revision Manager also keeps track of the current cost and any instances where the transmission of a message over the network is delayed due to unusually heavy network traffic. Subsequent retrievals of objects can be directed through the network links to the sources with the lowest latencies or lowest costs or other appropriate optimal ranking.

Figure 46:
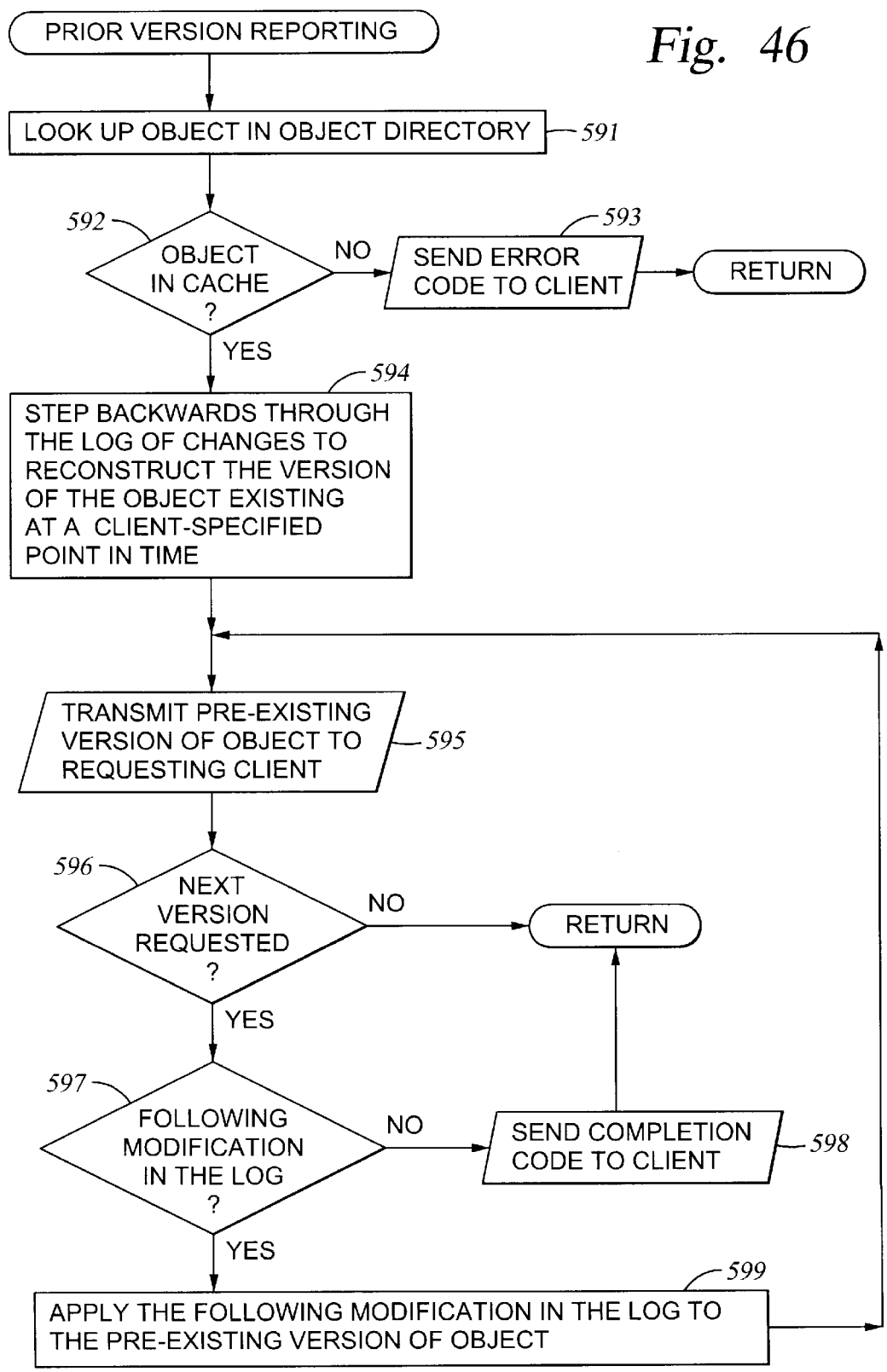
FIG. 46 is a flowchart of a routine for reporting prior versions of an object by stepping backwards through a log of changes to the object.

Turning now to FIG. 46, there is shown a flowchart of a prior version reporting service that could be provided by the Revision Manager. This prior version reporting service uses the log of changes to objects (386 in FIG. 34) that is maintained by the Revision Manager (in step 463 of FIG. 38). This prior version reporting service of FIG. 46 is invoked by a request from a client in the network. When the Revision Manager receives such a request for a prior version of an object, in the first step 591 of FIG. 46 the Revision Manager looks up the object in its object directory (384 in FIG. 34). If the object directory indicated that the object is not in the Revision Manager cache of objects, as tested in step 592, then the Revision Manager returns an error code to the requesting client, and the Revision Manager is finished servicing the client's request. Otherwise, when the object is in cache, execution continues from step 592 to step 594. In step 594, the Revision Manager steps backward through the log of changes (386 in FIG. 34) to reconstruct the version of the object existing at a point in time specified in the client's request. Then in step 595, the Revision Manager transmits to the requesting client the pre-existing version of the object that was reconstructed in step 594.

The client may also request the next most recent version of the object. If not, as tested in step 596, the Revision Manager is finished processing the client's request for the reporting of a prior version. Otherwise, in step 597, the Revision Manager looks for a following modification in the log of changes to the object (386 in FIG. 34). If there is no following modification in the log, then execution branches from step 597 to step 598, where the Revision Manager finishes processing the client's request by sending a completion code to the client indicating that the client has already been sent the most recent version of the object. Otherwise, execution branches from step 597 to step 599 where the Revision Manager reconstructs the next version by applying the following modification in the log to the pre-existing version of the object. Execution then continues from step 599 to step 595. Upon receiving the next-most recent version of the object, the client could display the object with highlighted additions and deletions, as described above with reference to steps 530 and 531 in FIG. 42. In this fashion, the user would be provided with a summary of changes in an object since the last time the user examined the object. Instead of employing highlighting to identify the changes in a single update or succession of updates to a single object, the client could employ other means of presentation such as counts, proportions, areas, and tables or graphics of types and sources of changes for a single object or a group of objects. Such a presentation could be given to a user for all objects of interest to the user and for all updates of significance to the user since the user last operated a user-client interface such as a video display terminal. Instead of showing a succession of prior versions of an object of interest reconstructed from the log of changes, the Revision Manager could transmit to the client just the changes from the log of changes, beginning at a particular time of interest to the user. The client could then present to the user a summary of these changes. Alternatively, where the prior versions are substantially different from each other, the prior versions could simply be presented to the user in succession.

In view of the above, there has been provided a facility for automatically retrieving and presenting designated computer-based objects which have changed since a previous access. Objects are designated of interest by computer users who periodically need the most up-to-date versions of any type of computer document or file. This invention makes it unnecessary for the users to access documents through their browsers manually and repeatedly to assess whether the documents have changed since the last viewing. Moreover, groups of users can benefit from economies associated with the sharing of a common cache, which obviates repeated accesses by affiliated users to the same remote sources. The Revision Manager cache spontaneously refreshes when objects of interest are changed. In addition, because the Revision Manager can be placed in a location that is "close to" a group of users in a network sense, access by users to frequently accessed objects can be provided at a lower communication cost, with reduced latency, and with more timely updates.

The Revision Manager described here provides many benefits associated with distributed information logistics services (DILS). In general, DILS aims to provide information to users in a more timely way while minimizing communication costs. Toward that end, the Revision Manager provides reduced latency and reduced communication costs by providing a spontaneously updated cache that can service users' requests for frequently accessed objects. The Revision Manager can be located anywhere on the Internet, including local to the environment of each group of users.

By doing this, local communication will usually suffice for accessing repeatedly accessed objects. This reduces latency and cost. Because the Revision Manager updates the cache spontaneously when appropriate, users accessing cached objects will obtain information that is or was very recently the most current available. In addition, multiple Revision Managers can be placed at different sites, thereby providing different groups the benefits of DILS.

The Revision Manager can assist individuals or organizations to achieve a higher level of information value delivered when processing resources are limited. Processing resource limitations can include: (1) inadequate communication bandwidth to allow all users to access all objects as often as they would like; and (2) inadequate personnel or computational resources to process and integrate all objects and updates received. In these cases, users can specify their interests in objects abstractly, characterizing aspects of objects they are interested in. Furthermore, users can specify a degree of interest in such aspects, using some appropriate algorithm, parameterized function, or rule-based specification. A community of information suppliers and users can agree to simplify the process of such characterizations and computation of degree of changes by agreeing on standard types of aspects of objects and measures of degree of interest. The importance a user attaches to receiving any particular item of information as a function of time can be termed the time-value of that information.

The Revision Manager may accept specifications for an HTML-formatted document. In other kinds of network environments, however, clients may wish to retrieve a variety of objects such as files, database records, spreadsheets, tables, charts, graphs, notes, digitized photographs, and multimedia objects such as audio-visual presentations. It would also be desirable to include hyperlinks in these other kinds of objects, using a variety of hyperlink protocols such as HTTP, FTP, Gopher, WAIS, CORBA, Lotus Notes, etc.

The objects themselves could be a web or collection of objects. For example, the object could be a web in the form of a graph whose nodes are any kinds of objects and whose links are of any type so long as methods are provided to traverse the graph to access objects of interest given a starting object and a set of links. In addition to using the links identifying related objects of interest, links could be used to propagate changes to related objects. For example, summary documents could be linked to supporting documents so that the summary information is updated automatically in response to changes in the supporting documents. A specific example would be a financial statement that would change the total value of an investment portfolio in response to changes in the value of stocks and bonds in the portfolio. In this case, it would be desirable for the Revision Manager to include the documents or objects subject to change in the list of parties interested in each supporting document or object. The document or object subject to change could have, as attached attributes, a flag for each supporting document indicating whether the document or object should be regenerated in view of a change to the supporting document, and the Revision Manager could send change notification messages that would set the flags when the supporting documents change. Alternatively, the Revision Manager could send a copy of each revised supporting document to the document subject to change, so that the document subject to change could be automatically revised upon receipt of each copy of the revised supporting document.

In general, an object could be specified as a set of other objects. The set could be explicitly enumerated, computed according to a specified procedure or rule set, or defined as a neighborhood or cluster of semantically related objects. The set could be explicitly enumerated by listing all of the elements of the set. The set could be computed according to a rule set by invoking a list of rules having conditional actions that gather the elements of the set. The set could be defined as a neighborhood or cluster of semantically related objects by a search specification of key words or by proximity within some multidimensional space of objects indexed by attribute values.

The Revision Manager may maintain a list of mechanisms that are used to notify each party of interest. Each party of interest may also specify criteria by which a change to an object is evaluated to determine whether or not the change would be of sufficient significance to warrant notification of the party of interest. Each party of interest could be a computer program or a human user.

The Revision Manager may register incorporations of or "subscriptions" to documents of general interest so that incorporating documents or subscribing applications can be activated automatically when documents have changed, in a manner akin to the triggering of the registered browser applications and the automatic updating of the browsers' views. Applications other than browsers can be similarly triggered using conventional procedure calls or appropriate messages.

The Revision Manager may coordinate notification of object updates among a group of users to enable all users in a group to be made aware simultaneously of a change in an object such as a key document. The Revision Manager may also coordinate views among a group of users by causing the object accessed by a designated member of the group to be displayed to all other members of the group to enable all users in the group to access and view simultaneously whatever object the designated member chooses to view. For example, the Revision Manager could be used to synchronize the views of various users at different locations to a single presentation composed of a sequence of objects accessed by a presenter through the presenter's browser. Thus, when the presenter selected a new object such as a presentation graphic, the other group members would see the same object.

In short, the Revision Manager makes it possible to route information from suppliers to recipients in a manner that is sensitive to and responsive to its time-value. By emulating a standard HTTPD server from the perspective of the user's client browser, the Revision Manager makes possible the benefits of DILS without requiring any changes to the many browsers already in existence that comply with the HTTP protocol. In a similar way, the Revision Manager provides an architecture for adding value between these browsers and conventional HTTPD servers. In particular, this architecture allows developers to provide DILS capabilities as an augmentation to existing systems without modifying those systems. Specifically, the Revision Manager makes it possible to add services to all HTTP-compliant systems, including services that provide registration of interests, updating intervals, change monitoring, automatic notification of changes, and display of updated information.

Other services can readily be added using the Revision Manager and its architecture for adding value to HTTP-compliant systems. For example, the Revision Manager can intercept, translate, and redirect resource locators employing other types of network protocols to support caching and improved access to objects other than those accessible via HTTP. In particular, resource locators for objects accessible through protocols such as FTP, WAIS, Gopher, CORBA, and Lotus Notes can be processed by the Revision Manager in a way entirely analogous to that disclosed here for URLs specifying HTTP-accessible objects.

While our above description contains many specificities, these should not be construed as limitations on the scope of the invention, but rather as an exemplification of one preferred embodiment thereof. Many other variations are possible. For example, an operating system file configuration control or management service (such as the Unix Revision Control System (RCS) or Software Configuration Control System (SCCS), the Microsoft Windows operating system environment and INTERSOLV PVCS or MKS's RCS Source Integrity software program or One Tree Software's Source Safe software program) could be used to detect changes to files and cause the initiation of actions which could be used to notify a user that a file of interest has changed. This would eliminate the network cost of polling and accomplish detections immediately rather than requiring a wait until the next poll event. The Revision Manager could also detect a change in an object of interest in response to events communicated to it in a distributed computing environment. Various kinds of event mechanisms could be used such as remote procedure calls and similar events in distributed operating systems such as CORBA (trademark of OMG of Framingham, Mass.) and DCE (trademark of OSF of Cambridge, Mass.).

Although the invention has been described generally for distributing information to interested network clients, the information itself could be a commercial product, and the invention would be useful for automatically distributing this commercial product to customers. For example, the commercial product could be a software program or a user's manual. In this case, the invention would provide a product update distribution service such that when a new product or update is available for distribution, it will be distributed automatically to all customers who are users that have specified a requirement to obtain the product or update. Therefore, the present invention provides many new kinds of services over internetworks for distributing software updates automatically to registered users without repetitive action by distributors or customers. Accordingly, the scope of the invention is not to be limited by the embodiments illustrated, but only by the appended claims and their legal equivalents.

GLOSSARY

Browser:

A "browser" refers to a WWW browser, a hypertext application which serves as a graphical hypermedia front-end to the Internet. There are numerous free and commercial hypertext browsers, the most well-known today are NCSA's Mosaic and Netscape Communication's Netscape.

CCI:

Common Client Interface was introduced by NCSA as a simple protocol for controlling a browser remotely. It has been proposed as a standard for all similar browsers. CCI is described in a web document "http:/www.ncsa.uiuc.edu/SDG/Software/XMosaic/CCI/cci-api.html." entitled "Application Programmer's Interface for the NCSA Mosaic Common Client Interface (CCI)." The NCSA Mosaic CCI Application Programmer's Interface (API) is a freely-distributed library, written in the C programming language, for programmers creating software that will interact with NCSA Mosaic.

CGI:

Common Gateway Interface, the standard by which external programs (often called gateways) interface with an HTTPD server. Thus, CGI programs act as gateways between the HTTPD server and databases, or between the server and local programs or document generators. These programs are called by an HTTPD server upon receiving a URL request sent from a browser. The URL contains the path name of the program and argument data that the program would need to have. The program produces an HTML document and sends it to the browser. CGI is described in a web document http://hoohoo.ncsa.uiuc.edu/cgi/interface.html, entitled "The CGI Specification".

Distributed Information Logistics Services (DILS):

Techniques for reducing human effort, communication costs, and latency in the access by users to information whose value may be time-dependent and perishable. Using DILS, systems can reduce the costs associated with providing information to users which they judge to be of higher value than what they would otherwise obtain at the same cost.

FORM:

The FORM element allows the creation of a fill-in form. The user types information into the fields of the form and this information can be passed to a CGI script on an HTTPD server. FORM is supported by many, but not all, browsers. A form is available to a browser, via a URL, as a regular HTML document. The content of the document is a fill-in form. It usually contains a "submit" button. Once the "submit" button is pressed, the data a user has entered is passed to the server from the browser by sending a URL.

HTML:

HyperText Markup Language, a platform-independent page description language. Based on SGML (Standard Generalized Markup Language), HTML lets you prepare documents for WWW browsing by embedding control codes in ASCII text to designate titles, headings, graphics, and hypertext links.

HTTP:

The Hyper Text Transfer Protocol (HTTP) is an application-level protocol with the lightness and speed necessary for distributed, collaborative, hypermedia information systems. It has been in use by the Internet World-Wide Web global information initiative since 1990. The application agents using HTTP are HTTP client browsers and HTTP Daemon (HTTPD) servers. The HTTPD servers provide a particular resource and understand the HTTP protocol; the client browsers make use of that resource and issue HTTP requests to the server.

Internet:

During the late 1960s, the U.S. Advanced Research Projects Agency (ARPA) funded a project for building a computer network that would directly connect remote computers and their users, and allow remote research and development sites to exchange information. This network was called ARPANET. Since then, ARPANET has been extensively expanded and modified. During the early 1980s, many of the interconnected research networks were converted to the TCP/IP protocol, and the descendants of ARPANET form the global backbone of internetworks, now called the Internet.

Proxy:

A proxy is an HTTPD gateway server which allows HTTP browsers to pass on a network request (in the form of a URL) to an outside agent, which performs the request and returns the results to the browser. The intended effect of this is to allow browsers that are sealed off from an internetwork to pass their network requests off to a trusted agent which can access the internetwork for the browser. A user of a browser using a proxy gateway should feel as if he or she were directly connected to the internetwork. The proxy server saves the requested documents as cache files and periodically runs a "garbage collection" process to reclaim storage from unwanted documents. To use a proxy, the browser needs to be configured to use the proxy before it is running. Once it is configured, the browser relies on the proxy to carry out all of its requests.

URL:

Uniform Resource Locator, the mechanism by which documents or data are addressed in the World-Wide Web. A URL contains the following information:

1. The type of service the resource is served by (e.g., HTTP, Gopher, WAIS, and ftp).
2. The Internet name of the site containing the resource (document or data).
3. The Internet port number of the service. If this is omitted, the browser assumes a default value.
4. The location of the resource in the directory structure of the server. (An example is: http://www.address.edu:1234/path/subdir/file.html.)
5. The location of an application program to be executed by the server for viewing the data and the data to be passed to the program. (An example is: http://some.site.Edu/cgi-bin/foo?arg1+arg2+arg3. This means the server is to execute a program called foo, which is located under the "cgi-bin" directory at the Internet site "some.site.edu". This program will receive three arguments: arg1, arg2 and arg3, and in turn act on the arguments and return information, documents, etc., to the browser.)

World-Wide Web (WWW):

A network of computers providing information and resources on the Internet. It grew out of a hypertext project started at CERN, the European Laboratory for Particle Physics, near Geneva, Switzerland. As a resource for finding information and services ranging from protein databank searches to pizza deliveries, the World-Wide Web (WWW) has become a centerpiece of the Internet. To access information on the WWW, hypertext-based browsers, such as the National Center for Supercomputing Applications (NCSA) Mosaic, are used to lead users to particular documents stored on internetwork hosts and file servers, and display the information contained in these documents in the browser window. The protocol used between WWW client browsers and servers is the HyperText Transfer Protocol (HTTP). The information on a "page" that is displayed by the browser can be written in either plain text or HyperText Markup Language (HTML) format, which is a document type definition (DTD) written in the Standard Generalized Markup Language (SGML).

What is claimed is:

1. In a distributed computing system having a network of computers linked for accessing objects distributed among said computers, some of said computers executing object access software enabling interested parties to request access to said objects for display of accessed ones of said objects, a computer-implemented method of operating at least one of said computers for automatically notifying said interested parties when objects of interest are changed, said computer-implemented method comprising the steps of:

a) accepting from said interested parties specifications of the objects of interest;

b) maintaining in memory a list of the interested parties interested in each of the objects of interest;

c) detecting occurrence of changes in the objects of interest, and in response to detecting the occurrence of a change in an object of interest, determining whether an update notification would then be desirable for each interested party in the list of interested parties interested in the object of interest in which the occurrence of change is detected; and d) upon determining that an update notification would then be desirable for one of the interested parties in response to detecting the occurrence of change in one of said objects of interest, notifying said one of the interested parties of the occurrence of change in said one of said objects of interest for display of said one of said objects of interest.

2. The method as claimed in claim 1, wherein said interested parties are HTTP-compliant client browsers, said specifications are accepted from said interested parties by following an HTTP client-to-server data transmission protocol, and said one of said interested parties is notified of the occurrence of change in said one of said objects of interest by following an HTTP server-to-client data transmission protocol.

3. The method as claimed in claim 1, which further includes:

in response to accepting a specification of each object of interest, checking a cache memory for said each object of interest, and when said cache memory does not contain said each object of interest, obtaining said each object of interest by transmitting said each object of interest over said network from a computer in said network to said cache memory, and storing said each object of interest in said cache memory; and wherein said one of said objects is fetched from said cache memory for said one of said interested parties for display.

4. The method as claimed in claim 1, which further includes highlighting changes in said one of said objects of interest when displaying said one of said objects of interest.

5. The method as claimed in claim 1, which further includes accepting a desired update notification frequency from each interested party, and using the desired update notification frequency for determining whether an update notification would then be desirable for each interested party in the list of interested parties interested in the object of interest in which the occurrence of change is detected.

6. The method as claimed in claim 1, which further includes recording, for each object of interest, the time when said each object of interest was updated, and inspecting the recorded time when each object of interest was updated for detecting the occurrence of a change in said each object of interest.

7. The method as claimed in claim 1, wherein said specifications include specifications of aggregates of objects, and said method includes determining the objects in the specified aggregates of objects for maintaining in memory the list of the interested parties interested in each of the objects of interest.

8. The method as claimed in claim 1, wherein the specifications include abstract characterizations of attributes of objects, and further including the step of matching said abstract characterizations with attributes of objects stored in said distributed computing system to determine objects that are specified by said abstract characterizations.

9. In a distributed computing system having a network of computers linked for accessing objects distributed among said computers, some of said computers executing object access software for providing client browsers for fetching said objects, a computer-implemented method of operating at least one of said computers for automatically notifying said client browsers when objects of interest are changed, said computer-implemented method comprising the steps of:

a) accepting from each client browser a specification of an object of interest, said specification including a resource locator identifying one of said computers containing said object of interest;

b) maintaining in memory a list of the client browsers interested in said object of interest;

c) checking a cache memory for said object of interest, and when said cache memory does not contain said object of interest, obtaining said object of interest by transmitting said object of interest over said network from said one of said computers containing said object of interest to said cache memory, storing said object of interest in said cache memory, and modifying the resource locator for said object of interest to create a modified resource locator for said object of interest identifying said cache memory as a location for obtaining said object of interest;

d) transmitting the modified resource locator for said object of interest from said cache memory to said each client browser, said each client browser thereafter using said modified locator for said object of interest to fetch said object of interest from said cache memory;

e) detecting occurrence of change in said object of interest, and in response to detecting the occurrence of change in said object of interest, determining whether an update notification would then be desirable for each of the client browsers in the list of client browsers interested in said object of interest; and f) upon determining that an update notification would then be desirable for one of the client browsers in response to detecting the occurrence of change in said object of interest, notifying said one of the client browsers of the occurrence of change in said object of interest.

10. The method as claimed in claim 9, which includes maintaining a list of mechanisms used for notifying client browsers of the occurrence of change in the respective objects of interest.

11. In a distributed computing system having a network of computers linked for accessing objects distributed among said computers, some of said computers executing object access software for providing client browsers for fetching said objects, said object access software using standard resource location protocols for specifying the objects to be fetched, a computer-implemented method of operating at least one of said computers for providing objects from a cache located close to a group of said client browsers, said computer-implemented method comprising the steps of:

a) obtaining objects of interest to said group of client browsers by transmitting said objects of interest over said network to said cache from computers in said distributed computing system containing said objects of interest; and b) transmitting said objects of interest from said cache to said client browsers in said group of client browsers;

wherein said client browsers are HTTP-compliant client browsers following an HTTP client-to-server data transmission protocol, and said method further includes modifying resource locators for said objects of interest to create modified resource locators identifying said cache as a location for obtaining said objects of interest.

12. The method as claimed in claim 11, wherein said client browsers are HTTP-compliant client browsers following an HTTP client-to-server data transmission protocol, and said method further includes checking said cache for an object of interest identified by a resource locator in a specification received from one of said client browsers in said group of client browsers, and when said cache does not contain the object of interest identified by the resource locator, redirecting said one of said specifications to one of said computers identified by said resource locator as a location for obtaining the object of interest.

13. The method as claimed in claim 12, wherein said cache stores objects of interest obtained from various ones of said computers in said distributed computing system, and said method includes transmitting the objects of interest from said cache to said client browsers in said group of client browsers instead of transmitting the objects of interest from said various ones of said computers in said distributed computing system to said client browsers in said group of client browsers in order to reduce latency for access to the objects of interest stored in said cache.

14. The method as claimed in claim 12, wherein said cache stores objects of interest obtained from various ones of said computers in said distributed computing system, and said method includes transmitting the objects of interest from said cache to said client browsers in said group of client browsers instead of transmitting the objects of interest from said various ones of said computers in said distributed computing system to said client browsers in said group of client browsers in order to reduce communication access costs for access to the objects of interest stored in said cache.

15. The method as claimed in claim 11, which further includes selecting among alternative sources for objects of interest to be stored in said cache by employing performance, cost or quality statistics on resource accesses from said alternative sources.

16. The method as claimed in claim 15, which further includes collecting and maintaining said performance, cost or quality statistics on resource accesses from said alternative sources.

17. In a distributed computing system having a network of computers linked for accessing objects distributed among said computers, some of said computers executing object access software for providing client browsers for fetching said objects, said object access software using standard resource location protocols for specifying the objects to be fetched, a computer-implemented method of operating at least one of said computers for providing objects from a cache located close to a group of said client browsers, said computer-implemented method comprising the steps of:

a) obtaining objects of interest to said group of client browsers by having said objects of interest transmitted over said network to said cache from computers in said distributed computing system containing said objects of interest; and b) transmitting said objects of interest from said cache to said client browsers in said group of client browsers;

wherein said method further includes:

c) accepting from said client browsers specifications of objects of interest for which said client browsers desire notification of changes;

d) detecting occurrence of changes in the objects of interest, and in response to detecting the occurrence of a change in an object of interest, determining whether an update notification would then be desirable for each client browser desiring notification of changes in the object of interest in which the occurrence of change is detected; and e) upon determining that an update notification would then be desirable for one of the client browsers, notifying said one of the client browsers of the occurrence of change in said one of said objects of interest.

18. The method as claimed in claim 17, which further includes:

f) recording a first indication of when said one of said objects of interest was last changed;

g) recording a second indication of when said one of the client browsers was last notified of the occurrence of change in said one of said objects of interest;

h) receiving from said one of the client browsers a specification of a desired update notification frequency; and i) using said first indication, said second indication, and said specification of said desired update notification frequency to determine that an update notification would then be desirable to said one of said client browsers.

19. The method as claimed in claim 17, which further includes recording an indication of changes made to the objects stored in said cache, and providing, to said client browsers in said group of client browsers, summaries of changes made to the objects stored in said cache.

20. A distributed computing system comprising a network of computers linked for accessing objects distributed among said computers, some of said computers executing object access software for providing client browsers for fetching said objects, said object access software using standard resource location protocols for specifying the objects to be fetched, wherein a plurality of said computers are distributed around the network and programmed to maintain in respective cache memories objects of interest to respective neighboring groups of said client browsers by fetching the objects of interest from various ones of said computers across said network and storing the objects of interest in the cache memories, and transmitting the objects of interest from the cache memories to the respective neighboring groups of said client browsers;

further including means for employing performance, cost or quality statistics of resource accesses to select among alternative sources for the objects of interest stored in said cache memories; and means for selecting among alternative sources for the objects of interest by optimizing a user objective function trading off communication cost factors against quality of service factors including latency.

21. The distributed computing system as claimed in claim 20, wherein said cache memories are distributed at selected locations around said network, and said client browsers are grouped to be serviced by said cache memories.

22. A distributed computing system comprising a network of computers linked for accessing objects distributed among said computers. some of said computers executing object access software for providing client browsers for fetching said objects, said object access software using standard resource location protocols for specifying the objects to be fetched, wherein a plurality of said computers are distributed around the network and programmed to maintain in respective cache memories objects of interest to respective neighboring groups of said client browsers by fetching the objects of interest from various ones of said computers across said network and storing the objects of interest in the cache memories, and transmitting the objects of interest from the cache memories to the respective neighboring groups of said client browsers;

further including means for employing performance, cost or quality statistics of resource accesses to select among alternative sources for the objects of interest stored in said cache memories; and wherein said cache memories are distributed at selected locations around said network, and said client browsers are selectively grouped to be serviced by said cache memories, in order to optimize expected value of an objective function in probability over a distribution of expected accesses of the objects of interest to the client browsers included in said groups of client browsers.

23. A distributed computing system comprising a network of computers linked for accessing objects distributed among said computers, some of said computers executing object access software for providing client browsers for fetching said objects, said object access software using standard resource location protocols for specifying the objects to be fetched, wherein a plurality of said computers are distributed around the network and programmed to maintain in respective cache memories objects of interest to respective neighboring groups of said client browsers by fetching the objects of interest from various ones of said computers across said network and storing the objects of interest in the cache memories, and transmitting the objects of interest from the cache memories to the respective neighboring groups of said client browsers;

further including means for employing Performance, cost or quality statistics of resource accesses to select among alternative sources for the objects of interest stored in said cache memories; and means associated with one of said cache memories for determining, for each object of interest in said one of said cache memories and for each client browser serviced by said one of said cache memories and being interested in said each object of interest in said one of said cache memories, whether an update notification would be desirable at a specific point in time.

24. A distributed computing system comprising a network of computers linked for accessing objects distributed among said computers, some of said computers executing object access software for providing client browsers for fetching said objects, wherein a plurality of said computers are distributed around the network and programmed to maintain in respective cache memories objects of interest to respective neighboring groups of said client browsers by fetching the objects of interest from various ones of said computers across said network and storing the objects of interest in the cache memories, and transmitting the objects of interest from the cache memories to the respective neighboring groups of said client browsers, wherein said distributed computing system includes, for one of said cache memories, means for receiving resource interest specifications from the client browsers serviced from said one of said cache memories, means for maintaining in said one of said cache memories objects that satisfy said resource interest specification, and means for maintaining a list of mechanisms for sending information to the client browsers serviced from said one of said cache memories.

25. The distributed computing system as claimed in claim 24, wherein said distributed computing system further includes, for said one of said cache memories, means for using said lists of mechanisms to send notice of changes in objects of interest to the client browsers serviced from said one of said cache memories.

26. The distributed computing system as claimed in claim 24, further including means for employing performance, cost or quality statistics of resource accesses to select among alternative sources for the objects of interest stored in said cache memories.

27. The distributed computing system as claimed in claim 26, further including means for collecting and maintaining said performance, cost or quality statistics on resource accesses from said alternative sources.

28. The method as claimed in claim 24, further including means associated with one of said cache memories for determining, for each object of interest in said one of said cache memories and for each client browser serviced by said one of said cache memories and being interested in said each object of interest in said one of said cache memories, whether an update notification would be desirable at a specific point in time.

29. In a distributed computing system having a network of clients and servers, said clients sending resource requests to said servers, a computer-implemented method of using a resource manager in said distributed computing system for intermediating between said clients and servers, said method including the steps of:
   a) said resource manager intercepting said resource requests from said clients;
   b) said resource manager fetching objects from servers to satisfy said resource requests from said clients, said objects fetched from said servers having respective resource locators identifying the respective sources of the objects fetched from said clients;
   c) said resource manager modifying said resource locators to identify said resource manager as a source for the objects fetched from the servers to satisfy said resource requests from said clients; and
   d) said resource manager returning the fetched objects and modified resource locators to said clients.

30. The method as claimed in claim 29, wherein said clients are HTTP-compliant clients, said resource requests are accepted from said clients by following an HTTP client-to-server data transmission protocol, and said resource manager returns the fetched objects and modified resource locators to said clients by following an HTTP server-to-client data transmission protocol.

31. The method as claimed in claim 29, which further includes said resource manager redirecting one of said resource requests to an alternative server expected to produce higher quality information at lower cost.

32. The method as claimed in claim 29, which further includes said resource manager selecting among alternative sources for objects.

33. The method as claimed in claim 32, which further includes said resource manager using information about costs of the alternative sources to select lowest-cost alternative sources for objects.

34. The method as claimed in claim 32, which further includes said resource manager using information about quality and costs of the alternative sources for objects to select among the alternative sources for objects by a trade-off between quality and cost.

35. The method as claimed in claim 32, which further includes said resource manager collecting and maintaining said performance, cost or quality statistics on resource accesses from said alternative sources, and using said statistics on resource accesses for the selecting among the alternative sources for objects.

36. The method as claimed in claim 29, which further includes said resource manager storing in a cache memory objects having respective resource locators that are modified by the resource manager to indicate that the resource manager is a source of the objects, and said resource manager responding to resource requests from said clients by checking said cache memory for objects that satisfy the resource requests, and when said resource manager finds an object in said cache memory that satisfies one of the resource requests, said resource manager transmitting the object from the cache memory to the client requesting the object.

37. The method as claimed in claim 36, which further includes said resource manager redirecting a request from a client for a specified object to a server when the resource manager checks said cache memory for the specified object and the specified object is absent from said cache memory.

38. In a distributed computing system having a network of computers linked for accessing objects distributed among said computers, some of said computers executing object access software for enabling interested parties to request access to said objects, a computer-implemented method of providing the interested parties with summary reports of how objects of interest have changed, said computer-implemented method comprising the steps of:
   a) accepting from said interested parties specifications of the objects of interest;
   b) maintaining in memory a list of the interested parties interested in each of the objects of interest;
   c) maintaining in memory a list of mechanisms for notifying the interested parties of changes in each of the objects of interest;
   d) detecting occurrence of changes in the objects of interest, and in response to detecting an occurrence of a change in an object of interest, recording information about the change in the object of interest; and
   e) using recorded information about changes in the object of interest that has changed, using the list of interested parties interested in the object that has changed, and using the list of mechanisms for notifying the interested parties of changes in the object of interest that has changed, to provide, to the interested parties interested in the object that has changed, a summary of changes in the object of interest that has changed, said summary of changes including changes occurring since a certain point in time.

39. The method as claimed in claim 38, which further includes said computers executing said object-access software to display said object of interest that has changed, and to highlight changes in said object of interest that has changed.

40. In a distributed computing system having a network of computers linked for accessing objects distributed among said computers, some of said computers executing object access software enabling interested parties to request access to said objects, a computer-implemented method of operating at least one of said computers for automatically notifying said interested parties when objects of interest are changed, said computer-implemented method comprising the steps of:
   a) accepting from said interested parties specifications of the objects of interest;
   b) maintaining in memory a list of the interested parties interested in each of the objects of interest;
   c) maintaining in memory a list of mechanisms for notifying the interested parties of changes in each of the objects of interest;
   d) determining when an update notification would be desirable for each interested party in the list of interested parties; and
   e) when an update notification would be desirable for one of the interested parties interested in one of the objects of interest, using said list of mechanisms to notify said one of the interested parties of the occurrence of change in said one of the objects of interest.

41. The method as claimed in claim 40, wherein one of said objects of interest contains hyperlinks, and wherein the method includes traversing said hyperlinks to access components of said one of said objects of interest.

42. The method as claimed in claim 40, wherein the object is an aggregate of multiple objects, and wherein the step of determining when an update notification would be desirable for each interested party in the list of interested parties includes determining whether a change has occurred in a specified subset of said multiple objects.

43. The method as claimed in claim 40, wherein the method further includes determining when a change occurs in each of the objects of interest, and determining whether an update notification would be desirable when a change occurs in each of the objects of interest.

44. The method as claimed in claim 40, wherein the method further includes polling a source of an object of interest in order to determine whether an update notification would be desirable.

45. The method as claimed in claim 40, wherein a source of an object of interest produces a change indication when change occurs in the object of interest, and wherein the step of determining whether an update notification would be desirable is responsive to the change indication from the source of the object of interest.

46. In a distributed computing system having a network of computers linked for accessing objects distributed among said computers, some of said computers executing object access software for enabling interested parties to request access to said objects, a computer-implemented method of operating at least one of said computers for notifying a group of said interested parties when a change of significance is made to an object of interest to said group, said computer-implemented method comprising the steps of:
   a) accepting from said interested parties specifications of the objects of interest;
   b) maintaining in memory a list of the interested parties interested in each of the objects of interest;
   c) determining, for each object of interest, whether a change of significance has been made to an object of interest; and
   d) upon determining that a change of significance has been made to an object of interest, using the list of interested parties interested in the object of interest that has changed to notify the interested parties interested in the object of interest that has changed.

47. The method as claimed in claim 46, which includes maintaining in memory a list of significant change detection methods for each object of interest, and wherein the list of significant change detection methods for each object of interest is used when a change is detected in said each object of interest to determine whether a change of significance has been made in said each object of interest.

48. The method as claimed in claim 46, wherein one of the interested parties in said group of interested parties makes a change of significance to an object of interest to said group of interested parties, and all other interested parties in said group of interested parties are notified virtually simultaneously of the change of significance made by said one of the interested parties in said group of interested parties.

49. In a distributed computing system having a network of computers linked for accessing objects distributed among said computers, some of said computers executing object access software for enabling interested parties to request access to said objects, a computer-implemented method of operating at least one of said computers for automatically notifying interested parties when a change is made to a component of an object defined as a neighborhood or cluster of semantically related objects, said computer-implemented method comprising the steps of:
   a) maintaining in memory a list of interested parties interested in said object defined as a neighborhood or cluster of semantically related objects;
   b) determining whether a change has occurred in said object defined as a neighborhood or cluster of semantically related objects;
   c) upon determining that a change has occurred in said object defined as a neighborhood or cluster of semantically related objects, notifying interested parties by using said list of interested parties interested in said object defined as a neighborhood or cluster of semantically related objects.

50. The method as claimed in claim 49, which further includes receiving from one of said interested parties a specification of said object defined as a neighborhood or cluster of semantically related objects.

51. In a distributed computing system having a network of computers linked for accessing objects distributed among said computers, some of said computers executing object access software for enabling interested parties to request access to said objects, a computer-implemented method of operating at least one of said computers for automatically notifying interested parties when a change is made to a component of an object defined as a neighborhood or cluster of semantically related objects, said computer-implemented method comprising the steps of:
   a) maintaining in memory a list of interested parties interested in said object defined as a neighborhood or cluster of semantically related objects;
   b) determining whether a change has occurred in said object defined as a neighborhood or cluster of semantically related objects;
   c) upon determining that a change has occurred in said object defined as a neighborhood or cluster of semantically related objects, notifying interested parties by using said list of interested parties interested in said object defined as a neighborhood or cluster of semantically related objects;
   which further includes receiving from one of said interested parties a specification of said object defined as a neighborhood or cluster of semantically related objects, wherein said specification is a search specification of key words.

52. The method as claimed in claim 51, which further includes maintaining a list of mechanisms for notifying said interested parties, and using said list of mechanisms for notifying said interested parties when notifying the interested parties interested in said object defined as a neighborhood or cluster of semantically related objects.

53. In a distributed computing system having a network of computers linked for accessing objects distributed among said computers, some of said computers executing object access software for enabling interested parties to request access to said objects, a computer-implemented method of operating at least one of said computers based on time-value of information in said objects, said computer-implemented method comprising the steps of:
   a) receiving from the interested parties specifications of objects of interest;
   b) maintaining in memory a list of the interested parties interested in the objects of interest;
   c) evaluating whether a time-value of each object of interest exceeds a threshold to determine whether said each object of interest has sufficient information value to notify the interested parties interested in said each object of interest; and d) upon determining that said each object of interest has sufficient information value to notify the interested parties interested in said each object of interest, notifying the interested parties interested in said each object of interest.

54. In a distributed computing system having a network of computers linked for accessing objects distributed among said computers, some of said computers executing object access software for enabling interested parties to request access to said objects, a computer-implemented method of operating at least one of said computers based on time-value of information in said objects, said computer-implemented method comprising the steps of:

a) receiving from the interested parties specifications of objects of interest;

b) maintaining in memory a list of the interested parties interested in the objects of interest;

c) evaluating whether a time-value of each object of interest exceeds a threshold to determine whether said each object of interest has sufficient information value to notify the interested parties interested in said each object of interest; and d) upon determining that said each object of interest has sufficient information value to notify the interested parties interested in said each object of interest, notifying the interested parties interested in said each object of interest;

which further includes maintaining in memory a list of time-value calculations for each of said interested parties, and using said time-value calculations for evaluating whether said each object of interest has sufficient information value to notify each of the interested parties interested in said each object of interest.

55. In a distributed computing system having a network of computers linked for accessing objects distributed among said computers, some of said computers executing object access software for enabling interested parties to request access to said objects, a computer-implemented method of operating at least one of said computers based on time-value of information in said objects, said computer-implemented method comprising the steps of:

a) receiving from the interested parties specifications of objects of interest;

b) maintaining in memory a list of the interested parties interested in the objects of interest;

c) evaluating whether a time-value of each object of interest exceeds a threshold to determine whether said each object of interest has sufficient information value to notify the interested parties interested in said each object of interest; and d) upon determining that said each object of interest has sufficient information value to notify the interested parties interested in said each object of interest, notifying the interested parties interested in said each object of interest;

which further includes receiving from the interested parties specifications for evaluating the time-value of objects of interest to the interested parties.

56. The method as claimed in claim 55, wherein one of the interested parties specifies a procedure which is executed to evaluate the time-value of one of said objects of interest.

57. The method as claimed in claim 55, wherein one of the interested parties specifies parameters for a function that evaluates the time-value of one of said objects of interest.

58. The method as claimed in claim 55, wherein one of the interested parties specifies knowledge for a knowledge-based system that evaluates the time-value of one of said objects of interest.

59. In a distributed computing system having a network of computers linked for accessing objects distributed among said computers, some of said computers executing object access software for enabling interested parties to request access to said objects, a computer-implemented method of operating at least one of said computers based on time-value of information in said objects, said computer-implemented method comprising the steps of:

a) receiving from said interested parties specifications of objects of interest, and specifications of significant information value for said objects of interest;

b) maintaining in memory a list of interested parties interested in the objects of interest;

c) evaluating said specifications of significant information value for said objects of interest to determine whether each object of interest has sufficient information value to notify the interested parties interested in said each object of interest; and d) upon determining that said each object of interest has sufficient information value to notify the interested parties interested in said each object of interest, notifying the interested parties interested in said each object of interest.

60. In a distributed computing system having a network of computers linked for accessing objects distributed among said computers, some of said computers executing object access software for enabling interested parties to request access to said objects, a computer-implemented method of operating at least one of said computers based on time-value of information in said objects, said computer-implemented method comprising the steps of:

a) receiving from said interested parties specifications of objects of interest, and specifications of significant information value for said objects of interest;

b) maintaining in memory a list of interested parties interested in the objects of interest;

c) evaluating said specifications of significant information value for said objects of interest to determine whether each object of interest has sufficient information value to notify the interested parties interested in said each object of interest; and d) upon determining that said each object of interest has sufficient information value to notify the interested parties interested in said each object of interest, notifying the interested parties interested in said each object of interest;

wherein one of said specifications of significant information value for said objects of interest is a time-value calculation specified by one of said interested parties for one of said objects of interest, and said time-value calculation is evaluated to determine whether said one of said objects of interest has sufficient information value to notify said one of said interested parties.

61. In a distributed computing system having a network of computers linked for accessing objects distributed among said computers, some of said computers executing object access software for enabling interested parties to request access to said objects, a computer-implemented method of operating at least one of said computers based on time-value of information in said objects, said computer-implemented method comprising the steps of:

a) receiving from said interested parties specifications of objects of interest, and specifications of significant information value for said objects of interest;

b) maintaining in memory a list of interested parties interested in the objects of interest;

c) evaluating said specifications of significant information value for said objects of interest to determine whether each object of interest has sufficient information value to notify the interested parties interested in said each object of interest; and d) upon determining that said each object of interest has sufficient information value to notify the interested parties interested in said each object of interest, notifying the interested parties interested in said each object of interest;

wherein one of said specifications of significant information value for said objects of interest is knowledge specified by one of said interested parties for one of said objects of interest, and said knowledge is evaluated by a knowledge-based system to determine whether said one of said objects of interest has sufficient information value to notify said one of said interested parties.

62. In a distributed computing system having a network of computers linked for accessing objects distributed among said computers, some of said computers being client computers executing object access software for permitting users to view information from said objects, a computer-implemented method of operating at least one of said computers for automatically notifying said client computers when conditions of interest occur with respect to objects of interest, said computer-implemented method comprising the steps of:

a) accepting from each client computer a specification of an object of interest, said specification including a resource locator identifying one of said computers containing said object of interest;

b) maintaining in memory a list of the client computers interested in said object of interest;

c) checking a cache memory for said object of interest, and when said cache memory does not contain said object of interest, obtaining said object of interest by transmitting said object of interest over said network from said one of said computers containing said object of interest to said cache memory, storing said object of interest in said cache memory, and modifying the resource locator for said object of interest to create a modified resource locator for said object of interest identifying said cache memory as a location for obtaining said object of interest;

d) transmitting the modified resource locator for said object of interest from said cache memory to said each client computer, said each client computer thereafter using said modified locator for said object of interest to fetch said object of interest from said cache memory;

e) detecting a condition of interest with respect to said object of interest, and in response to detecting the condition of interest with respect to said object of interest, determining whether a notification of the condition of interest would then be desirable for each of the client computers in the list of client computers interested in said object of interest; and f) upon determining that a notification of the condition of interest would then be desirable for one of the client computers in response to detecting the condition of interest in said object of interest, notifying said one of the client computers of the occurrence of the condition of interest in said object of interest.

63. The method as claimed in claim 62, which includes maintaining a list of mechanisms used for notifying respective client computers of the occurrence of respective conditions of interest in the respective objects of interest.

64. In a distributed computing system having a network of computers linked for accessing objects distributed among said computers, some of said computers executing object access software enabling interested parties to request access to said objects, a computer-implemented method of operating at least one of said computers for automatically notifying said interested parties when conditions of interest occur with respect to objects of interest, said computer-implemented method comprising the steps of:

a) accepting from said interested parties specifications of the objects of interest, and specifications of respective conditions of interest in the objects of interest;

b) for each of the objects of interest, maintaining in memory a respective list of the interested parties and the conditions of interest for the interested parties; and c) checking whether a respective condition of interest occurs with respect to an object of interest, and when a respective condition of interest is found with respect to an object of interest, determining whether or not notification of the occurrence of the condition of interest to at least one of the interested parties would then be desirable, and when notification of the condition of interest to said at least one of the interested parties would then be desirable, notifying said at least one of the interested parties of the occurrence of the condition of interest with respect to the object of interest.

65. The method as claimed in claim 64, which further includes maintaining in memory a list of mechanisms for notifying the interested parties of the conditions of interest with respect to the objects of interest, and when a notification of the condition of interest would then be desirable for one of the interested parties interested in one of the objects of interest, using the list of mechanisms to notify said one of the interested parties of the condition of interest with respect to said one of the objects of interest.

66. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) detecting a change in a changed object of interest residing at one of said computers in said distributed computing system, and upon detecting the change in the changed object of interest, the first computer providing information about the changed object of interest to a cache memory of a second one of said computers in said distributed computing system, said cache memory maintaining information about the changed object of interest; and then (b) at an appropriate time after said cache memory receives information about the changed object of interest, the second computer forwarding information about the changed object of interest from said cache memory to a third one of said computers of an interested party interested in the changed object of interest.

67. The method as claimed in claim 66, wherein software executed by the third computer provides a client browser that is used for fetching specified objects that are distributed among said computers in said distributed computer system.

68. The method as claimed in claim 66, wherein the second computer maintains in the cache memory information about specified objects and also information about objects in specified general classes of objects.

69. The method as claimed in claim 68, wherein the second computer maintains in the cache memory information about the objects in the specified general classes of objects by searching the network of computers for objects that satisfy a search specification.

70. The method as claimed in claim 69, wherein the search specification defines a set of semantically related objects.

71. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) detecting a change in a changed object of interest residing at one of said computers in said distributed computing system, and upon detecting the change in the changed object of interest, the first computer providing information about the changed object of interest to a cache memory of a second one of said computers in said distributed computing system, said cache memory maintaining information about the changed object of interest; and then (b) at an appropriate time after said cache memory receives information about the changed object of interest, the second computer forwarding information about the changed object of interest from said cache memory to a third one of said computers of an interested party interested in the changed object of interest;

wherein the second computer waits a certain amount of time after receipt of information about the changed object of interest before forwarding information about the changed object of interest to the third computer of the interested party interested in the changed object of interest in order to place an appropriate limit on the frequency of transmission of information about the changed object of interest.

72. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) detecting a change in a changed object of interest residing at one of said computers in said distributed computing system, and upon detecting the change in the changed object of interest, the first computer providing information about the changed object of interest to a cache memory of a second one of said computers in said distributed computing system, said cache memory maintaining information about the changed object of interest; and then (b) at an appropriate time after said cache memory receives information about the changed object of interest. the second computer forwarding information about the changed object of interest from said cache memory to a third one of said computers of an interested party interested in the changed object of interest;

wherein the second computer maintains a list of interested parties that are interested in the changed object of interest, and wherein the second computer also maintains, for each of the interested parties in the list, information specifying when it is appropriate to forward information about the changed object of interest from said cache memory to said each of the interested parties in the list.

73. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects. said computer-implemented method comprising:

(a) detecting a change in a changed object of interest residing at one of said computers in said distributed computing system, and upon detecting the change in the changed object of interest, the first computer providing information about the changed object of interest to a cache memory of a second one of said computers in said distributed computing system, said cache memory maintaining information about the changed object of interest; and then (b) at an appropriate time after said cache memory receives information about the changed object of interest, the second computer forwarding information about the changed object of interest from said cache memory to a third one of said computers of an interested party interested in the changed object of interest;

wherein the second one of the computers is responsive to a demand from an interested party for information about the changed object of interest by transmitting a summary of changes in the changed object of interest from the cache memory to the interested party demanding information about the changed object of interest.

74. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) detecting a change in a changed object of interest residing at one of said computers in said distributed computing system, and upon detecting the change in the changed object of interest, the first computer Providing information about the changed object of interest to a cache memory of a second one of said computers in said distributed computing system, said cache memory maintaining information about the changed object of interest; and then (b) at an appropriate time after said cache memory receives information about the changed object of interest, the second computer forwarding information about the changed object of interest from said cache memory to a third one of said computers of an interested party interested in the changed object of interest;

wherein the second one of the computers maintains in said cache memory a history of a sequence of changes in the changed object of interest, and the second one of the computers is responsive to a demand from an interested party for a summary of changes in the changed object of interest by transmitting information about the sequence of changes in the object of interest from the cache memory to the interested party demanding the summary of changes in the changed object of interest.

75. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) detecting a change in a changed object of interest residing at a first one of said computers in said distributed computing system, and upon detecting the change in the changed object of interest, the first computer providing information about the changed object of interest to a cache memory of a second one of said computers in said distributed computing system;

(b) the second computer maintaining in said cache memory current information about the changed object of interest; and (c) in response to a demand from an interested party interested in the changed object of interest, the second computer forwarding information about the changed object of interest from said cache memory to a third one of said computers of the interested party interested in the changed object of interest.

76. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) detecting a change in a changed object of interest residing at a first one of said computers in said distributed computing system, and upon detecting the chance in the changed object of interest, the first computer providing information about the changed object of interest to a cache memory of a second one of said computers in said distributed computing system;

(b) the second computer maintaining in said cache memory current information about the changed object of interest; and (c) in response to a demand from an interested party interested in the changed object of interest, the second computer forwarding information about the changed object of interest from said cache memory to a third one of said computers of the interested party interested in the changed object of interest;

wherein the second computer responds to receipt of information about the changed object of interest from the first computer by notifying the interested party that a change has occurred in the changed object of interest, and then the second computer waits for a demand from the interested party for information that includes changes in the changed object of interest, and in response to a demand from the interested party for information that includes changes in the changed object of interest, the second computer forwards to the interested party information that incudes changes in the changed object of interest.

77. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) detecting a chance in a changed object of interest residing at a first one of said computers in said distributed computing system, and upon detecting the change in the changed object of interest, the first computer providing information about the changed object of interest to a cache memory of a second one of said computers in said distributed computing system;

(b) the second computer maintaining in said cache memory current information about the changed object of interest; and (c) in response to a demand from an interested party interested in the changed object of interest, the second computer forwarding information about the changed object of interest from said cache memory to a third one of said computers of the interested party interested in the changed object of interest;

wherein the second computer provides a summary of changes in the changed object to the interested party, and wherein the second computer responds to a demand from the interested party for a version of the changed object by providing a version of the changed object to the interested party.

78. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) maintaining in a cache memory of a first one of said computers information defining a current version of a changed object residing in a second one of said computers and also maintaining in the cache memory information defining at least one prior version of the changed object residing in the second one of said computers;

(b) the first one of said computers responding to a request from an interested party for a summary of changes in the changed object by providing from the cache memory a summary of changes in the changed object; and (c) the first one of said computers responding to a request from an interested party for a specified version of the changed object by providing from the cache memory the specified version of the changed object.

79. The method as claimed in claim 78, wherein the first one of the computers reconstructs a prior version of the changed object from a log of changes in the cache memory and a current version of the changed object in the cache memory.

80. In a distributed computing system having a network of computers linked for transmission of information about objects distributed among said computers, some of said computers executing software enabling interested parties to be provided with information about objects that the interested parties are interested in, a computer-implemented method of operating said computers for providing information about changed objects to interested parties that are interested in the information about the changed objects, said computer-implemented method comprising:

(a) at least one of said computers of an interested party maintaining a local cache of objects of interest to the interested party;

(b) said at least one of said computers receiving from another computer in the network a current version of an object of interest to the interested party; and (c) said at least one of said computers comparing the current version of the object of interest to a version of the object of interest in the local cache to identify changes between the current version of the object of interest and the version of the object of interest in the local cache, and to indicate to the interested party the identified changes between the current version of the object of interest and the version of the object of interest in the local cache;

wherein the network automatically forwards to said at least one of said computers an indication that a change has been made to the object of interest in response to a change being made to the object of interest.

81. The method as claimed in claim 80, wherein the interested party specifies a criterion used by the network for determining when a change made to the object of interest is sufficiently significant for automatically forwarding to said at least one of said computers an indication that a change has been made to the object of interest in response to a change being made to the object of interest.

82. The method as claimed in claim 80, wherein the indication that a change has been made to the object of interest is the automatic transmission of the current version of the object of interest to said at least one of the computers.

83. The method as claimed in claim 80, wherein the object of interest is transmitted to said at least one of the computers in response to the party of interest being advised that a change has been made to the object of interest and the party of interest requesting to view at least a changed portion of the object of interest.

84. In a distributed computing system having a network of computers linked for transmission of information about objects distributed among said computers, some of said computers executing software enabling interested parties to be provided with information about objects that the interested parties are interested in. a computer-implemented method of operating said computers for providing information about changed objects to interested parties that are interested in the information about the changed objects, said computer-implemented method comprising:

(a) at least one of said computers of an interested party maintaining a local cache of objects of interest to the interested party;

(b) said at least one of said computers receiving from another computer in the network a current version of an object of interest to the interested party; and (c) said at least one of said computers comparing the current version of the object of interest to a version of the object of interest in the local cache to identify chances between the current version of the object of interest and the version of the object of interest in the local cache, and to indicate to the interested party the identified changes between the current version of the object of interest and the version of the object of interest in the local cache;

wherein the network automatically forwards to said at least one of said computers an indication that a change has been made to the object of interest in response to a change being made to the object of interest, and wherein the interested party specifies an update frequency used by the network for limiting the frequency at which the network automatically forwards to said at least one of said computers an indication that a change has been made to the object of interest in response to a change being made to the object of interest.

85. In a distributed computing system having a network of computers linked for transmission of information about objects distributed among said computers, some of said computers executing software enabling interested parties to be provided with information about objects that the interested parties are interested in, a computer-implemented method of operating said computers for providing information about updates to a software product of interest from at least one computer in said distributed computing system to interested parties that are interested in the software updates, said computer-implemented method comprising:

a) maintaining in a memory in said distributed computing system a list of the interested parties interested in the updates to the software product, the list being accessed by interested parties via said distributed computing system to register the current interest of the interested parties in the software product; and b) distributing information about an update to the software product by accessing the list of the interested parties to obtain an identification of the interested parties that are currently interested in the software product, and using the identification of the interested parties that are currently interested in the software product to distribute information about the update to the software product through the distributed computing system from said at least one of the computers to the interested parties.

86. The method as claimed in claim 85, wherein the update to the software product is automatically downloaded through the distributed computing system from said at least one of the computers to the interested parties that are currently interested in the software product.

87. The method as claimed in claim 85, wherein the update to the software product is downloaded through the distributed computing system from said at least one of the computers to an interested party upon the request of the interested party.

88. The method as claimed in claim 85, wherein the distributed computing system includes the Internet, and the update to the software product is transmitted over the Internet to an interested party.

89. In a computer network having a plurality of addressable sites where network clients can access stored information, a method of change notification, said method comprising the steps of:

a) network clients interested in a particular object sending requests for change notification to a respective site in the network for receiving network client requests for change notification with respect to the particular object;

b) maintaining a list of the network clients from which requests for change notification are received at said respective site; and c) in response to a change being made in the particular object, said list being inspected to send change notifications to the network clients on said list, whereby the network clients interested in the particular object do not need to poll said respective site to be notified of a change in the particular object.

90. The method of change notification as claimed in claim 89, wherein the object is a commercial product and the method further includes distributing an update of the commercial product to network clients that indicate a desire to obtain the update of the commercial product.

91. The method of change notification as claimed in claim 89, which includes at least one of the network clients on said list sending a request to said respective site to be removed from said list so as not to be notified of a subsequent change in said particular object.

92. The method of change notification as claimed in claim 89, wherein at least one of the network clients interested in said particular object sends a respective specification of a significant change detection method for said particular object for determining whether or not the change in said particular object is of sufficient significance to said at least one of the network clients for a change notification to be sent to said at least one of the network clients, and in response to the change being made in the particular object and upon inspecting said list to send change notifications to the network clients on said list, finding that said at least one of said network clients has sent said respective specification of said significant change detection method for said particular object, and applying said significant change detection method for said particular object to determine whether or not the change having been made in the particular object is of sufficient significance to said at least one of said network clients for a change notification to be sent to said at least one of said network clients.

93. The method of change notification as claimed in claim 89, wherein at least one of the network clients interested in said particular object sends a respective specification of a change notification method to be used for notifying said at least one of the network clients of a change in said particular object, and in response to the change being made in the particular object and upon inspecting said list to send change notifications to the network clients on said list, finding that said at least one of said network clients has sent said respective specification of said change notification method, and using said change notification method for notifying said at least one of said network clients of the change in said particular object.

94. A method of operating a server in a data network to service client requests for access to objects residing at other locations in the data network, said method comprising the steps of:

a) in response to requests from clients in the data network, the server fetching specified objects and delivering the specified objects to the clients in the data network; and b) in response to an update request from at least one of clients having received at least one of the fetched objects, the server registering said at least one of the clients as desiring update notification with respect to said at least one of the fetched objects, and maintaining a copy of said at least one of the fetched objects in a cache memory, and once a change is made to said at least one of the fetched objects at another location in the data network where said at least one of the fetched objects resides, automatically updating the copy of said at least one of the fetched objects residing in the cache memory without client intervention and notifying said at least one of the clients that said at least one of the fetched objects has changed.

95. The method as claimed in claim 94, wherein the server maintains in the cache memory only those objects that are requested by the clients to be updated automatically.

96. The method as claim 94, wherein the server receives a request from said at least one of the clients to cancel registration for updates for said at least one of the fetched objects, and in response the server cancels registration of said at least one of the clients for updates for said at least one of the fetched objects.

* * * * *

UNITED STATES PATENT AND TRADEMARK OFFICE
CERTIFICATE OF CORRECTION

PATENT NO.    : 6,029,175
DATED         : February 22, 2000
INVENTOR(S)   : Yen-Whei Chow et al.

It is certified that error appears in the above-identified patent and that said Letters Patent is hereby corrected as shown below:

In claim 23, column 46, line 22, please change "Performance" to --performance--.

In claim 74, column 56, line 58, please change "Pro-" to --pro--.

In claim 76, column 57, line 51, please change "chance" to --change--.

In claim 77, column 58, line 19, please change "chance" to --change--.

In claim 84, column 60, line 4, please change "chances" to --changes--.

In claim 96, column 62, line 35, please change "claim" to --claimed in claim--.

Signed and Sealed this

Ninth Day of January, 2001

*Attest:*

*Attesting Officer*

Q. TODD DICKINSON

*Commissioner of Patents and Trademarks*